United States Patent
Ohta et al.

(10) Patent No.: US 7,391,917 B2
(45) Date of Patent: Jun. 24, 2008

(54) IMAGE PROCESSING METHOD

(75) Inventors: Ken-ichi Ohta, Kanagawa (JP); Hiroshi Tanioka, Kanagawa (JP); Akihiro Usami, Kanagawa (JP); Kitahiro Kaneda, Kanagawa (JP); Hirohiko Ito, Kanagawa (JP); Shinichi Kato, Kanagawa (JP); Tomohiro Akiba, Tokyo (JP); Tomotoshi Kanatsu, Tokyo (JP); Reiji Misawa, Tokyo (JP); Yoshihide Terao, Kanagawa (JP); Mitsuru Uzawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 750 days.

(21) Appl. No.: 10/775,177

(22) Filed: Feb. 11, 2004

(65) Prior Publication Data

US 2004/0223197 A1    Nov. 11, 2004

(30) Foreign Application Priority Data

| Feb. 13, 2003 | (JP) | ............................. 2003-035112 |
| Feb. 13, 2003 | (JP) | ............................. 2003-035113 |
| Apr. 25, 2003 | (JP) | ............................. 2003-121075 |
| May 29, 2003 | (JP) | ............................. 2003-152050 |

(51) Int. Cl.
*G06K 9/46* (2006.01)

(52) U.S. Cl. ........................ 382/253; 382/305; 382/321; 358/538; 358/449

(58) Field of Classification Search .................. 382/305
See application file for complete search history.

(56) References Cited

U.S. PATENT DOCUMENTS 4,553,206 A * 11/1985 Smutek et al. .............. 707/101
4,748,678 A    5/1988 Takeda et al. .................. 382/56
5,486,686 A    1/1996 Zdybel, Jr. et al. .......... 235/375
5,515,179 A *  5/1996 Yamakawa et al. .......... 358/447

(Continued)

FOREIGN PATENT DOCUMENTS

EP    0 751 672    1/1997

(Continued)

OTHER PUBLICATIONS

Walid G. Aref, et al., "On Handling Electronic Ink," ACM Computing Surverys, vol. 27, No. 4, 564-567 (Dec. 1995).

(Continued)

*Primary Examiner*—Jingge Wu
*Assistant Examiner*—John W Lee
(74) *Attorney, Agent, or Firm*—Fitzpatrick, Cella, Harper & Scinto

(57) ABSTRACT

Stored digital data is searched for on the basis of an input image, difference information is extracted by comparing the retrieved digital data and the input image, and the difference information is composited to the digital data. Digital data generated by composition is stored. When no digital data is retrieved, the input image is converted into vector data, and the image that has been converted into the vector data is stored as digital data. Obtained region segmentation information and an input image are composited, the composite image is displayed on an operation screen of an MFP, and a rectangular block to be vectorized is designated as a specific region from the displayed region segmentation information. A user designates the specific region by designating rectangular blocks in an image using a pointing device.

10 Claims, 37 Drawing Sheets

U.S. PATENT DOCUMENTS

| | | | |
|---|---|---|---|
| 5,701,498 A | 12/1997 | Goach, Jr. et al. | 395/762 |
| 5,926,824 A | 7/1999 | Hashimoto | 707/520 |
| 5,933,823 A * | 8/1999 | Cullen et al. | 707/6 |
| 6,466,329 B1 | 10/2002 | Mukai | 358/1.15 |
| 6,879,724 B2 * | 4/2005 | Yamaguchi et al. | 382/232 |
| 2002/0044686 A1 * | 4/2002 | Yamazaki | 382/167 |
| 2002/0064308 A1 | 5/2002 | Altman et al. | 382/187 |

FOREIGN PATENT DOCUMENTS

| | | |
|---|---|---|
| EP | 1 256 900 | 11/2002 |
| EP | 1 283 485 | 2/2003 |
| JP | 8-147445 | 6/1996 |
| JP | 10-063820 | 3/1998 |
| JP | 10-285378 | 10/1998 |
| JP | 2001-358863 | 12/2001 |

OTHER PUBLICATIONS

Edward C. Chung and M. Celenk, "PC-Based Digital Fascimile Information Distribution System", Proc. 24th S.-E. Symp. on and 3rd Ann. Symp. on Communications, Signal Processing Expert Systems, and ASIC VSLI Design, 596-600 (Mar. 1992).

* cited by examiner

FIG. 5

BLOCK INFORMATION

| | PROPERTY | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

PROPERTY   1 : text   2 : picture   3 : table   4 : line   5 : photo

INPUT FILE INFORMATION

| TOTAL NUMBER OF BLOCKS | N (=6) |
|---|---|

IMAGE PROCESSING METHOD

CLAIM OF PRIORITY

The present application claims priority under 35 U.S.C. §119 from Japanese Patent Applications No. 2003-35113, entitled "An Image Processing Method" and filed on Feb. 13, 2003, No. 2003-35112, entitled "An Image Processing Method" and filed on Feb. 13, 2003, No. 2003-152050, entitled "An Image Processing Method" and filed on May 29, 2003, and No. 2003-121075, entitled "An Image Processing Method" and filed on Apr. 25, 2003, the entire contents of which are hereby incorporated by reference herein.

FIELD OF THE INVENTION

The present invention relates to an image process and, more particularly, to an image process for extracting handwritten information additionally written on an image of a document which is scanned by, e.g., a scanner, digital camera, or the like, an image process for converting the scanned image of the document into vector data that can be re-used by so-called document creation application software (e.g., Word or the like), and the like.

BACKGROUND OF THE INVENTION

In recent years, amid calls for environmental issues, move to paperless offices has been promoted, and various techniques that handle digital documents have been proposed.

For example, Japanese Patent Laid-Open No. 2001-358863 describes a technique for scanning a paper document by a scanner, converting the scanned data into a digital document format (e.g., JPEG, PDF, or the like), and storing the converted data in image storage means.

On the other hand, Japanese Patent Laid-Open No. 8-147445 discloses a technique for detecting regions of respective properties contained in a document image, and managing the document as contents for respective regions.

Also, Japanese Patent Laid-Open No. 10-063820 discloses a technique for identifying corresponding digital information on the basis of a scanned input image, and further describes an information processing apparatus which extracts a difference between the input image and digital information, and composites the extracted difference to the identified digital information.

Furthermore, Japanese Patent Laid-Open No. 10-285378 discloses the following technique. That is, in a digital multifunction peripheral (MFP) (comprising a copy function, scan function, print function, and the like), it is confirmed if a scanned image includes a graphic code indicating a page ID, and if the graphic code is found, a database is searched for the corresponding page ID. If the page ID is found in the database, the currently scanned image is discarded, print data associated with that page ID is read out, and a print image is generated and is printed on a paper sheet by a print operation. On the other hand, if no corresponding page ID is found in the database, the scanned image is directly copied onto a paper sheet in a copy mode, or a PDL command is appended to the scanned image to convert the scanned image into a PDL format, and the converted data is transmitted in a facsimile or filing mode. Japanese Patent Laid-Open No. 10-285378 also discloses the following technique. That is, a function-extended recording device and MFP (multi-function peripheral) are used, and original data files of text data, images, and the like are stored in an image storage device. Upon recording a paper document by printing original data file, pointer information in the image storage device that stores the original data file is recorded as additional information on a cover sheet of the paper document or print information. With this technique, the original data file can be directly accessed based on the pointer information, and can be re-used (e.g., it can be edited, printed, or the like), thus reducing the quantities of paper documents to be held.

However, with the technique disclosed in Japanese Patent Laid-Open No. 2001-358863, an image scanned by the scanner can be saved as a JPEG file or PDF file with a compact information size. However, this technique cannot search for a saved file based on the printed document. Hence, when print and scan processes are repeated, the saved digital document image gradually deteriorates. Also, the image scanned by the scanner can be saved as a PDF file with a compact information size. However, this technique cannot search for a saved file based on the printed document, and it is difficult to re-use the saved document. Furthermore, during conversion into a PDF file, other processes cannot be done. On the other hand, the technique disclosed in Japanese Patent Laid-Open No. 8-147445 divides an image into a plurality of regions and allows these regions to be re-usable for respective contents. However, the contents are searched on the basis of a user's instruction, and contents to be used are determined from the found contents. Hence, upon generating a document using the stored contents, the user must determine contents to be used, thus taking a lot of trouble.

On the other hand, since the technique in Japanese Patent Laid-Open No. 10-063820 extracts difference information by searching for an original digital document corresponding to the output paper document, information additionally written on the paper document can be held as difference image. However, since the difference information directly handles a scanned image, a large storage capacity is required.

In the technique in Japanese Patent Laid-Open No. 10-285378, if no original digital document corresponding to a paper document is found, a PDL command is appended to a scanned image to convert that image into a PDL format. However, when the PDL command is merely appended to the scanned image to convert that image into the PDL format, a relatively large file size is required. Also, in case of a document file having no pointer information to an original data file, an original data file cannot be searched for.

SUMMARY OF THE INVENTION

The present invention has been made in consideration of these problems, and has as its object to provide an image processing method, image processing apparatus, and the like, which can minimize deterioration of an image without losing any information on a paper document, and can minimize a required storage capacity.

It is another object of the present invention to convert an input image into vector data so as to facilitate re-use of information which is saved in the form of a paper document or image data. It is still another object of the present invention to improve the conversion efficiency of vector data.

In order to achieve the above objects, an image processing method of the present invention comprises a search step of searching for original digital data stored in storage means on the basis of an input image;

an extraction step of extracting difference information by comparing the original digital data retrieved in the search step and the input image;

a vectorization step of converting the difference information extracted in the extraction step into vector data; and a composition step of compositing the difference information that has been converted into the vector data to the original digital data.

An image processing method of the present invention comprises:

a search step of searching for an original data file corresponding to an input image;

a checking step of checking, based on a user's instruction, whether the input image is to be converted into vector data immediately or later; and a vectorization step of converting the input image, the original data file of which cannot be retrieved, into vector data, wherein the vectorization step includes a step of immediately converting the input image into vector data when it is determined in the checking step that the input image is to be converted into vector data immediately, and converting, when it is determined in the checking step that the input image is to be converted into vector data later, the input image into vector data when a predetermined condition is met.

An image processing method of the present invention comprises:

a specific region designation step of designating a specific region of an input image; and a vectorization step of converting an image of the designated specific region into vector data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 5 shows an example of the configurations of block information and input file information;

DETAILED DESCRIPTION OF THE PREFERRED EMBODIMENTS

A. First Embodiment

Figure 1:
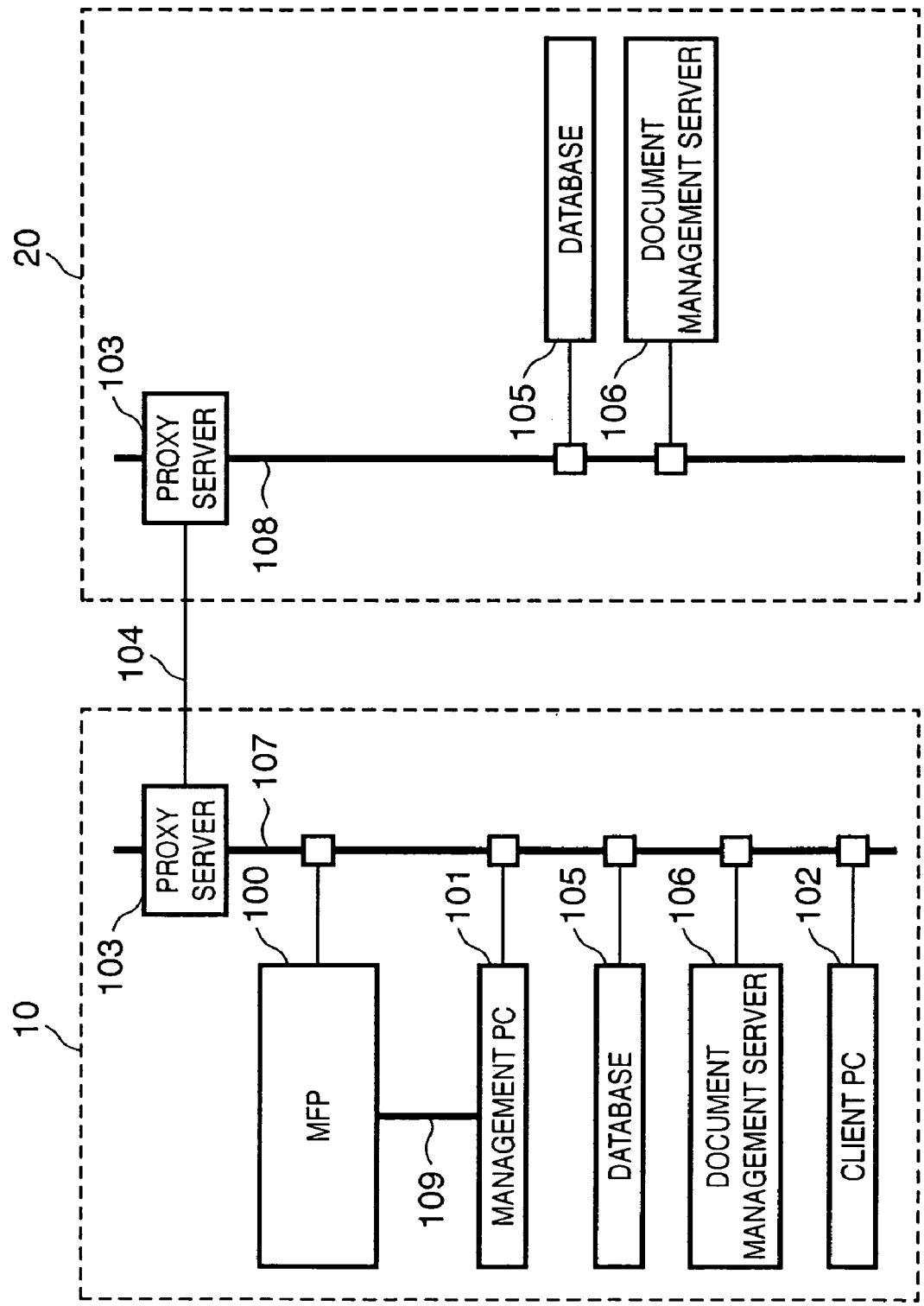
FIG. 1 is a block diagram showing an example of the arrangement of an image processing system that can be applied to the first to fourth embodiments.

An embodiment of the present invention will be described hereinafter. FIG. 1 is a block diagram showing an example of the arrangement of an image processing system according to the present invention. This image processing system is implemented in an environment in which offices 10 and 20 are connected via an Internet 104. To a LAN 107 formed in the office 10, an MFP (Multi-Function Peripheral) 100, a management PC 101 for controlling the MFP 100, a client PC 102, a document management server 106, its database 105, and a proxy server 103 are connected. The LAN 107 and a LAN 108 in the office 20 are connected to the Internet 104 via the proxy servers 103. The MFP 100 in this embodiment has charge of an image scanning process (scanner) of paper documents and some of image processes for a scanned image signal, and supplies an image signal to the management PC 101 via a LAN 109. The management PC comprises a general PC, which has image storage means, image processing means, display means, input means, and the like, but some means of which are integrally formed with the MFP 100.

Figure 2:
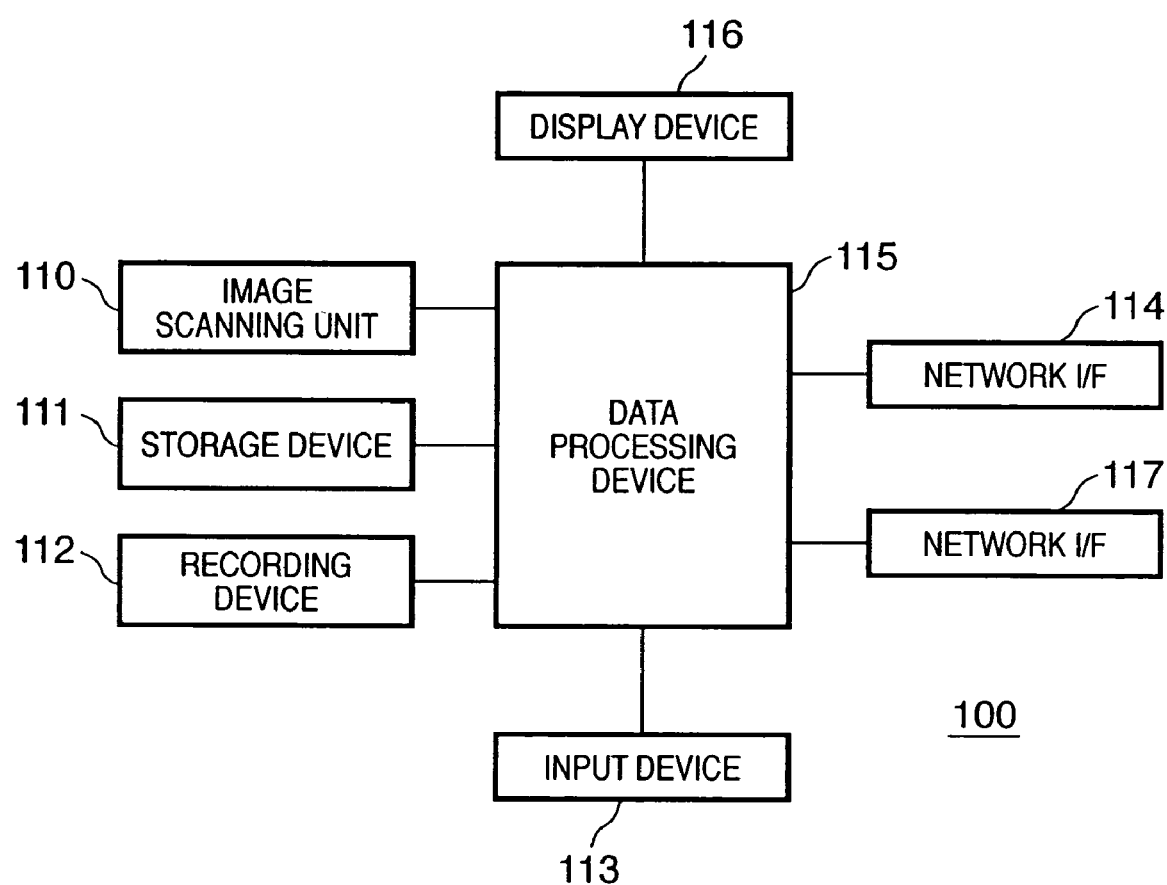
FIG. 2 is a block diagram showing an example of the arrangement of an MFP that can be applied to the first to fourth embodiments.

FIG. 2 is a block diagram showing the arrangement of the MFP 100. Referring to FIG. 2, an image scanning unit 110 including an auto document feeder (to be abbreviated as an ADF hereinafter) irradiates a document image on each of one or a plurality of stacked documents with light coming from a light source (not shown), forms an image of light reflected by the document on a solid-state image sensing element via a lens, and obtains a scanned image signal in the raster order as image information at a resolution of, e.g., 600 DPI, from the solid-state image sensing element. In a normal copy function, a data processing device 115 executes an image process of that image signal to convert it into a recording signal. In case of a multi-copy process, the data processing device 115 temporarily stores recording data in a storage device 111, and sequentially outputs that data to a recording device, thus forming images on paper sheets.

Print data output from the client PC 102 is received by the data processing device 115 via the LAN 107 and a network I/F 114, and is then converted into recordable raster data by the data processing device 115. The raster data is then input to the recording device to form a recording image on a paper sheet.

A display device 116 displays status of operation inputs and image data whose process is underway. Note that the storage device 111 is also controlled from the management PC, and data exchange and control between these MFP and management PC are done via a network I/F 117 and the directly connected LAN 109.

Note that the present invention is practiced in the apparatus shown in FIG. 2 or the system shown in FIG. 1. For example, the processes of the present invention (to be described later) may be implemented when a controller (CPU) of the data processing device 115 executes a computer executable control program stored in the storage device 111 in FIG. 2 (in this case, the control program that forms the present invention may be stored in the storage device 111 or may be loaded and executed from an external device via a communication line or the like; the storage device is not limited to a built-in hard disk but may be a removable disk or the like). Also, the process of the present invention may be implemented by an electrical circuit as hardware components which include all or some components of the controller of the data processing device 115.

<<Overview of Process>>

An overview of the entire image process according to the present invention will be described below using FIG. 3.

Figure 3:
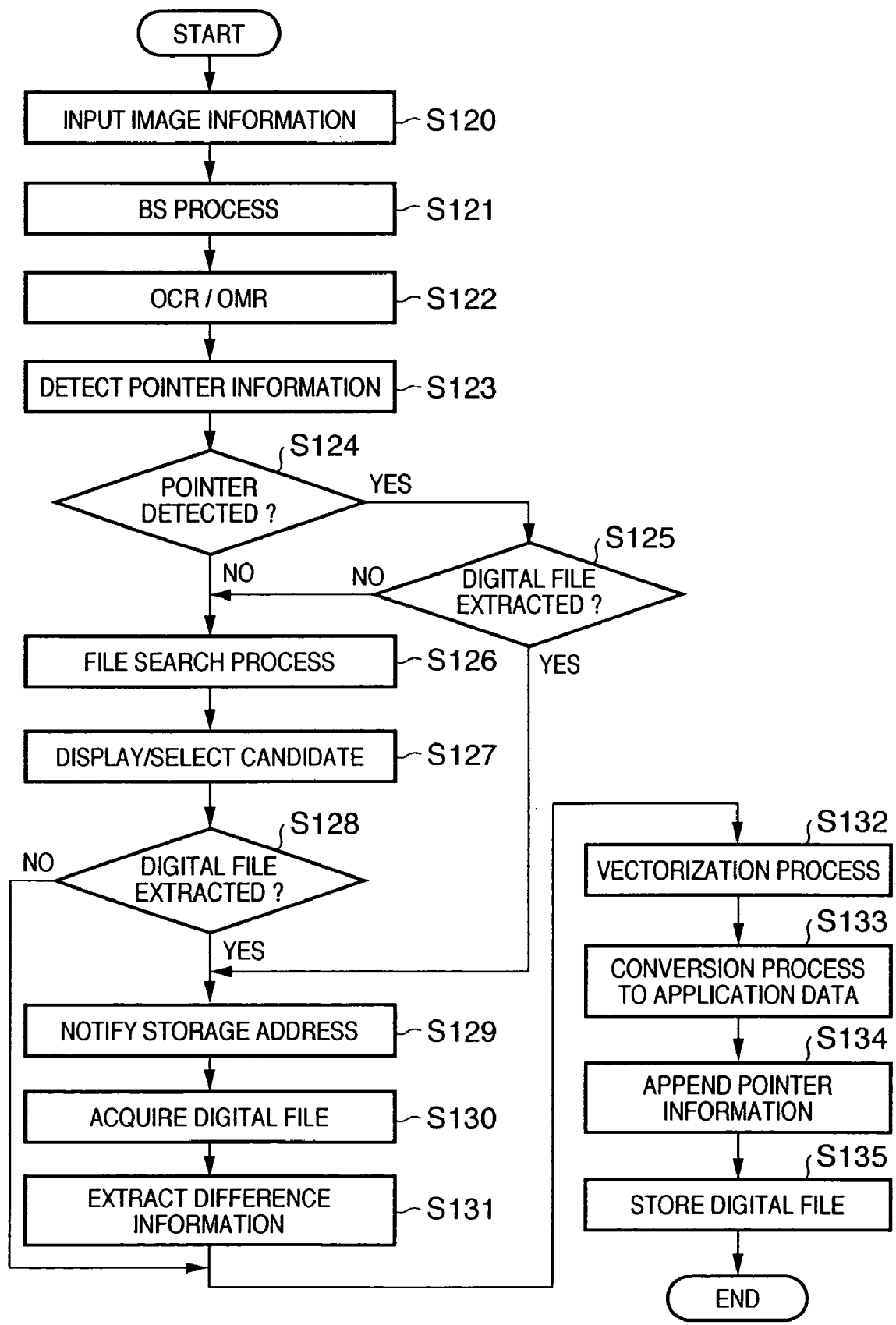
FIG. 3 is a flow chart showing an overview of the entire operation of an image process according to the first embodiment.

Referring to FIG. 3, the image scanning unit 110 of the MFP 100 is enabled to scan one document in a raster order, and to obtain an 8-bit image signal of a 600 DPI in an image information input process step S120. This image signal undergoes a pre-process by the data processing device 115, and is stored as image data for one page in the storage device 111. A CPU of the management PC 101 separates regions of a text/line image part and halftone image part from the stored image signal. The CPU further separates a text part into blocks combined as clusters for respective paragraphs, and a line image part into tables and graphics formed of lines, and converts these tables and graphics into segments. On the other hand, the CPU separates an image part expressed by halftone into rectangular blocks including a halftone image part, and segments the image part into independent objects for respective blocks (step S121).

At this time, an object corresponding to a two-dimensional barcode or URL, which is recorded in the document image as additional information, is detected. In this case, the URL undergoes a character recognition process (OCR) or the two-dimensional barcode is decoded (OMR) (step S122), thereby detecting pointer information in the storage device that stores an original digital file of that document (step S123). As a method of appending the pointer information, a method of embedding information by slightly changing the spacings between neighboring characters, a method of embedding information in a halftone image as a digital watermark, or the like may be adopted.

If the pointer information is detected, the flow advances to step S125 to search for an original digital file from the address designated by the pointer. The digital file is stored in one of a hard disk in the client PC, the database 105 managed by the document management server 106 connected to the LAN in the office 10 or 20, and the storage device 111 of the MFP 100 itself in FIG. 1, and these storage devices are searched in accordance with the address information obtained in step S123. If no digital file is found or if the found file is a so-called image file represented by JPEG, PDF, or tiff in step S125, or if the pointer information itself is not found in step S124, the flow advances to step S126. If the digital file is found based on the pointer information in step S125, the flow advances to step S129 to notify the storage address of the digital file.

Step S126 is a so-called document search process routine. A full-text search is conducted by extracting words from the results of the OCR process which is executed for text blocks in step S122, and comparing them with words contained in a digital file, or a layout search is conducted by comparing the layout and properties of respective objects with those of a digital file. As a result of the search process, if digital files with high similarity levels are found, digital files as candidates are displayed as thumbnails or the like (step S127), and a file is specified from the plurality of candidates by an operator's input operation if necessary. If only one file is found as a candidate, the flow may bypass step S127 and advance to step S128 to automatically determine the presence of a digital file. The flow may then advance to step S129 to notify the storage address of the candidate file. If no digital file is found by the search process in step S126, or if the found file is a so-called image file represented by JPEG, PDF, or tiff, the flow jumps to step S132.

Note that image information input in step S120 assumes not only a printout itself of a digital file which is retrieved and specified in the above processes, but also a printout which is distributed as a reference, and on which the user who acquired that printout inserts by hand new information which is not present in a specified original digital file on that reference, or the like.

If the digital file is specified in step S125 or S128, difference information between the input image information and the specified digital file is extracted to extract new information added later. That is, a digital file is acquired in practice in step S130 based on the address which is notified in step S129 and indicates the location of the specified digital file, and difference information between the input image information and the original digital file is extracted in step S131.

The extracted difference information is converted from image data into vector data by a vectorization process in step S132. If the difference information is text information or the like, which is additionally written by hand, that text information is converted into codes by OCR or into outline data by outline tracing, i.e., into vector information. The vectorized difference information is composited to the original digital file to generate a new digital file.

If no difference information is detected, the same file as the original digital file is generated.

If no digital file is specified or if the specified digital file is an image file (which undergoes neither vectorization nor character code conversion) in step S128, the entire input image information undergoes a vectorization process to convert the image data into a vectorized digital file in step S132. For text blocks that have undergone the OCR process in step S122, the size, style, and font of characters are recognized to determine correspondence with outline data which are prepared for respective character types (fonts, styles), thus converting the text blocks into font data which are visually faithful to characters obtained by scanning the document. Also, table and graphic blocks formed of lines are converted into outline vector data. Natural image blocks such as a photo or the like are processed as an independent JPEG file as image data. Note that the text block may be converted into vector data by identifying the outlines of character images and extracting outline vectors along the outlines of character images in place of use of the OCR result.

Such vectorization processes are executed for respective objects, and layout information of the objects is saved. In step S133, these objects and layout information are converted into application data which can be edited by a general application. In step S135, the application data is stored in the storage device 111 as a digital file. Note that the data may be converted into an RTF (Rich Text Format) file that can embed vector data and image data as a versatile file format. Note that the application data file to be converted is not limited to the RTF format that allows object embedding. For example, data may be converted into other file formats such as an SVG (Scalable Vector Graphics) format and the like.

At this time, the storage location of the digital file is appended to the digital file to be saved in step S134. In this way, the saved document can undergo the next and subsequent search processes. Upon printing a file, if the pointer information is printed as a two-dimensional barcode, the document saved in this process can be easily accessed on the basis of the printed document.

The digital file obtained in the above sequence contains original digital information or vector information approximate to the original digital information, and information which is additionally written, e.g., by hand later, in an editable format, and these pieces of information can be directly processed or re-used, or can be stored, transmitted, or re-printed.

Since the information size is reduced compared to a case wherein the simply input image is directly handled as image data, the storage efficiency can be improved, the transmission time can be shortened, or high-quality data can be recorded or displayed.

Respective processing blocks will be described in detail below.

<<Block Selection Process>>

The block selection process (region segmentation process) in step S121 will be described first.

Figure 4:
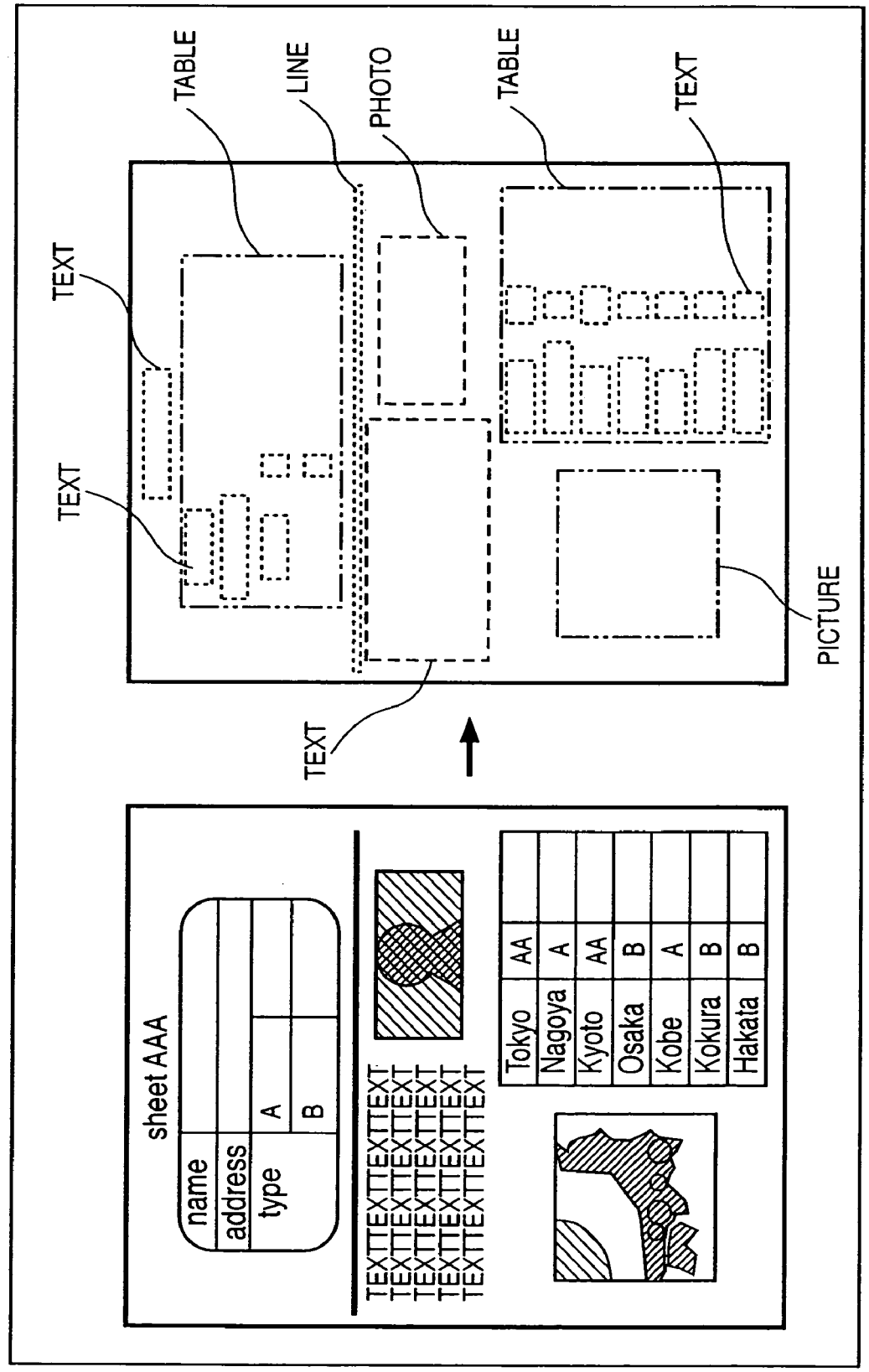
FIG. 4 shows an example of a block selection process.

In the block selection process, image data input in step S120 (left side of FIG. 4) is recognized as clusters for respective objects, properties (text/picture/photo/line/table, etc.) of respective blocks are determined, and the image data is segmented into regions having different properties, as shown in the right side of FIG. 4.

One embodiment of the block selection process will be described below.

An input image is binarized to a monochrome image, and a cluster of pixels bounded by black pixels is extracted by outline tracing. For a cluster of black pixels with a large area, outline tracing is made for white pixels in the cluster to extract clusters of white pixels. Furthermore, a cluster of black pixels is recursively extracted from the cluster of white pixels with a predetermined area or more.

The obtained clusters of black pixels are classified into regions having different properties in accordance with their sizes and shapes. For example, a pixel cluster which has an aspect ratio close to 1, and has a size that falls within a predetermined range is determined as that corresponding to a character. Furthermore, a part where neighboring characters regularly line up and can be grouped is determined as a text region. Also, a low-profile pixel cluster is categorized as a line region, a range occupied by black pixel clusters that include rectangular white pixel clusters which regularly line up is categorized as a table region, a region where pixel clusters with indeterminate forms are distributed is categorized as a photo region, and other pixel clusters with an arbitrary shape is categorized as a picture region, and so forth.

FIG. 5 shows block information for respective blocks obtained by the block selection process, and input file information used to manage blocks included in an input image. These pieces of information for respective blocks are used to execute vectorization or to conduct a search, as will be described later.

<<Detection of Pointer Information>>

The OCR/OMR process (step S122) for extracting the storage location of a file from image information will be described below.

Figure 6:
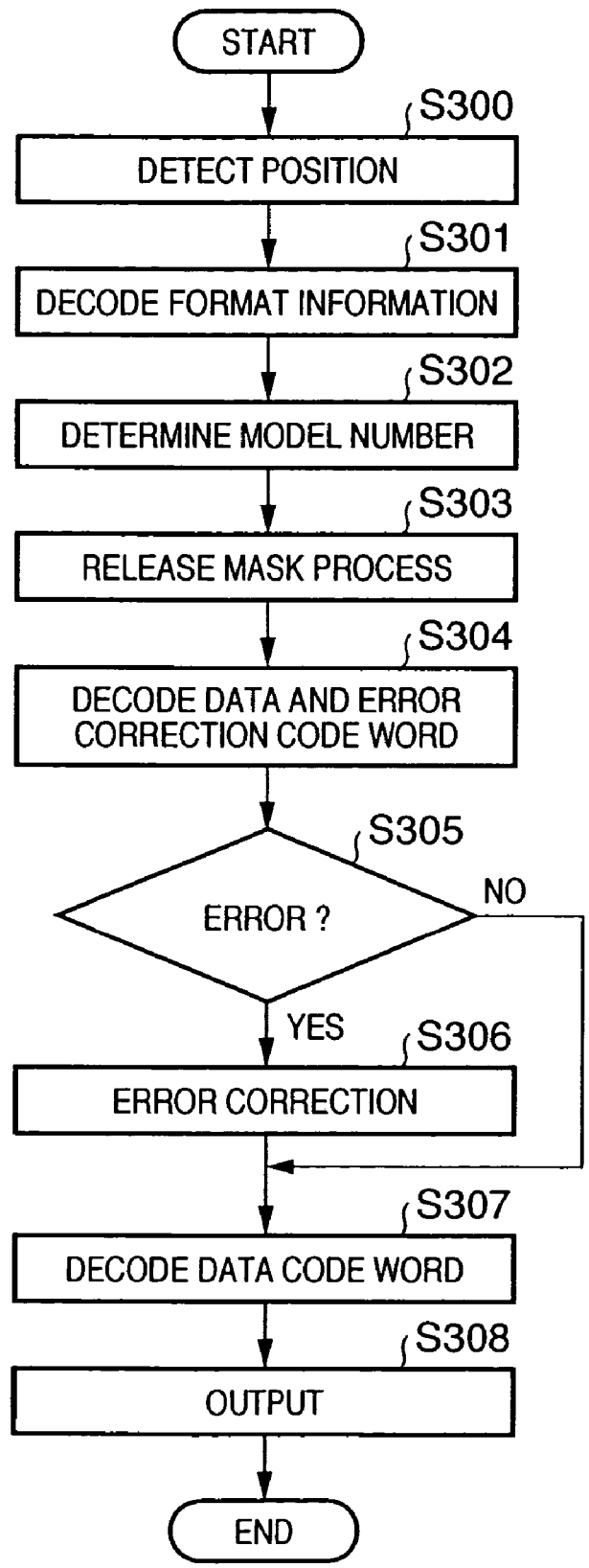
FIG. 6 is a flow chart showing a decoding process of a two-dimensional barcode.
Figure 7:
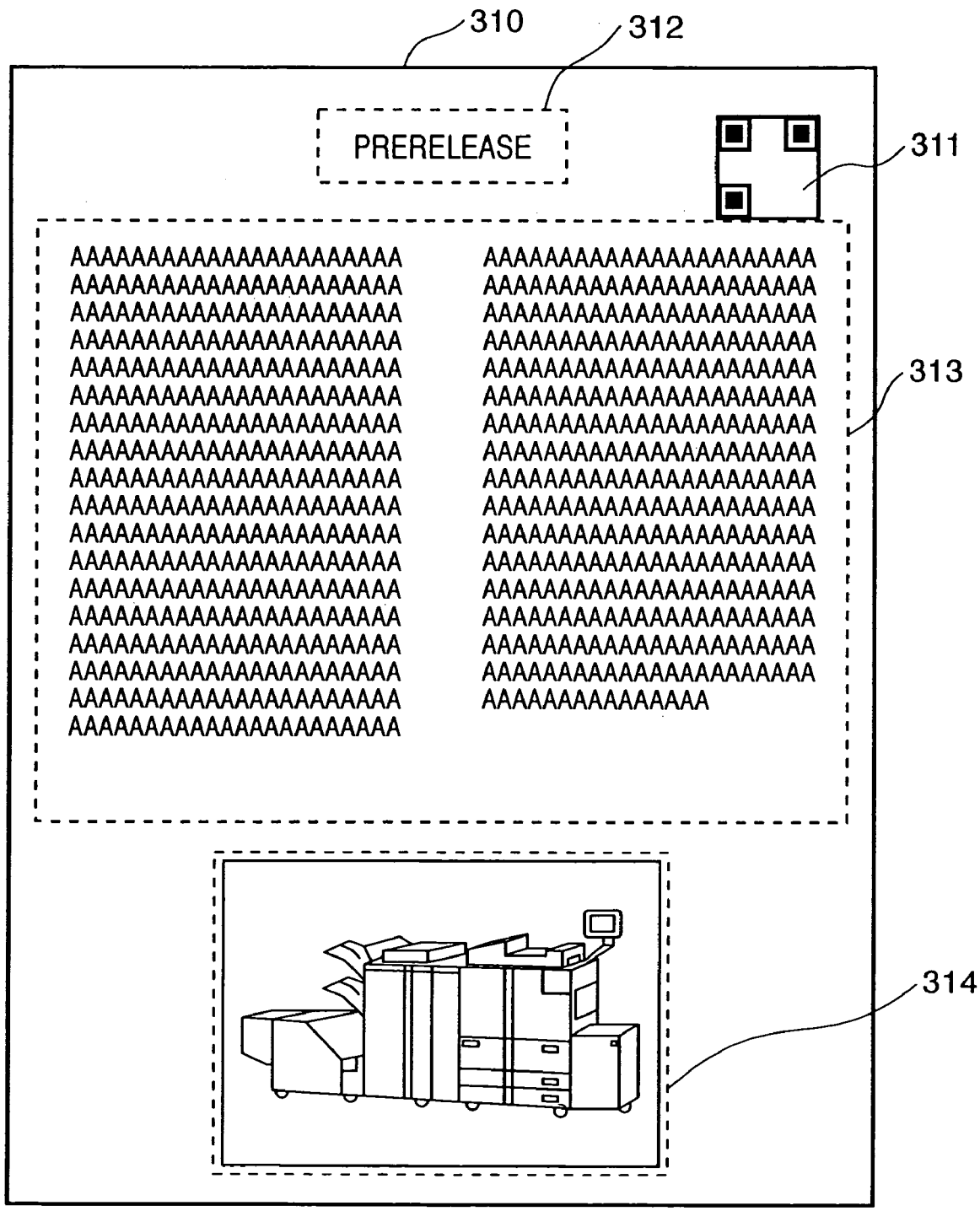
FIG. 7 shows an example of a document appended with a two-dimensional barcode.

FIG. 6 is a flow chart showing a sequence for decoding a two-dimensional barcode (QR code symbol) appended into a document image, and outputting a data character string. FIG. 7 shows an example of a document 310 appended with a two-dimensional barcode.

A CPU (not shown) scans an image that represents the document 310 stored in a page memory in the data processing device 115 to detect the position of a predetermined two-dimensional barcode symbol 311 from the result of the aforementioned block selection process. A position detection pattern of a QR code is made up of identical position detection element patterns, which are located at three out of four corners of the symbol (step S300).

Next, format information that neighbors the position detection pattern is decoded to obtain an error correction level and mask pattern applied to the symbol (step S301).

After a model number of the symbol is determined (step S302), an encoded region bit pattern is XORed using the mask pattern obtained from the format information to release the mask process (step S303).

Note that a symbol character is read in accordance with the layout rule corresponding to the model so as to decode message data and an error correction code word. (step S304).

It is detected if a decoded code includes an error (step S305). If any error is detected, the flow branches to step S306 to correct that error.

A data code word is divided into segments on the basis of a mode indicator and character count indicator from the error-corrected data (step S307).

Finally, data characters are decoded on the basis of a specification mode, thus outputting the result (step S308).

Note that data to be encoded in the two-dimensional barcode represents address information of the corresponding file, which is formed of path information including a file server name and file name. Or the address information may be formed of a URL to the corresponding file.

In this embodiment, the document 310 appended with the pointer information using the two-dimensional barcode has been described. Alternatively, pointer information may be recorded using a character string. In this case, a block of a character string according to a predetermined rule (e.g., a text block located at a predetermined position) is detected by the above block selection process, and characters of the character string block that indicates the pointer information undergo character recognition, thus obtaining the address information of the original file.

Furthermore, pointer information can be assigned by embedding information in the character spacings by applying imperceptible modulation to, e.g., the spacings between neighboring characters in a character string of a text block 312 or 313 of the document 310 shown in FIG. 7. For example, when the character spacings are detected upon executing a character recognition process (to be described later), pointer information can be obtained. Also, pointer information can be assigned as an invisible digital watermark in a natural image 314.

<<File Search Based on Pointer Information>>

Figure 8:
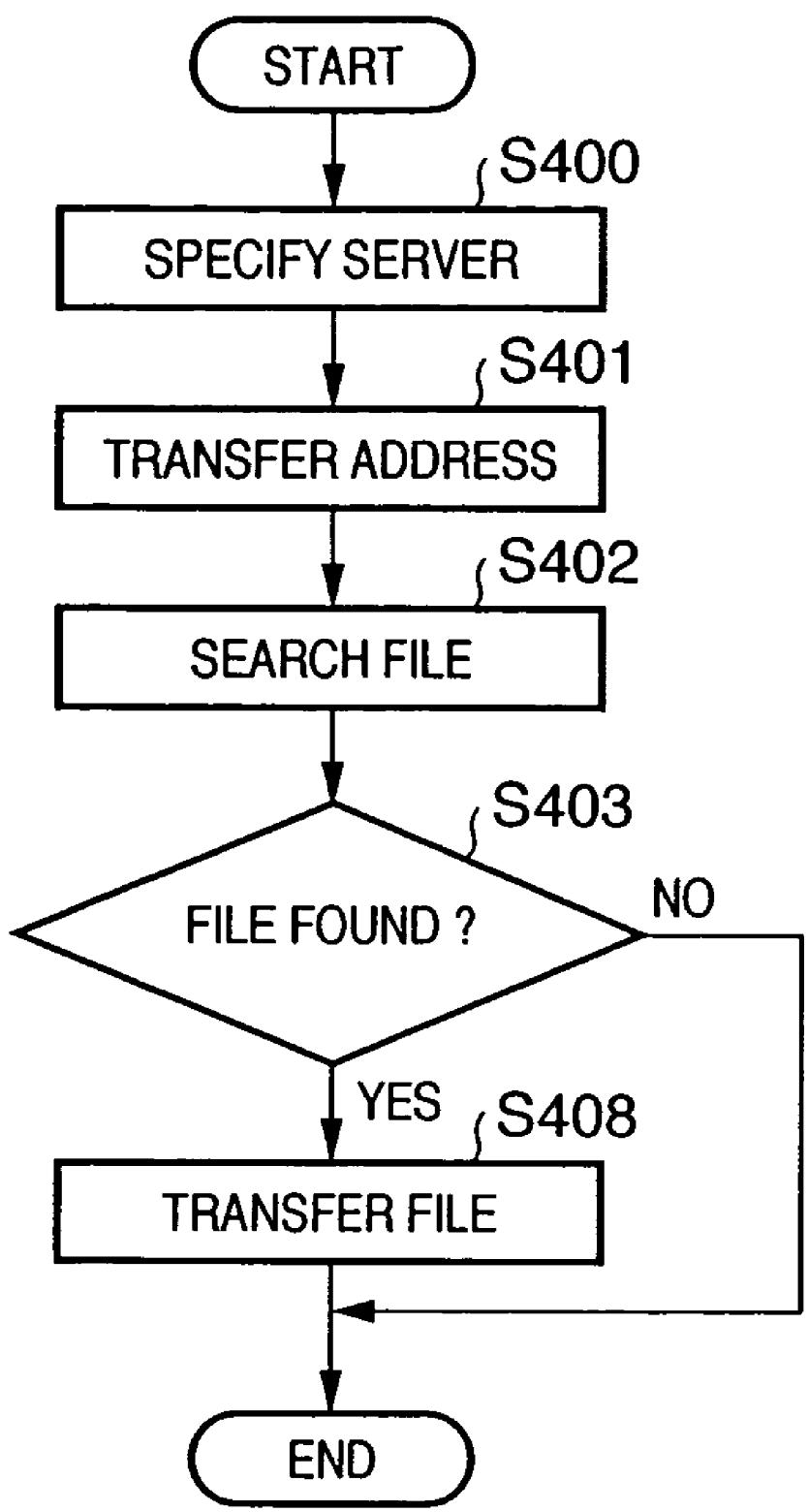
FIG. 8 is a flow chart of a file search process based on pointer information.

The digital file search process based on the pointer information in step S125 in FIG. 3 will be described below using the flow chart of FIG. 8.

A file server is specified based on an address included in the pointer information (step S400).

Note that the file server indicates the client PC 102, the document management server 106 that incorporates the database 105, or the MFP 100 itself that incorporates the storage device 111. Also, the address is a URL or path information including a server name and file name.

After the file server can be specified, the address is transferred to the file server (step S401). Upon reception of the address, the file server searches for a corresponding file (step S402). If no file is found (No in step S403), the file server sends a message that advises accordingly to the MFP.

On the other hand, if a file is found (step S403-Y), the file address is notified (step S129), as has been explained in FIG. 3, and the found data file is transferred to the MFP for a difference information extraction process to be executed later) (step S408).

<<File Search Process>>

Figure 10A:
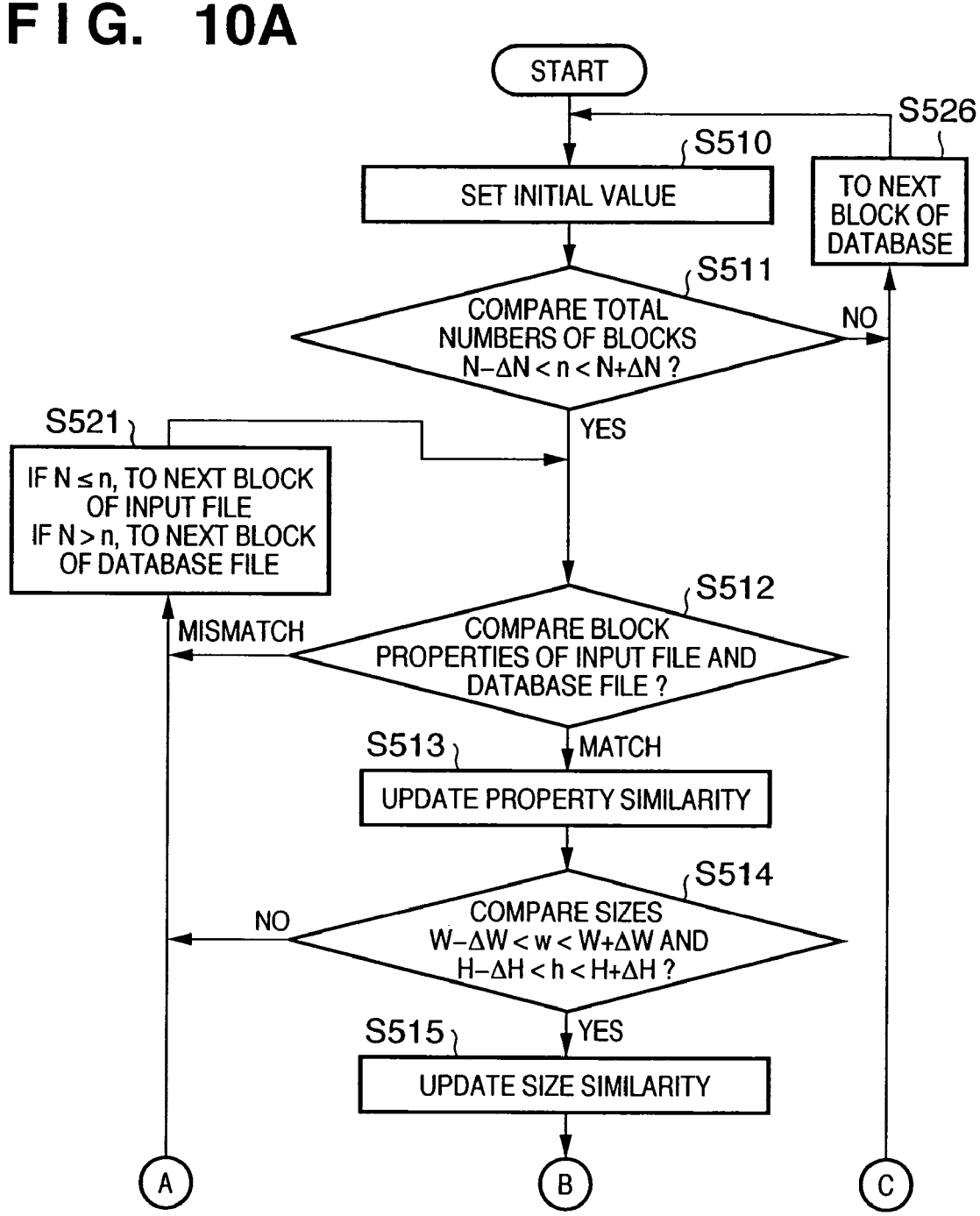
FIGS. 10A and 10B are flow charts showing a layout search process of a file.
Figure 10B:
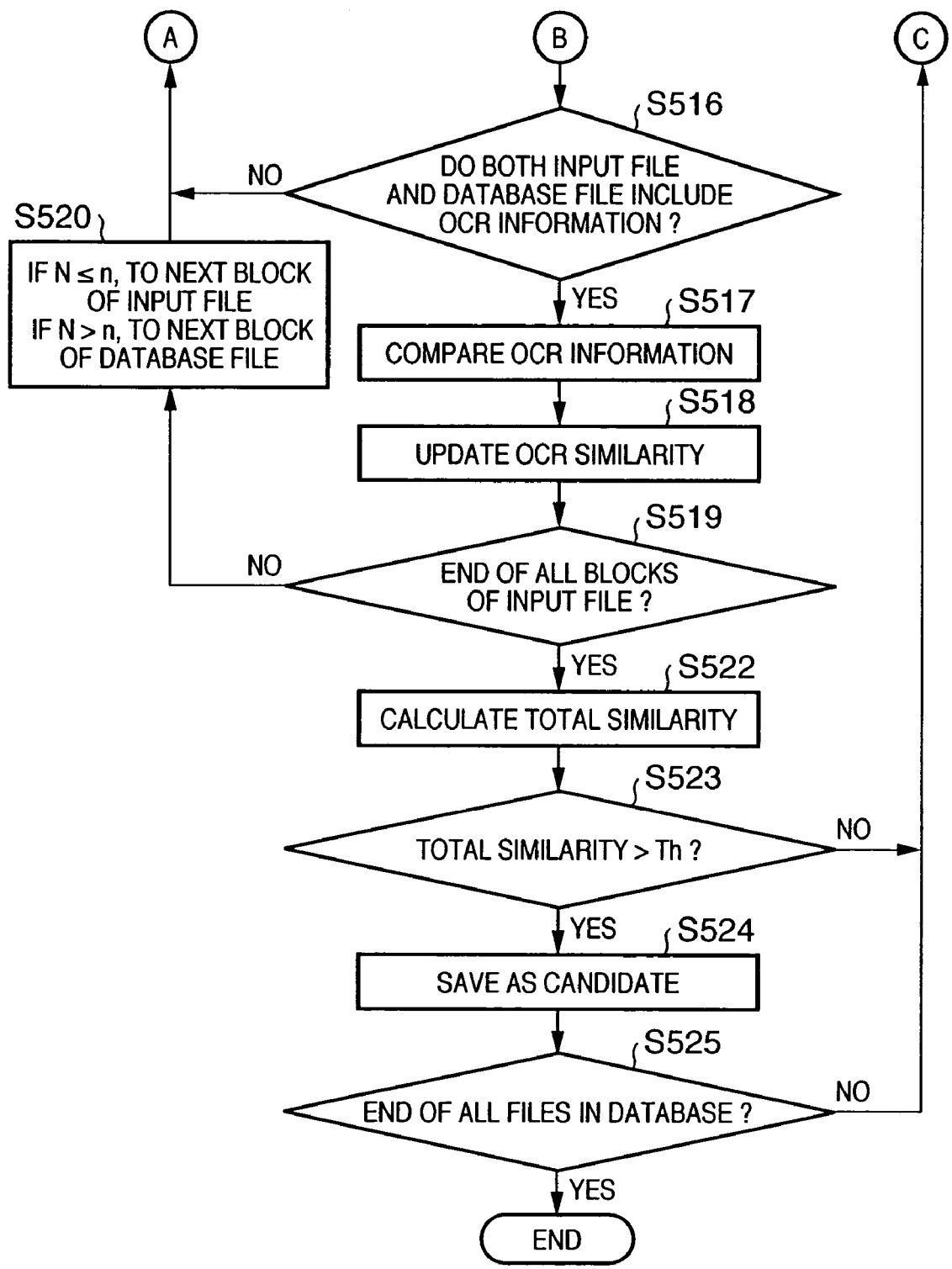

The file search process in step S126 in FIG. 3 will be described below using FIGS. 5, 10A and 10B.

The process in step S126 is done if an input document (input file) has no pointer information in step S124, if pointer information is available but no digital file is found or if a digital file is an image file in step S125.

Assume that blocks and an input file extracted as a result of step S122 have information (block information, input file information) shown in FIG. 5. As the information contents, a property, coordinate position, width and height, and availability of OCR information are exemplified. The property categorizes each block into one of text, line, photo, picture, table, and the like. For the same of simplicity, respective blocks are respectively named as blocks 1, 2, 3, 4, 5, and 6 in ascending order of coordinate X (i.e., X1<X2<X3<X4<X5<X6). The total number of blocks indicates that of those included in an input file, and is "6" in FIGS. 10A and 10B. FIGS. 10A and 10B are flow charts of a layout search of files similar to an input file from the database using these pieces of information. Assume that files stored in the database have the same kinds of information (block information, file information) as those in FIG. 5.

In the flow of this flow chart, an input file is compared in turn with those in the database. In step S510, similarity levels and the like (to be described later) are initialized. In step S511, the total numbers of blocks are compared. If YES in step S511, respective pieces of information of blocks in files are compared in turn. Upon comparing information of blocks, property, size, and OCR similarity levels are calculated in steps S513, S515, and S518, and a total similarity level is calculated based on these levels in step S522. Since a method of calculating each similarity level can use a known technique, a description thereof will be omitted. If it is determined in step S523 that the total similarity level is higher than a pre-set threshold value Th, that file is determined as a similar candidate in step S524. In FIGS. 10A and 10B, N, W, and H are respectively the total number of blocks, the block width, and the block height in an input file, and $\Delta N$, $\Delta W$, and $\Delta H$ are values which consider errors with reference to the block information of the input file. Also, n, w, and h are respectively the total number of blocks, the block width, and the block height in a file stored in the database. Although not shown, position information X, position information Y, and the like may be compared upon comparing sizes in step S514.

After that, database files which have similarity levels higher than the threshold value Th and are saved as candidates (step S524) are displayed as thumbnails or the like (step S127). If a plurality of candidates are displayed, a file is specified from these candidates by the operator's input operation.

<<Difference Extraction Process>>

The difference information extraction process in step S131 in FIG. 3 will be explained below.

Figure 20:
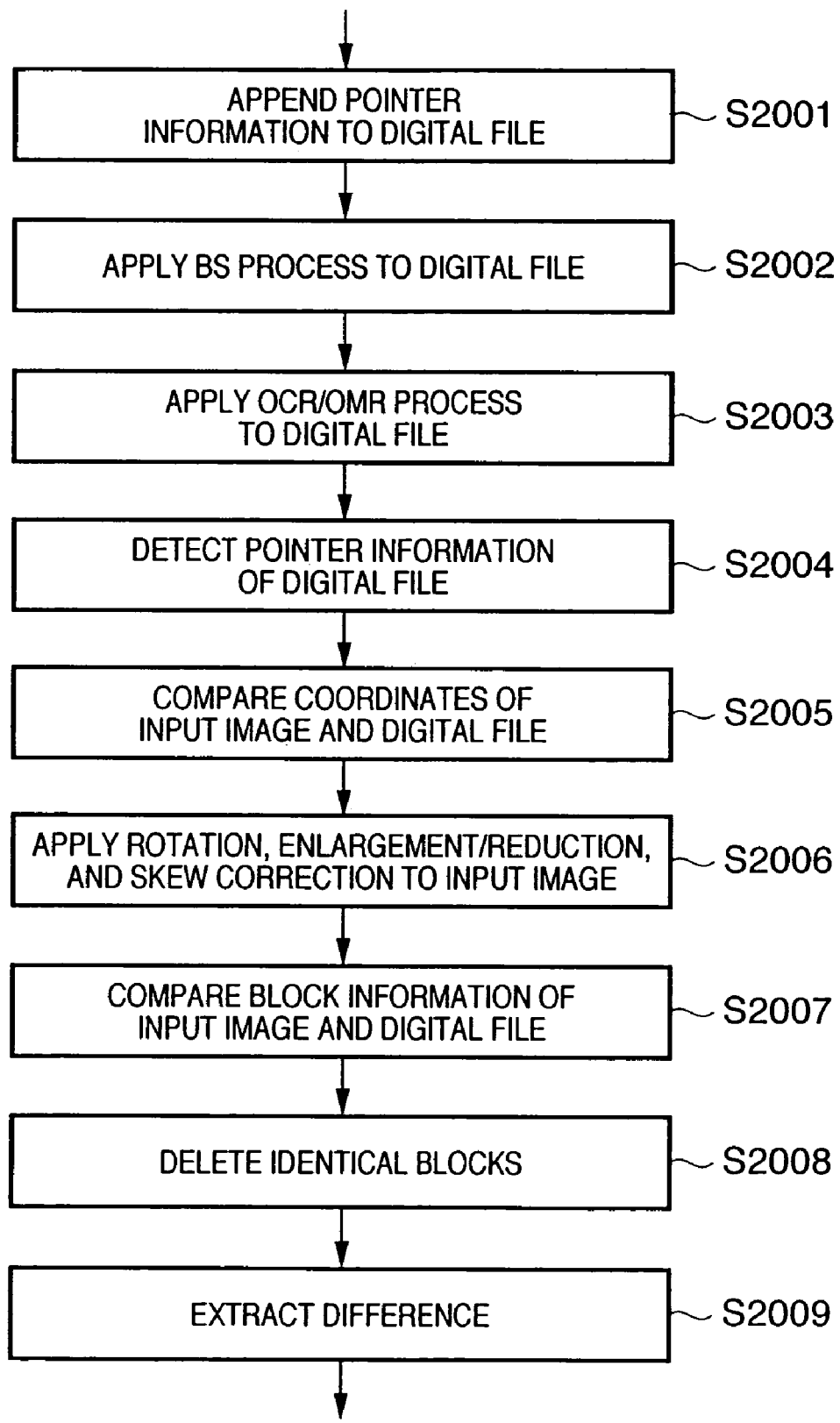
FIG. 20 is a flow chart showing a difference extraction process.

FIG. 20 is a flow chart showing an overview of the difference extraction process.

Referring to FIG. 20, an input image indicates that which is input as image information in step S120 in FIG. 3, and a digital file indicates an original digital file obtained in step S125 or S128 in FIG. 3. Since the input image has undergone the block selection process, OCR/OMR process, and pointer information detection process in steps S121, S122, and S123 in FIG. 3, block layout information after block selection shown in FIG. 4, block information shown in FIG. 5, and pointer information shown in FIG. 7 have already been acquired.

Figure 21:
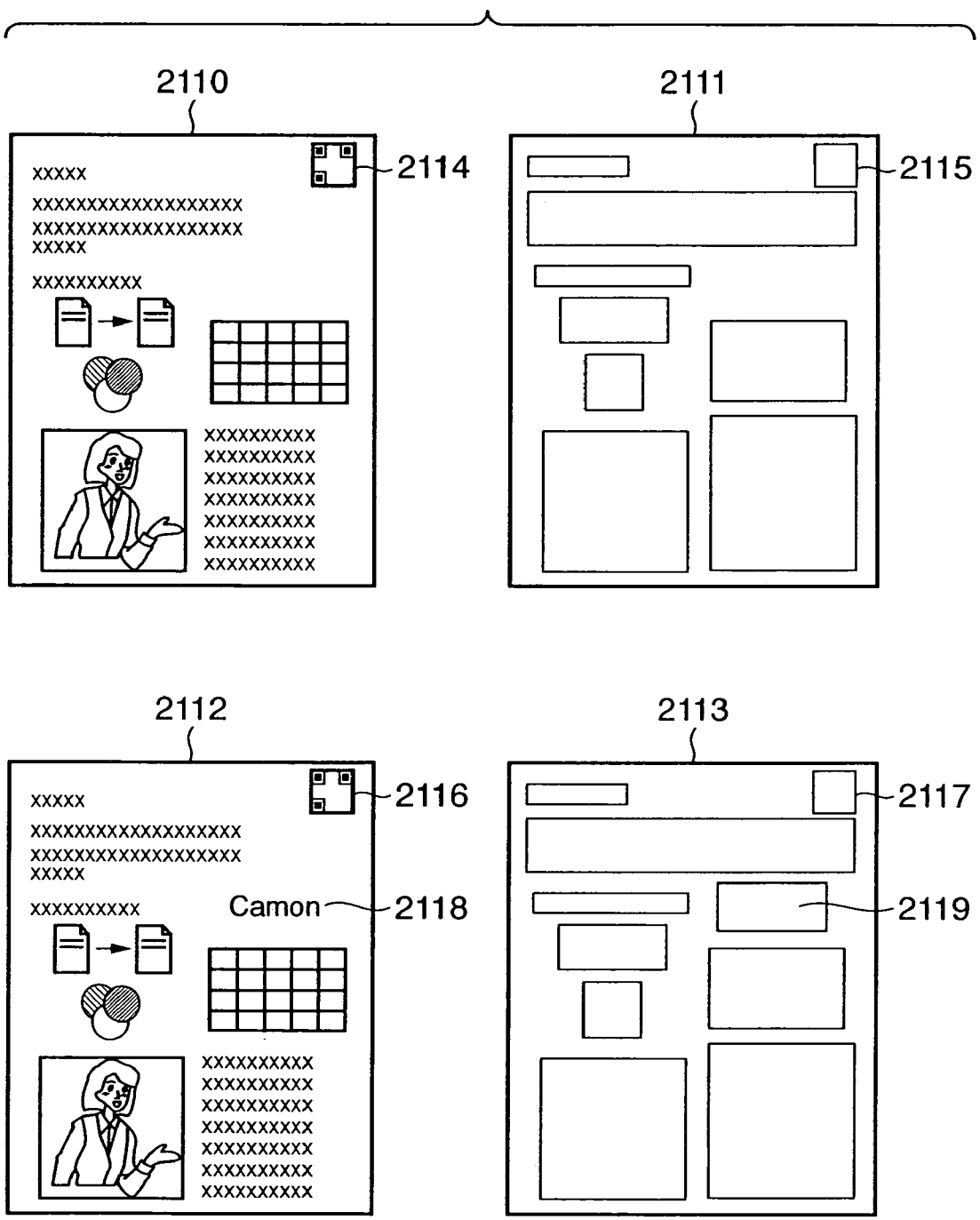
FIG. 21 is a view for explaining a difference extraction process.

FIG. 21 shows an example of the contents of image data of the digital file and input image, and their block selection results so as to explain difference extraction.

Referring to FIG. 21, reference numeral 2110 denotes the contents of the digital file; and 2111, block layout information obtained after the block selection process of the digital file 2110. Although not shown, block information shown in FIG. 5 is additionally stored. Reference numeral 2114 denotes a two-dimensional barcode indicating pointer information; and 2115, a block of the two-dimensional barcode after the block selection process.

Reference numeral 2112 denotes the contents of the input image; and 2113, block layout information obtained after the block selection process of the input image 2112. Although not shown, block information shown in FIG. 5 is additionally stored. Reference numeral 2116 denotes a two-dimensional barcode indicating pointer information; and 2117, a block of the two-dimensional barcode after the block selection process. Unlike the digital file 2110, the input image 2112 has an entry of handwritten characters 2118, and as a result of the block selection process, a handwritten character block 2119 is generated in the block layout information 2113.

Difference extraction will be explained below using FIGS. 20 and 21. In this embodiment, as has been explained in step S134 in FIG. 3, since pointer information is appended to a digital file as image data upon printing, no pointer information 2114 is appended to the digital file at the time of acquisition of digital data in step S125. Hence, in step S2001 the two-dimensional barcode 2114 as pointer information is appended to the digital file 2110 on the basis of the storage address of that digital file.

In step S2002, the digital file 2110 appended with the two-dimensional barcode 2114 indicating the pointer information as image data undergoes a block selection process. The block selection process is done in the same manner as the contents explained in FIG. 4. In the process described using FIG. 4, respective objects in an input image are recognized as clusters, the properties (text/picture/photo/line/table, etc.) of respective blocks are determined, and the input image is then segmented into regions having different properties. In step S2002, the same process is applied to the digital file 2110.

In step S2003, the respective objects obtained after the block selection process of the digital file 2110 undergo a known OCR/OMR process, which is the same as that in step S122 in FIG. 3).

In step S2004, the two-dimensional barcode 2114 indicating the pointer information, which is appended in step S2001, is detected from the digital file 2110, by the same process as that in step S123 in FIG. 3.

In step S2005, the directions, sizes, and the like of the input image 2112 and digital file 2110 are compared on the basis of the coordinate position of the two-dimensional barcode 2117 indicating the pointer information, which is obtained from the block layout information 2113 of the input image 2112 that has already been detected in step S123 in FIG. 3, and that of the two-dimensional barcode 2115 indicating the pointer information, which is obtained from the block layout information 2111 of the digital file 2110 that is detected in step S2004.

In step S2006, rotation, enlargement/reduction, skew correction, and the like are applied to the input image 2112 as needed on the basis of the comparison result in step S2005. These processes are applied not only to the image 2112 but also to the block layout information 2113 (and block information and pointer information) and the like after block selection.

Alternatively, the block layout information, block information, and pointer information may be updated by applying again a series of block selection process, OCR/OMR process, and pointer information detection process to the input image 2112 that has undergone rotation, enlargement/reduction, and skew correction.

In either case, after the process in step S2006, the direction and size of the input image 2112 are adjusted to those of the digital file 2110. In the example of FIG. 21, since the input image 2112 has the same direction and magnification as those of the digital file 2110, these processes may be skipped.

It is checked in step S2007 if each of blocks in the block layout information 2113 as the block selection processing result of the input image 2112 has the same contents as that in the block layout information 2111 as the block selection processing result of the digital file 2110. This checking process is done based on the block layout information, block information, and OCR/OMR information of these images. In FIG. 21, it is determined that the block 2119 of the handwritten characters 2118 in the input image 2112 is different from the digital file 2110.

In step S2008, blocks which are determined as same ones in step S2007 are erased from the input image. In FIG. 21, blocks other than the handwritten character block 2119 are erased.

In step S2009, the block which remains undeleted in step S2008 is extracted as difference image data between the input image 2112 and digital file 2110. In FIG. 21, image data 2118 corresponding to the handwritten character block 2119 is extracted as a difference.

<<Vectorization Process>>

The vectorization process in step S132 in FIG. 3 will be described in detail below.

In this process, a case wherein only the difference information extracted by the above process is to be vectorized, and a case wherein the entire image is to be vectorized if no digital file is specified in step S128 may be assumed. The latter case, i.e., vectorization of the entire image, will be explained first. In this case, the entire image is segmented into blocks by the aforementioned block selection process, and each block is vectorized.

<<Vectorization of Text Block>>

Initially, respective characters in a text block undergo a character recognition process. In the character recognition process, an image extracted for each character is recognized using one of pattern matching methods to obtain a corresponding character code. In this recognition process, an observation feature vector obtained by converting a feature acquired from a character image into a several-ten-dimensional numerical value string is compared with a dictionary feature vector obtained in advance for each character type, and a character type with a shortest distance is output as a recognition result. Various known methods are available for feature vector extraction. For example, a method of dividing a character into a mesh pattern, and counting character lines in respective meshes as line elements depending on their directions to obtain a (mesh count)-dimensional vector as a feature is known.

When a text region extracted by block selection (step S121) undergoes character recognition, the writing direction (horizontal or vertical) is determined for that region, lines are extracted in the corresponding directions, and character images are then obtained by extracting characters. Upon determining the writing direction (horizontal or vertical), horizontal and vertical projections of pixel values in that region are calculated, and if the variance of the horizontal projection is larger than that of the vertical projection, that region can be determined as a horizontal writing region; otherwise, that region can be determined as a vertical writing region. Upon decomposition into character strings and characters, in case of horizontal writing, lines are extracted using the horizontal projection, and characters are extracted based on the vertical projection for the extracted line. In case of a vertical writing text region, the relationship between the horizontal and vertical parameters may be exchanged. Note that a character size can be detected at that time.

Next, the font type of respective characters in the text block of interest is recognized. A plurality of sets of dictionary feature vectors for the number of character types used in character recognition are prepared in correspondence with character shape types, i.e., font types, and a font type is output together with a character code upon matching, thus recognizing the font of a character.

Using a character code and font information obtained by the character recognition and font recognition, and outline data prepared for each character code and font, information of a character part is converted into vector data. If an original document is a color document, the color of each character is extracted from the color image and is recorded together with vector data.

With the above processes, image information which belongs to a text block can be converted into vector data with a nearly faithful shape, size, and color.

<<Vectorization of Line Image Block, Picture Block, Etc.>>

Figure 11:
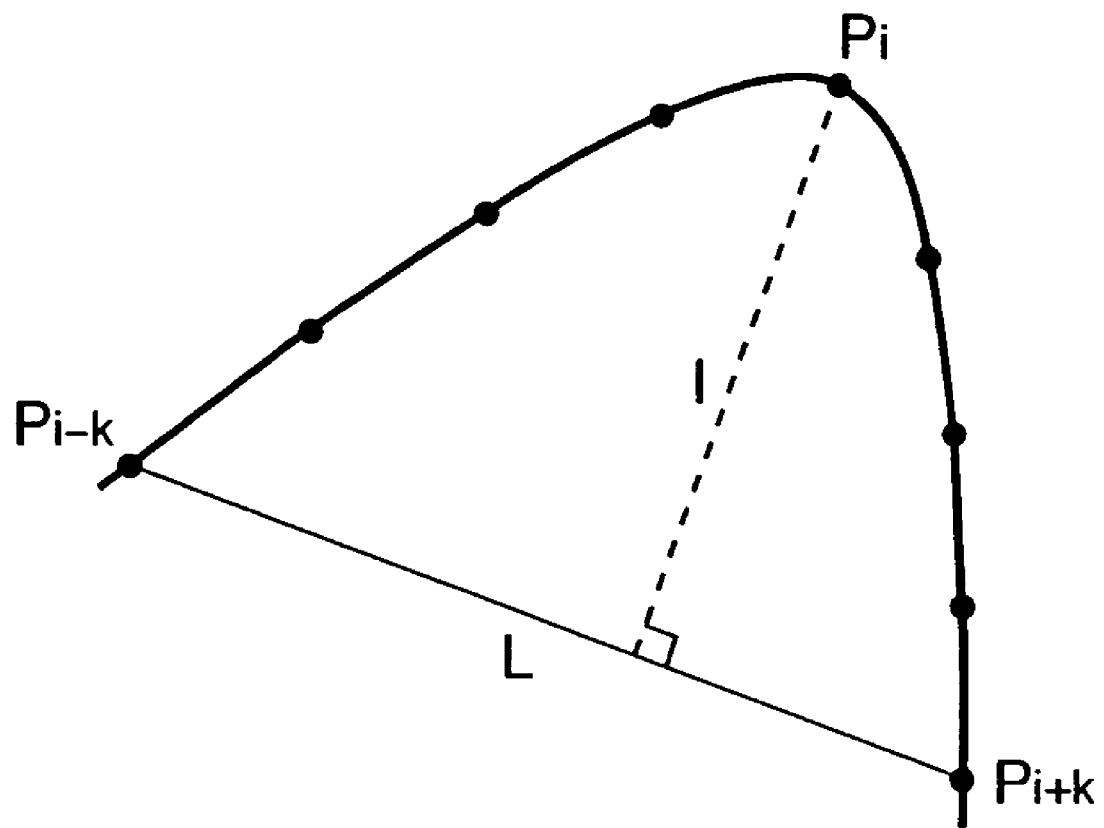
FIG. 11 is a view for explaining example 1 of a vectorization process.

For a region which is determined as a line image, picture, or table region by the block selection process (step S121), outlines of pixel clusters extracted in each region of interest are converted into vector data. More specifically, a point sequence of pixels which form an outline is divided into sections at a point which is considered as a corner, and each section is approximated by a partial line or curve. The corner means a point corresponding to a maximal curvature, and the point corresponding to the maximal curvature is obtained as a point where a distance between an arbitrary point Pi and a chord which is drawn between points Pi−k and Pi+k separated k points from the point Pi in the left and right directions becomes maximal, as shown in FIG. 11. Furthermore, let R be (chord length/arc length between Pi−k and Pi+k). Then, a point where the value R is equal to or smaller than a threshold value can be considered as a corner. Sections obtained after division at each corner can be vectorized using a method of least squares or the like with respect to a point sequence for a line, and a tertiary spline function or the like for a curve.

When an object has an inside outline, it is similarly approximated by a partial line or curve using a point sequence of a white pixel outline extracted by tracing the outline of white pixels.

As described above, using partial line approximation, an outline of a graphic with an arbitrary shape can be vectorized. When an original document has a color image, the color of a graphic is extracted from the color image and is recorded together with vector data.

Figure 12:
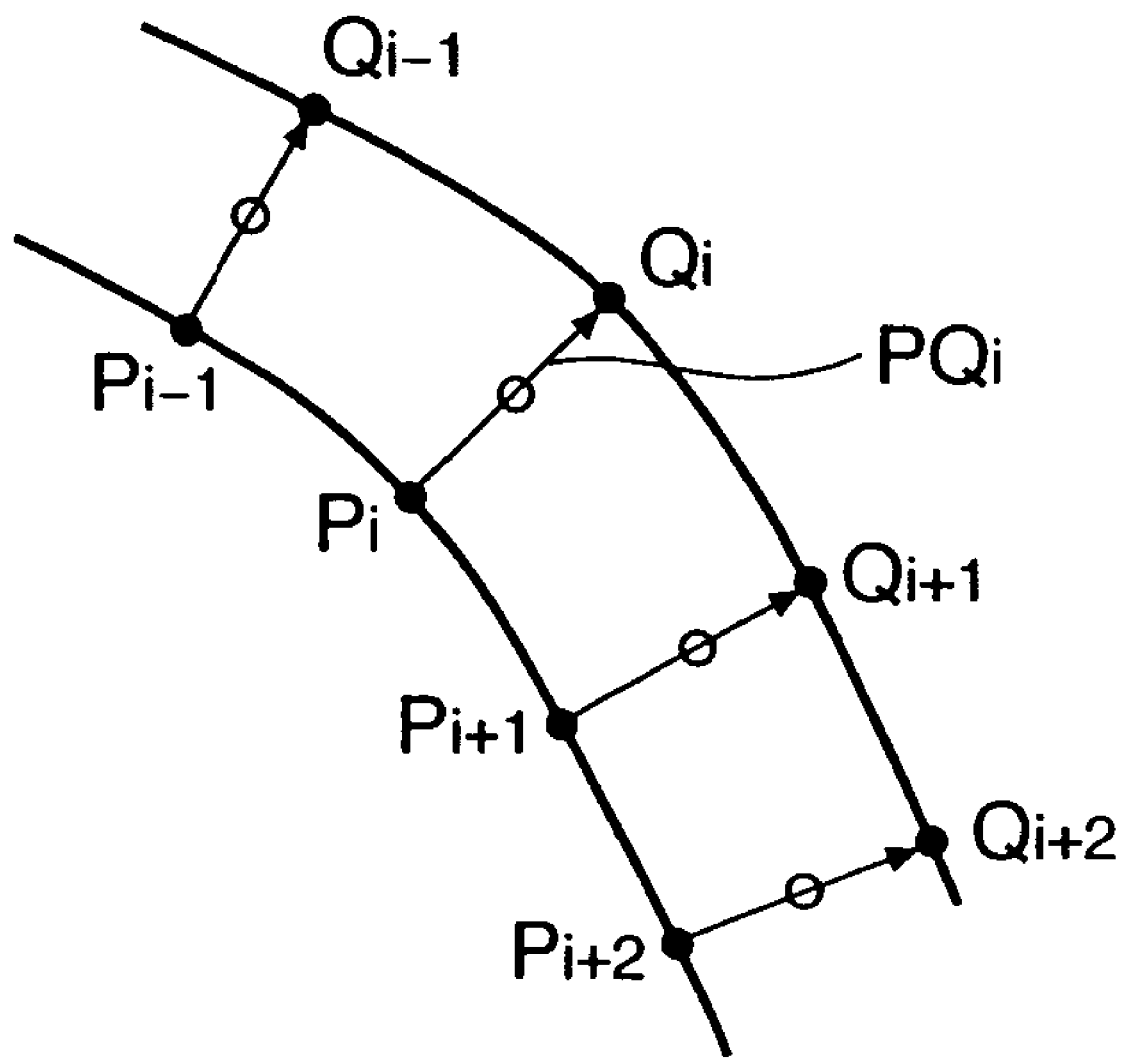
FIG. 12 is a view for explaining example 2 of a vectorization process.

Furthermore, when an outside outline is close to an inside outline or another outside in a given section, as shown in FIG. 12, two outlines may be combined to express a line with a given width. More specifically, lines are drawn from respective points Pi on a given outline to points Qi on another outline, each of which has a shortest distance from the corresponding point. When the distances PiQi maintain a constant value or less on the average, the section of interest is approximated by a line or curve using middle points Ri as a point sequence, and the average value of the distances PiQi is set as the width of that line or curve. A line or a table ruled line as a set of lines can be efficiently vectorized as a set of lines having a given width, as described above.

Note that vectorization using the character recognition process for a text block has been explained. A character which has the shortest distance from a dictionary as a result of the character recognition process is used as a recognition result. When this distance is equal to or larger than a predetermined value, the recognition result does not always match an original character, and a wrong character having a similar shape is often recognized. Therefore, such character is handled in the same manner as a general line image, as described above, and is converted into outline data. That is, even a character that causes a recognition error in the conventional character recognition process can be prevented from being vectorized to a wrong character, but can be vectorized based on outline data which is visually faithful to image data.

Note that a photo block cannot be vectorized, and is output as image data in this embodiment.

A process for grouping vectorized partial lines for each graphic object after the outline of a graphic with an arbitrary shape is vectorized, as described above, will be described below.

Figure 13:
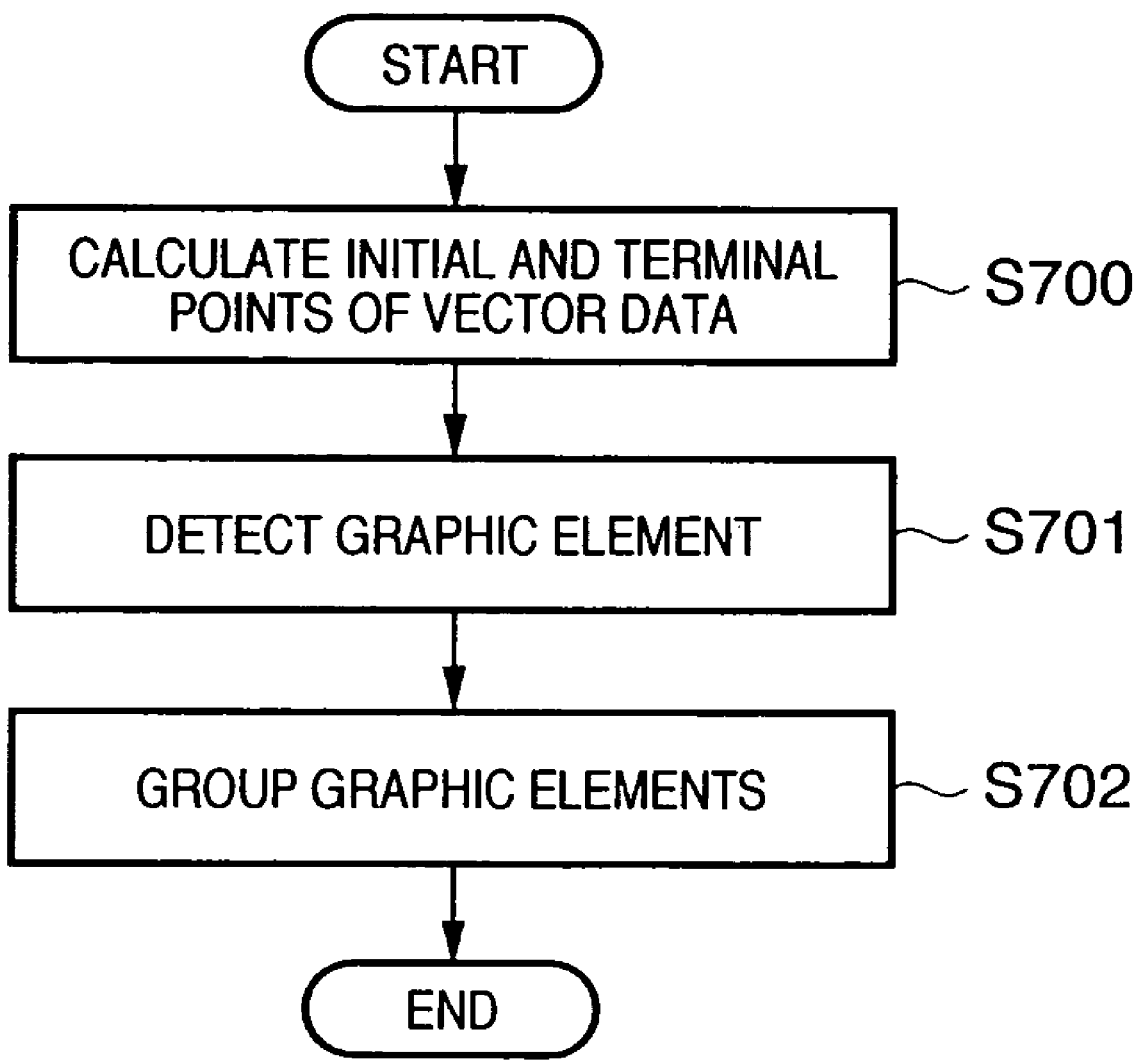
FIG. 13 is a flow chart showing a grouping process of vector data.

FIG. 13 is a flow chart until vector data are grouped for each graphic object. Initial and terminal points of each vector data are calculated (step S700). Using the initial point information and terminal point information of respective vectors, a graphic element is detected (step S701). Detecting a graphic element is to detect a closed graphic formed by partial lines. Such detection is made by applying the principle that each vector which forms a closed shape has vectors coupled to its two ends. Next, other graphic elements or partial lines present in the graphic element are grouped to set a single graphic object (step S702). If other graphic elements or partial lines are not present in the graphic element, that graphic element is set as a graphic object.

Figure 14:
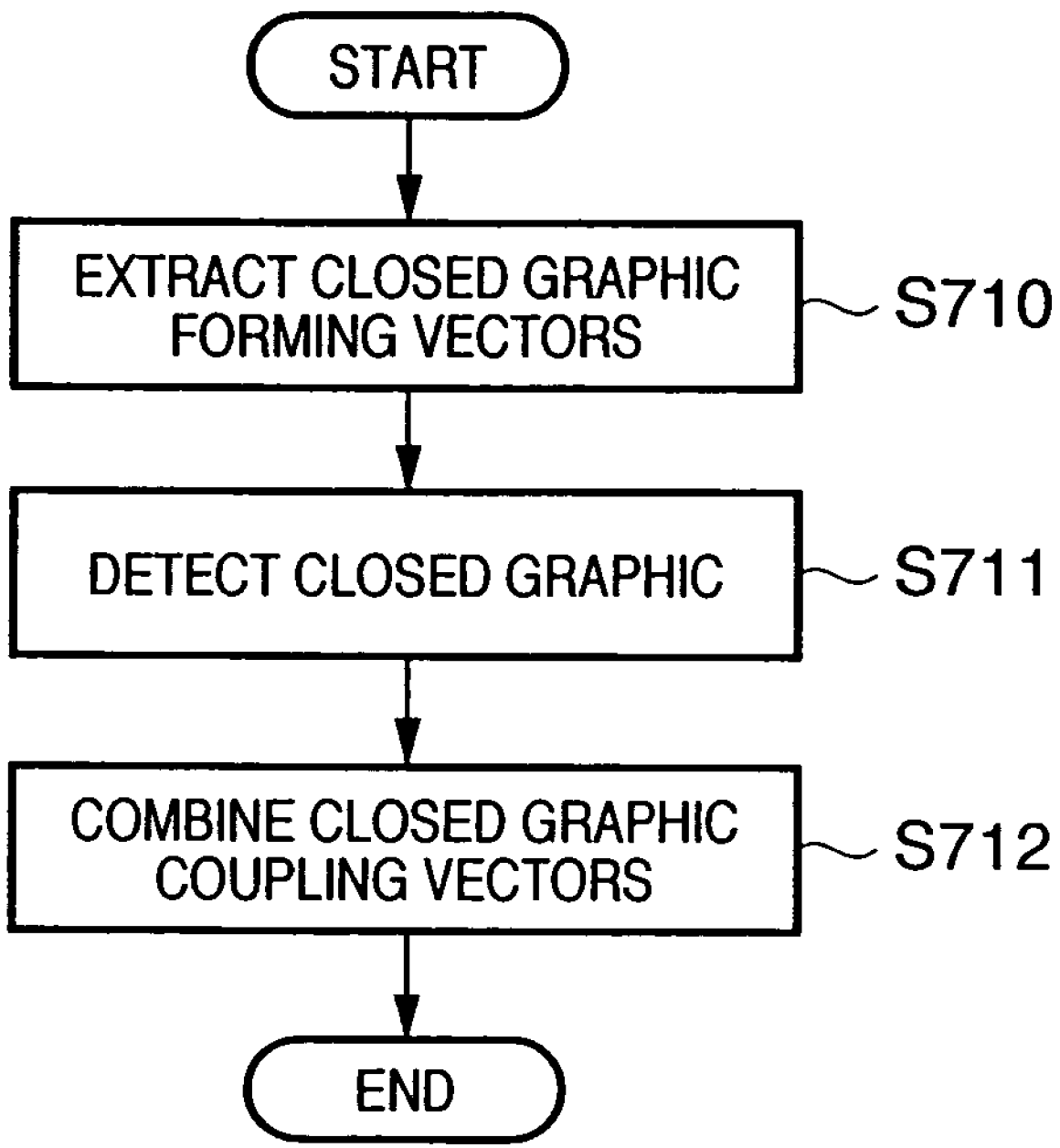
FIG. 14 is a flow chart showing a graphic element detection process.

FIG. 14 is a flow chart showing the process for detecting a graphic element. Closed graphic forming vectors are extracted from vector data by excluding unwanted vectors, two ends of which are not coupled to other vectors (step S710). An initial point of a vector of interest of the closed graphic forming vectors is set as a start point, and vectors are traced clockwise in turn. This process is made until the start point is reached, and all passing vectors are grouped as a closed graphic that forms one graphic element (step S711). Also, all closed graphic forming vectors present in the closed graphic are grouped. Furthermore, an initial point of a vector which is not grouped yet is set as a start point, and the above process is repeated. Finally, of the unwanted vectors excluded in step S710, those which join the vectors grouped as the closed graphic in step S711 are detected and are grouped as one graphic element (step S712).

With the above process, a graphic block can be handled as an independently re-usable graphic object.

<<Vectorization Process of Difference Information>>

The vectorization process of difference information extracted in FIG. 20 of that in step S132 will be explained below.

When difference information includes character images, it undergoes the same process as the aforementioned text block vectorization process. In this way, handwritten characters (e.g., the handwritten characters 2118 in FIG. 21) are converted into vector data or font data of characters after character recognition.

However, handwritten characters may often be recognized not as a text block but as thin lines, i.e., a line block, as a result of block selection. In such case, as in "vectorization process of line image block, picture block, etc.", outlines are detected to convert the characters into outline data, thus implementing vectorization based on outline data which are visually faithful to image data.

FIG. 21 exemplifies the handwritten characters 2118. The same applies to handwritten thin lines and drawings, which are converted into vector data by executing the vectorization process using outline data.

<<Composition Process of Difference Information and Digital File>>

Figure 22:
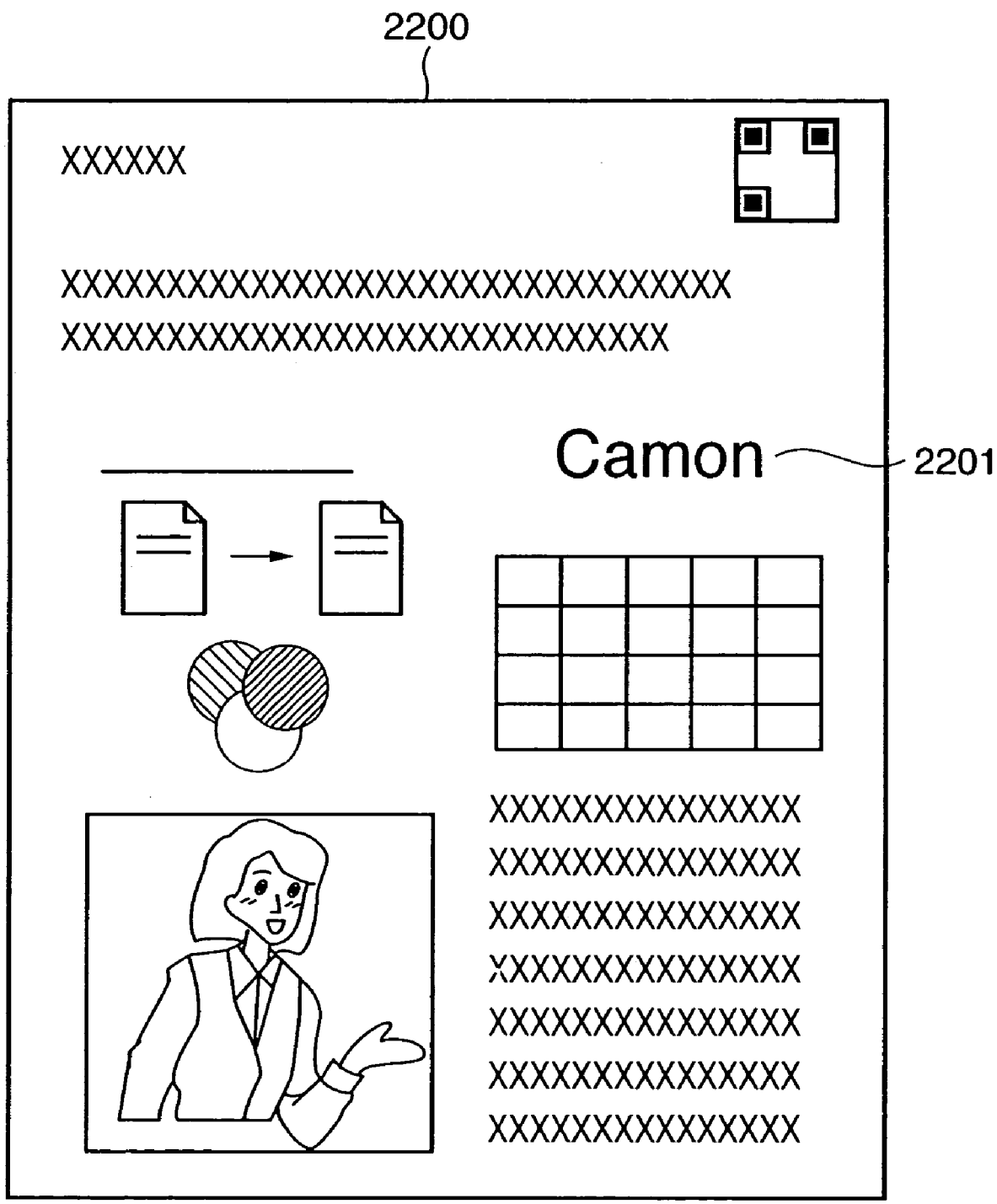
FIG. 22 is a view for explaining composition of a difference to an original file.

FIG. 22 shows an example obtained when vectorization of difference information is complete, and that difference information is composited to the original digital file, i.e., a state wherein the handwritten characters 2118 on the input image data 2112 in FIG. 21 are vectorized.

Referring to FIG. 22, reference numeral 2200 denotes new digital file data obtained after vector characters 2201 obtained by vectorizing the handwritten characters 2118 are composited to the digital file 2110 in FIG. 21.

As shown in FIG. 22, the handwritten characters 2118 are vectorized, and are composited to the original digital file 2110 as the vector characters 2201 which have a font and size most similar to the handwritten characters at the coordinate position in the block layout information 2113.

As described above, even when an input image contains handwritten characters or difference information which is different from an original digital file, difference information between the input image and digital file is extracted, and is vectorized. Then, the vectorized difference information is composited to the original digital file, the new digital file is saved, and that storage address is notified. In this way, the input image data can be converted into a digital file.

<<Conversion Process to Application Data>>

Figure 15:
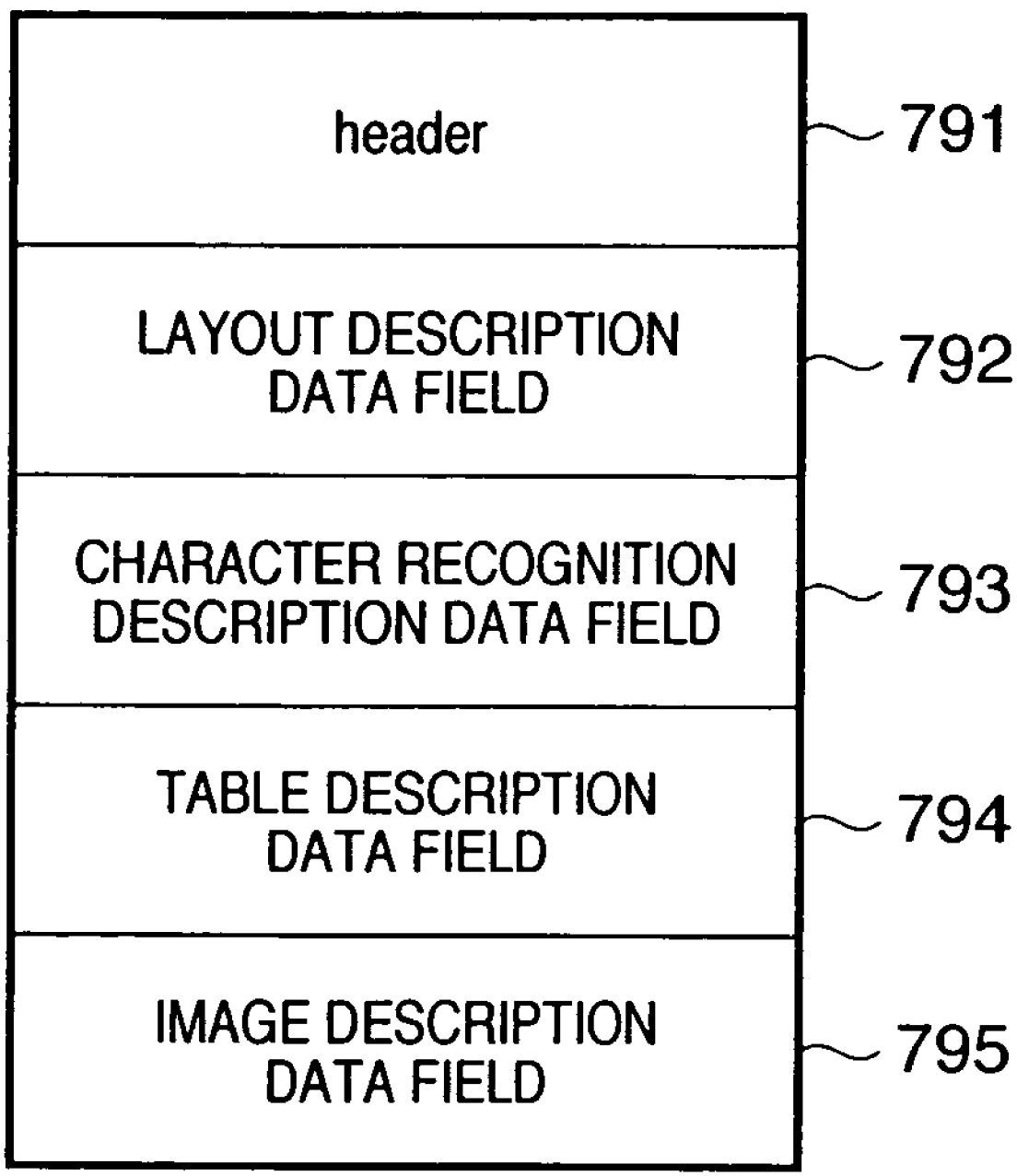
FIG. 15 shows the data structure of a DAOF.

The results after the vectorization process of input image data (step S132) are converted into a file of an intermediate data format, as shown in FIG. 15. Such intermediate data format will be referred to as a document analysis output format (DAOF) hereinafter.

FIG. 15 shows the data structure of the DAOF. Referring to FIG. 15, reference numeral 791 denotes a Header which holds information associated with document image data to be processed. A layout description data field 792 holds property information and block address information of respective blocks which are recognized for respective properties such as TEXT (text), TITLE (title), CAPTION (caption), LINEART (line image), PICTURE (natural image), FRAME (frame), TABLE (table), and the like. A character recognition description data field 793 holds character recognition results obtained by executing character recognition of TEXT blocks such as TEXT, TITLE, CAPTION, and the like. A table description data field 794 stores details of the structure of TABLE blocks. An image description data field 795 stores image data of PICTURE blocks, and the like extracted from the document image data.

Figure 16:
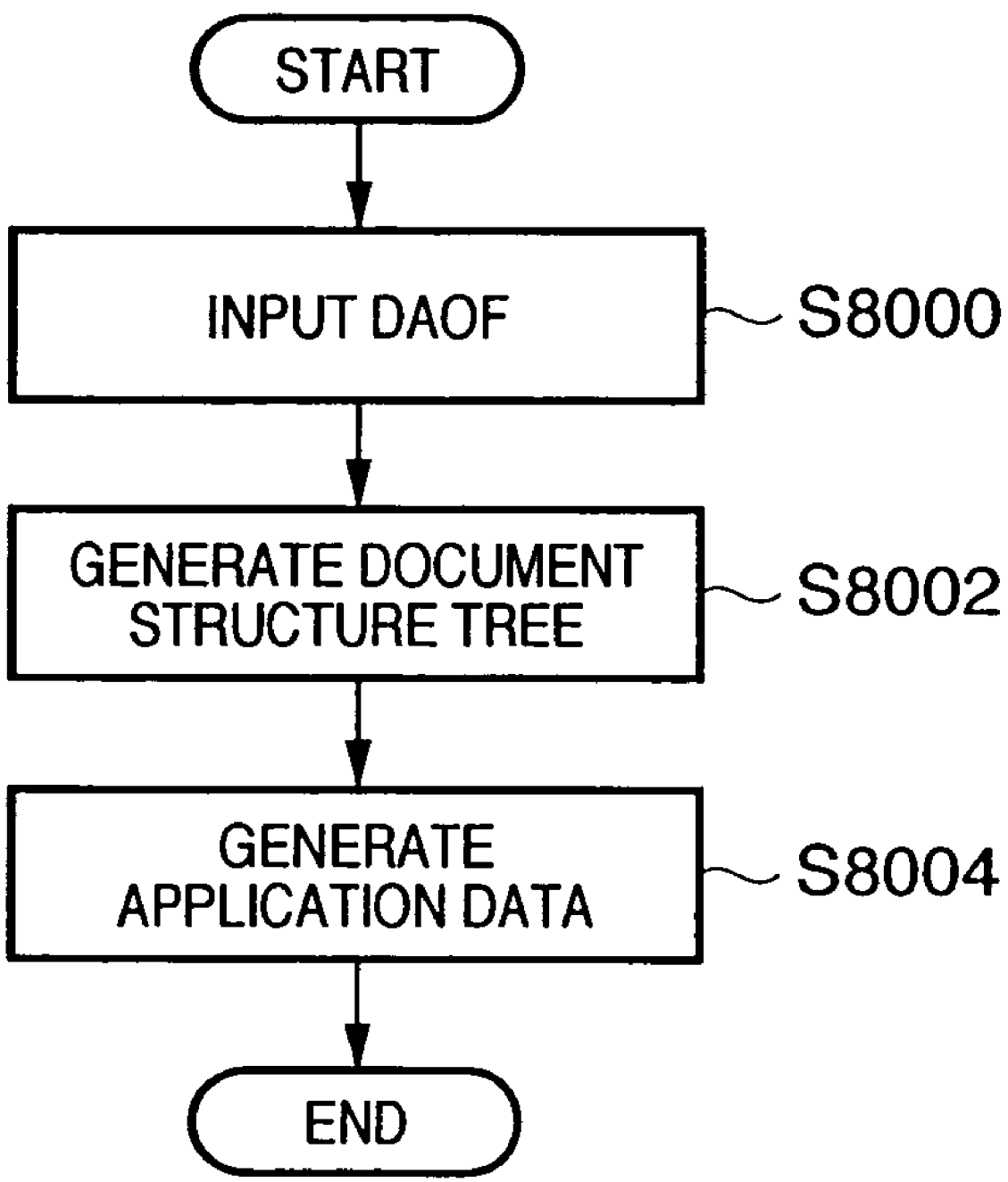
FIG. 16 is a flow chart showing an application data conversion process.

Such DAOF itself is often saved as a file in place of intermediate data. However, in the state of a file, a general document creation application cannot re-use individual objects. Hence, a process for converting the DAOF into application data (step S130) will be described in detail below using FIG. 16.

In step S8000, DAOF data is input.

In step S8002, a document structure tree which serves as a basis of application data is generated.

In step S8004, actual data in the DAOF are input based on the document structure tree, thus generating actual application data.

Figure 17:
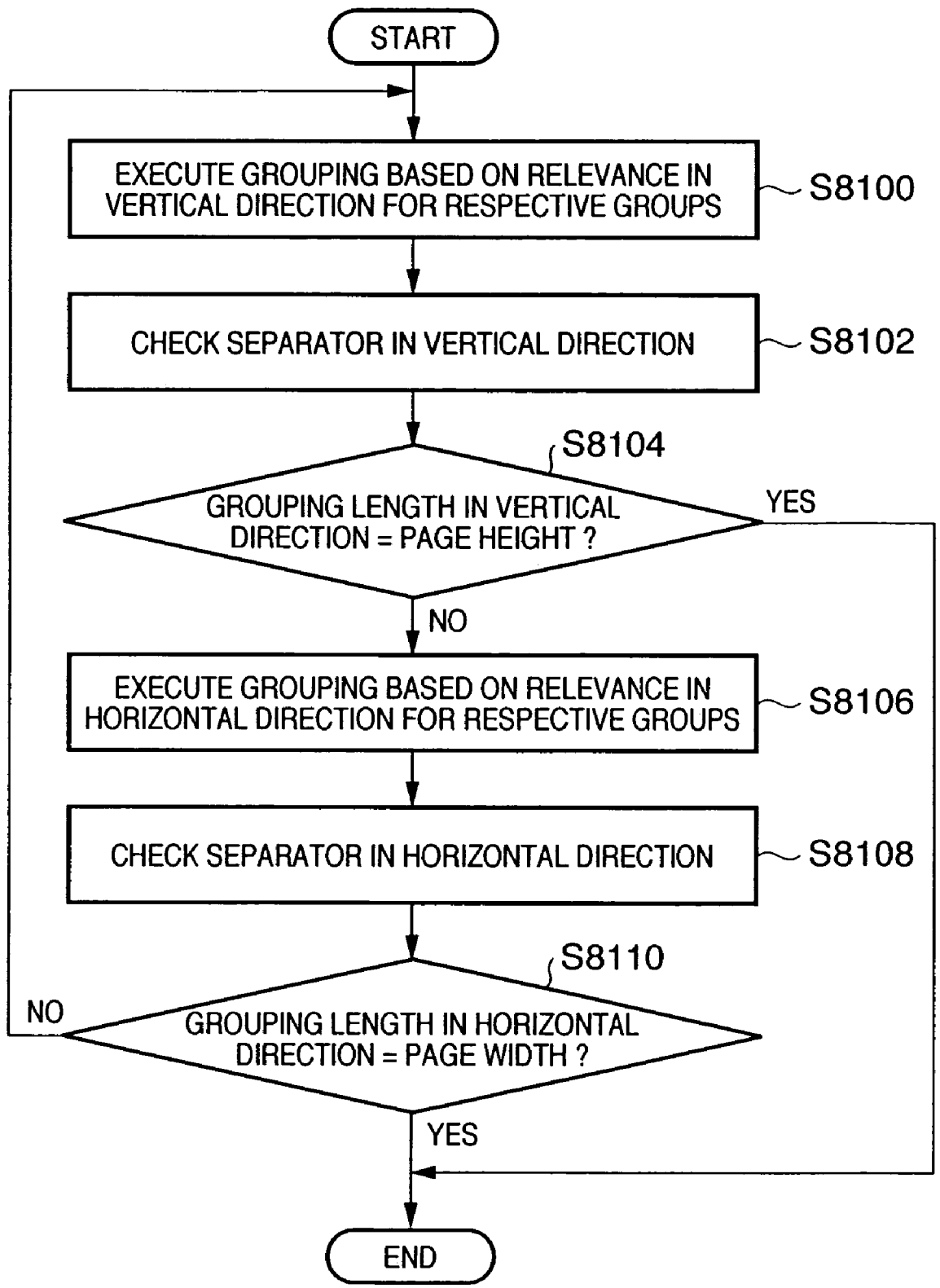
FIG. 17 is a flow chart showing a document structure tree generation process.
Figure 18A:
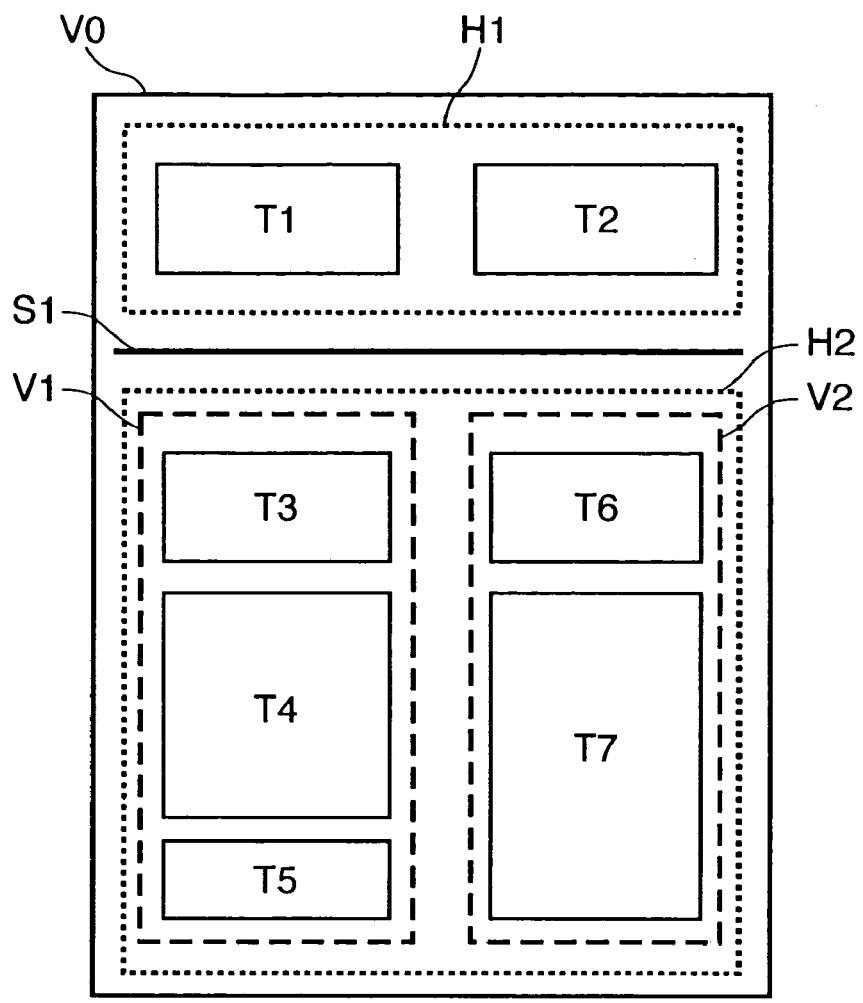
FIGS. 18A and 18B are views for explaining a document structure tree generation step.
Figure 18B:
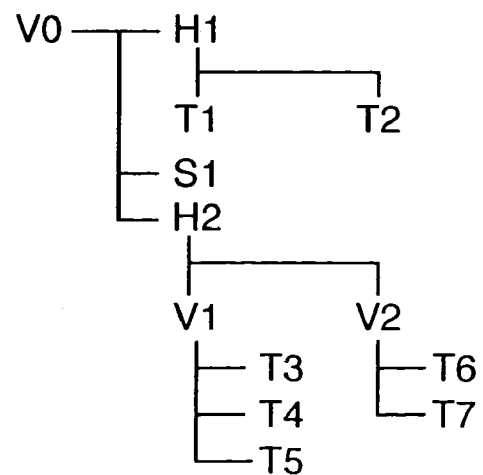

FIG. 17 is a detailed flow chart of the document structure tree generation process in step S8002, and FIGS. 18A and 18B are explanatory view of a document structure tree. As a basic rule of the overall control, the flow of processes transits from a microblock (single block) to a macroblock (a set of blocks). In this case, a block indicates a microblock and macroblock.

In step S8100, re-grouping is done for respective blocks on the basis of relevance in the vertical direction. Immediately after the flow starts, determination is made for respective microblocks. Note that relevance can be defined by checking if the distance between neighboring blocks is small, blocks have nearly the same block widths (heights in case of the horizontal direction), and so forth. Information of the distances, widths, heights, and the like can be extracted with reference to the DAOF.

FIG. 18A shows an actual page configuration, and FIG. 18B shows a document structure tree of that page. As a result of the process in step S8100, T3, T4, and T5 are determined to form one group V1, T6 and T7 are determined to form one group V2, and these groups are generated as those which belong to an identical layer.

In step S8102, the presence/absence of a vertical separator is checked. Physically, a separator is an object which has a line property in the DAOF. Logically, a separator is an element which explicitly divides blocks in an application. Upon detection of a separator, a group is re-divided in the identical layer.

It is then checked in step S8104 using a group length if no more divisions are present. If the group length in the vertical direction agrees with a page height (a distance between the uppermost and lowermost ends of a plurality of blocks present in the page of interest), the document structure tree generation process ends. In case of FIGS. 18A and 18B, groups V1 and V2 have no separator, and their group height does not agree with the page height. Hence, the flow advances to step S8106.

In step S8106, re-grouping is done for respective blocks on the basis of relevance in the horizontal direction. Definitions of relevance and its determination information are the same as those in the vertical direction.

In case of FIGS. 18A and 18B, T1 and T2 generate group H1, and V1 and V2 generate group H2. Groups H1 and H2 are generated as those which belong to an identical layer one level higher than V1 and V2.

In step S8108, the presence/absence of a separator in the horizontal direction is checked. Since FIGS. 18A and 18B include separator S1, that separator is registered in a tree, thus generating layers H1, S1, and H2.

It is checked in step S8110 using a group length if no more divisions are present. When the group length in the horizontal direction agrees with a page width, the document structure tree generation process ends.

Otherwise, the flow returns to step S8100 to repeat the processes from relevance check in the vertical direction in an upper layer by one level.

In case of FIGS. 18A and 18B, since the group length agrees with the page width (a distance between the leftmost and rightmost ends of a plurality of blocks present in the page of interest), the process ends, and uppermost layer V0 that represents the entire page is finally appended to the document structure tree.

After the document structure tree is completed, application data is generated based on that information in step S8004. A practical example in case of FIGS. 18A and 18B will be explained below.

That is, since H1 includes two blocks T1 and T2 in the horizontal direction, it is output as two columns. After internal information of T1 (with reference to the DAOF, text as the character recognition result, image, and the like) is output, a new column is set, and internal information of T2 is output. After that, separator S1 is output.

Since H2 includes two blocks V1 and V2 in the horizontal direction, it is output as two columns. Internal information of V1 is output in the order of T3, T4, and T5, and a new column is set. Then, internal information of V2 is output in the order of T6 and T7.

In this way, since the conversion process into application data can be done in the output order, for example, the converted application data can have a correct read order of text regions and the like.

<<Appending of Pointer Information>>

A process for printing pointer information appended in step S134 as image data will be described below.

Upon recording a stored document on a paper sheet, image data based on pointer information is additionally recorded. When various processes are to be made again using this document, original file data can be easily acquired.

Figure 19:
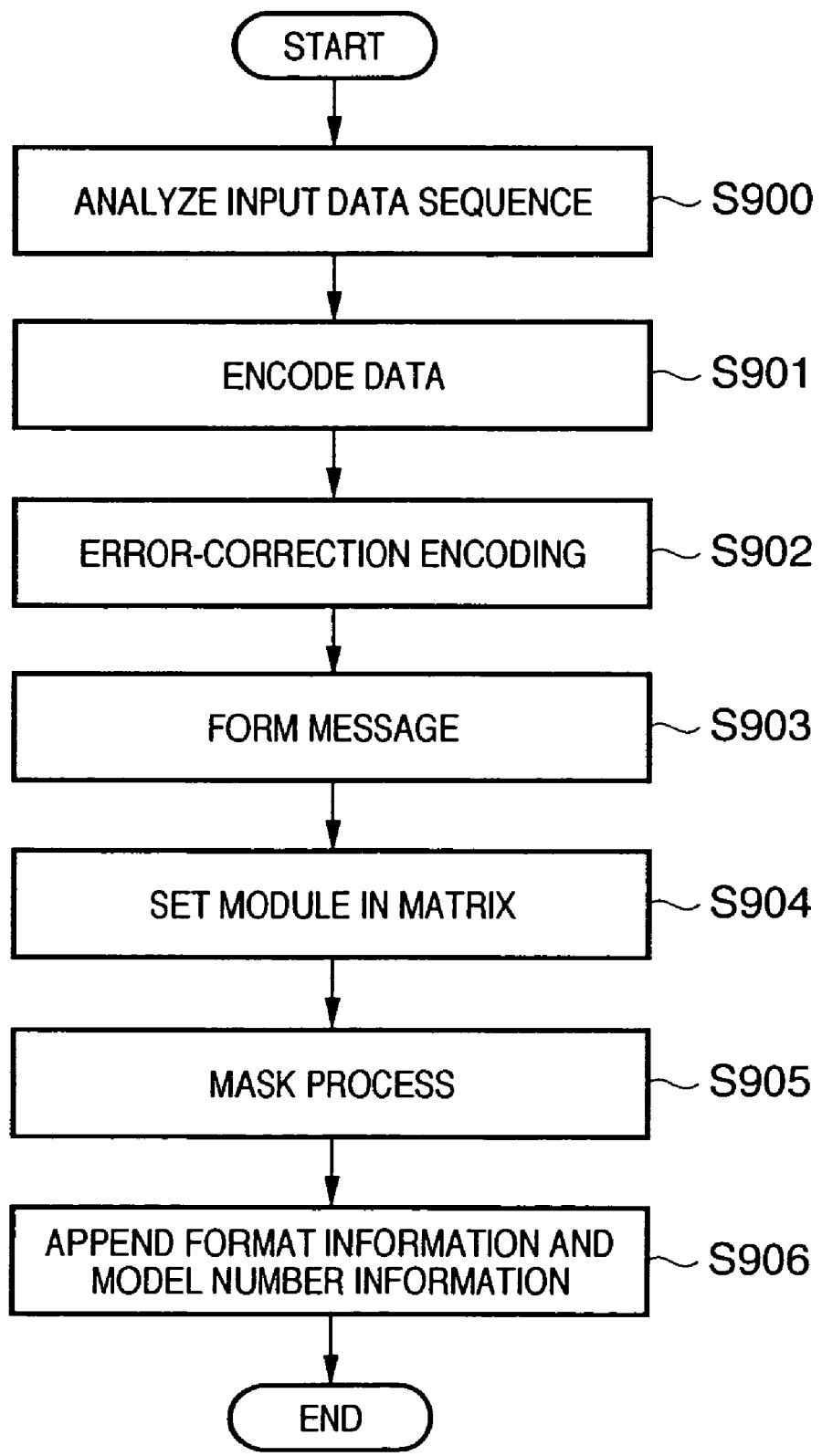
FIG. 19 is a flow chart showing a pointer information appending process.

FIG. 19 is a flow chart showing the sequence for encoding (imaging) a data character string as pointer information by a two-dimensional barcode (QR code symbol: JIS X0510), and appending the converted barcode into an image.

Data to be encoded in the two-dimensional barcode represents address information of the corresponding file, which is formed of, e.g., path information including a file server name and file name. Or the address information may be formed of a URL to the corresponding file, a file ID managed in the database 105 that stores the corresponding file or in a storage device of the MFP 100 itself, or the like.

In order to identify different types of characters to be encoded, an input data sequence is analyzed. Also, error detection and error correction levels are selected, and a minimum model number that can store input data is selected (step S900).

The input data sequence is converted into a predetermined bit sequence, and an indicator indicating a mode (numeric, alphanumeric, kanji, etc.) and an end pattern are appended as needed. Furthermore, the bit sequence is converted into predetermined bit code words (step S901).

At this time, for the purpose of error correction, the code word sequence is segmented into a predetermined number of blocks in accordance with the model number and error correction level, and error correction code words are generated for respective blocks and are appended after the data code word sequence (step S902).

The data code words of respective blocks obtained in step S902 are connected, and error correction code words and remainder code words as needed are connected after the data code word sequence (step S903).

Next, the code word module is set in a matrix together with a position detection pattern, separation pattern, timing pattern, alignment pattern, and the like (step S904).

Furthermore, a mask pattern optimal to the symbol encoding region is selected, and is converted by calculating XORs with the module obtained in step S904 (step S905).

Finally, type information and model number information are generated for the module obtained in step S905, thus completing a two-dimensional code symbol (step S906).

When a digital file from, e.g., the client PC 102 is to be formed as print data, i.e., a recorded image by the recording device 112, on a paper sheet, the aforementioned two-dimensional barcode that incorporates address information is converted into recordable raster data by the data processing device 115, and is appended to a predetermined position on raster data upon image formation. The user who received a paper sheet that has undergone image formation in this way scans that paper sheet by the image scanning unit 110, thus detecting the storage location of an original digital file from the pointer information in step S123.

As a method for appending additional information (address information), a method of directly appending pointer information to a document as a character string, and so-called watermarking methods including a method of embedding information by modulating the spacings of a character string in a document (especially, the spacings between neighboring characters), a method of embedding information in a halftone image in a document, and the like, can be applied in addition to the two-dimensional barcode described in this embodiment.

(Variation Applicable to First Embodiment)

<Another Embodiment Associated with Generation of Difference Information>

In the above description, the extracted difference information is composited to the original digital file to form a new digital file, and the new digital file is saved. Alternatively, the original digital file may be used as reference data for difference extraction, and the difference information may be extracted from input image information and may be saved as an independent file without being composited to the original digital file. Note that the difference information may be saved as an independent file in association with the original digital file, and may be composited to the original digital file upon printing it out.

In this manner, original digital information remains unchanged, and only difference information is saved as new digital data. Hence, redundancy, i.e., generation of many digital data with nearly the same contents, can be avoided.

<Another Embodiment Associated with Composition of Difference Information>

In this embodiment, a case will be explained below wherein additional writing or alteration of information in a stored original digital file can be inhibited. If an original digital file can be specified in step S125 or S128 in FIG. 3, difference information is extracted from the input image information using the original digital file in step S131. It is then checked in step S132 if that original digital file inhibits additional writing/alteration of information. If it is determined that additional writing/alteration of information is not inhibited, the difference information is vectorized and is composited to the original digital file. On the other hand, if it is determined that additional writing/alteration of information is inhibited, the difference information is vectorized, and image portions other than the difference information of the input image information are vectorized and stored. Upon outputting information, the difference information and images other than the difference information of the input image information are composited and output.

In this case as well, the original document is merely referred to for the purpose of difference extraction, and digital data is generated by vectorizing the input image. In this case, since additionally written difference information can be reliably extracted with reference to original data, the difference information can be handled as an independent object, thus improving usability upon re-using the data.

B. Second Embodiment

The arrangements of the image processing system and MFP according to this embodiment are the same as those in FIGS. 1 and 2 as in the first embodiment, and a detailed description thereof will be omitted.

<<Overview of Process>>

An overview of the entire image process according to the second embodiment will be described below using FIG. 23. Note that the processes in steps S2300 to S2308 in FIG. 23 are the same as those in steps S120 to S128 in FIG. 3, but all the steps will be explained in place of only different steps for the sake of easy understanding.

Figure 23:
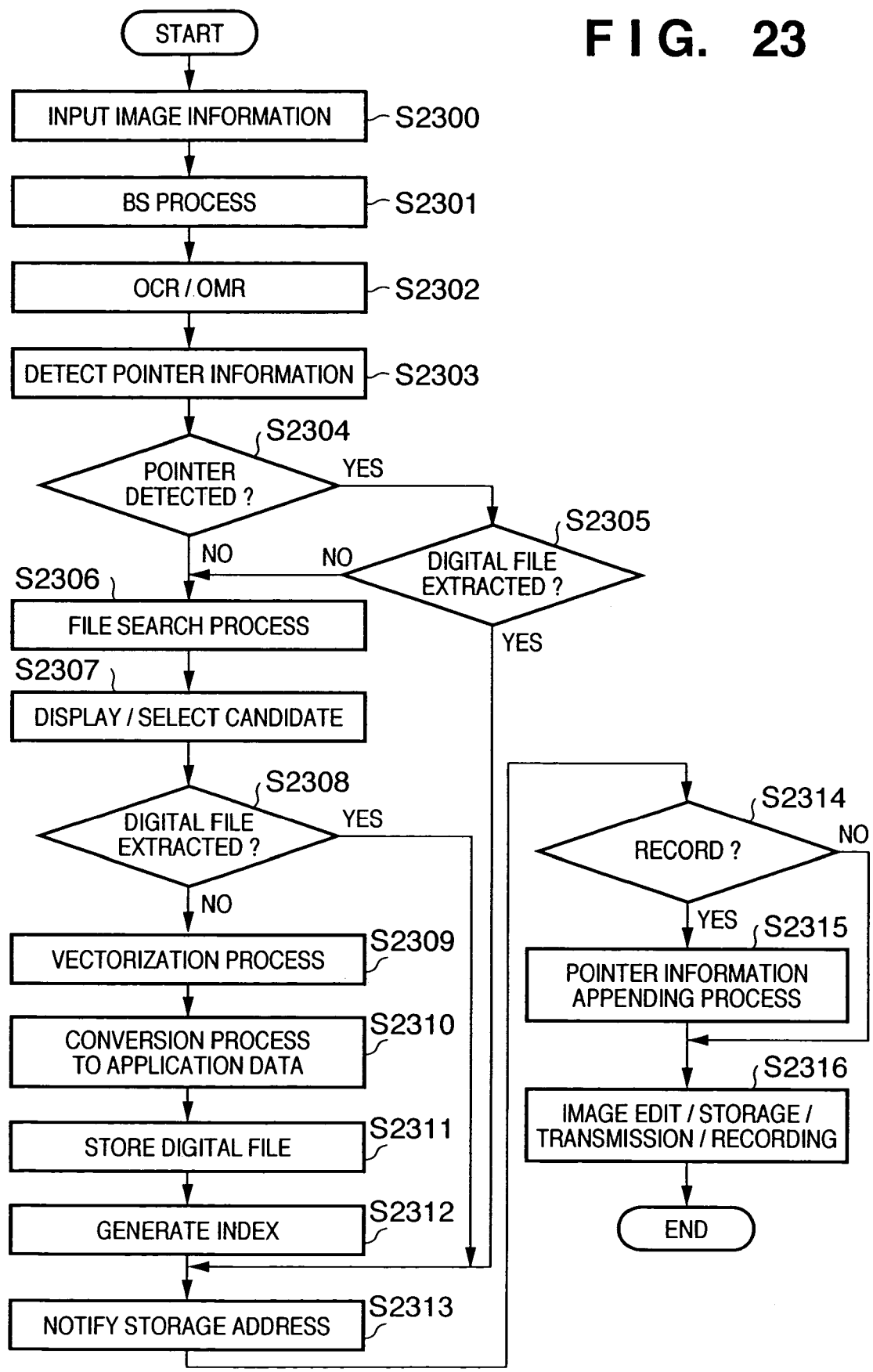
FIG. 23 is a flow chart showing an overview of the entire operation of an image process according to the second embodiment.

Referring to FIG. 23, the image scanning unit 110 of the MFP 100 (see FIG. 2) is enabled to scan one document in a raster order, and to obtain an 8-bit image signal of a 600 DPI in step S2300 associated with an image information input process. This image signal undergoes a pre-process by the data processing device 115, and is stored as image data for one page in the storage device 111. The CPU of the management PC 101 separates regions of a text/line image part and halftone image part from the stored image signal. The CPU further separates a text part into blocks combined as clusters for respective paragraphs, and a line image part into tables and graphics formed of lines, and converts these tables and graphics into segments. On the other hand, the CPU separates an image part expressed by halftone into rectangular blocks including a halftone image part, and segments the image part into independent objects for respective blocks (step S2301).

At this time, an object corresponding to a two-dimensional barcode or URL, which is recorded in the document image as additional information, is detected. In this case, the URL undergoes a character recognition process (OCR) or the two-dimensional barcode is decoded (OMR) (step S2302), thereby detecting pointer information in the storage device that stores an original digital file of that document (step S2303). As a method of appending the pointer information, a method of embedding information by slightly changing the spacings between neighboring characters, a method of embedding information in a halftone image as a digital watermark, or the like may be adopted.

If the pointer information is detected, the flow advances to step S2305 to search for an original digital file from the address designated by the pointer. The digital file is stored in one of a hard disk in the client PC, the database 105 managed by the document management server 106 connected to the LAN in the office 10 or 20, and the storage device 111 of the MFP 100 itself in FIG. 1, and these storage devices are searched in accordance with the address information obtained in step S2303. If no digital file is found or if the found file is a so-called image file represented by JPEG, PDF, or tiff in step S2305, or if the pointer information itself is not found in step S2304, the flow advances to step S2306. If the digital file is found based on the pointer information in step S2305, the flow advances to step S2313 to notify the storage address of the digital file.

Step S2306 is a so-called document search process routine. A full-text search is conducted by extracting words from the results of the OCR process which is executed for text blocks in step S2302, and comparing them with words contained in a digital file, or a layout search is conducted by comparing the layout and properties of respective objects with those of a digital file. As a result of the search process, if digital files with high similarity levels are found, digital files as candidates are displayed as thumbnails or the like (step S2307), and a file is specified from the plurality of candidates by an operator's input operation if necessary. If the digital file is specified, the flow jumps to step S2314. However, if the specified digital file is a so-called image file represented by JPEG, PDF, or tiff, the flow advances to step S2309. If only one file is found as a candidate, the flow may bypass step S2307 and advance to step S2308 to automatically determine the presence of a digital file. Then, the flow may jump to step S2313 to notify the storage address of the candidate file. If no digital file is found by the search process in step S2306, or if the found file is a so-called image file represented by JPEG, PDF, or tiff, the flow advances to step S2309.

Step S2309 is a conversion process from image data into vector data, i.e., image information is converted into a vectorized digital file. For each text block that has undergone the OCR process in step S2302, the size, style, and font of each character are recognized, thus converting the text block into font data which are visually faithful to characters obtained by scanning the document. On the other hand, table and graphic blocks formed of lines are converted into outline data. Each natural image block such as a photo or the like is processed as image data, i.e., an independent JPEG file. These vectorization processes are executed for respective objects, and layout information of the objects is saved. In step S2310, these objects and layout information are converted into application data which can be edited by a general application. In step S2311, the application data is stored in the storage device 111 as a digital file. Furthermore, in order to allow a direct search process of that digital file upon executing a similar process, index information for such search process is generated and is added to a search index file in step S2312. In step S2313, the storage address of the digital file is notified. Note that the data may be converted into an RTF (Rich Text Format) file that can embed vector data as a versatile file format in step S2310. Note that the application data file to be converted is not limited to the RTF format that allows object embedding. For example, data may be converted into other file formats such as an SVG (Scalable Vector Graphics) format and the like.

Furthermore, it is checked in step S2314 if a process to be executed is a recording process (a print process on a paper sheet). If it is determined that the user has instructed the recording process, the flow advances to step S2315 to append pointer information (two-dimensional barcode or the like) indicating the storage address to the file as image data. In step S2316, a print process is executed. On the other hand, if it is determined in step S2314 that the process to be executed is a process (an image edit process, a storage process in another storage medium, a transmission process to another device, or the like) other than the recording process, the flow jumps to step S2316 without appending any pointer information, thus executing the designated process.

As described above, when a digital file cannot be specified, image information is vectorized and is stored as a digital file. Hence, the information size can be reduced compared to a case wherein image data is directly stored. Hence, the storage efficiency can be improved, or the transmission time can be shortened upon transmission. In addition, a high-quality image can be reproduced upon recording.

Since details of the respective processing blocks are the same as those in the first embodiment, a description thereof will be omitted. More specifically, the block selection process in step S2301, the OCR/OMR process (including the pointer information detection process) in step S2302, the file search process using pointer information in step S2305, the file search process in step S2306, the vectorization process in step S2309, the vectorization process of text blocks, the vectorization process of line image blocks, picture blocks, and the like, the conversion process into application data, and the pointer information appending process are the same as those in the first embodiment.

<Variations Commonly Applicable to First and Second Embodiments>

Figure 9:
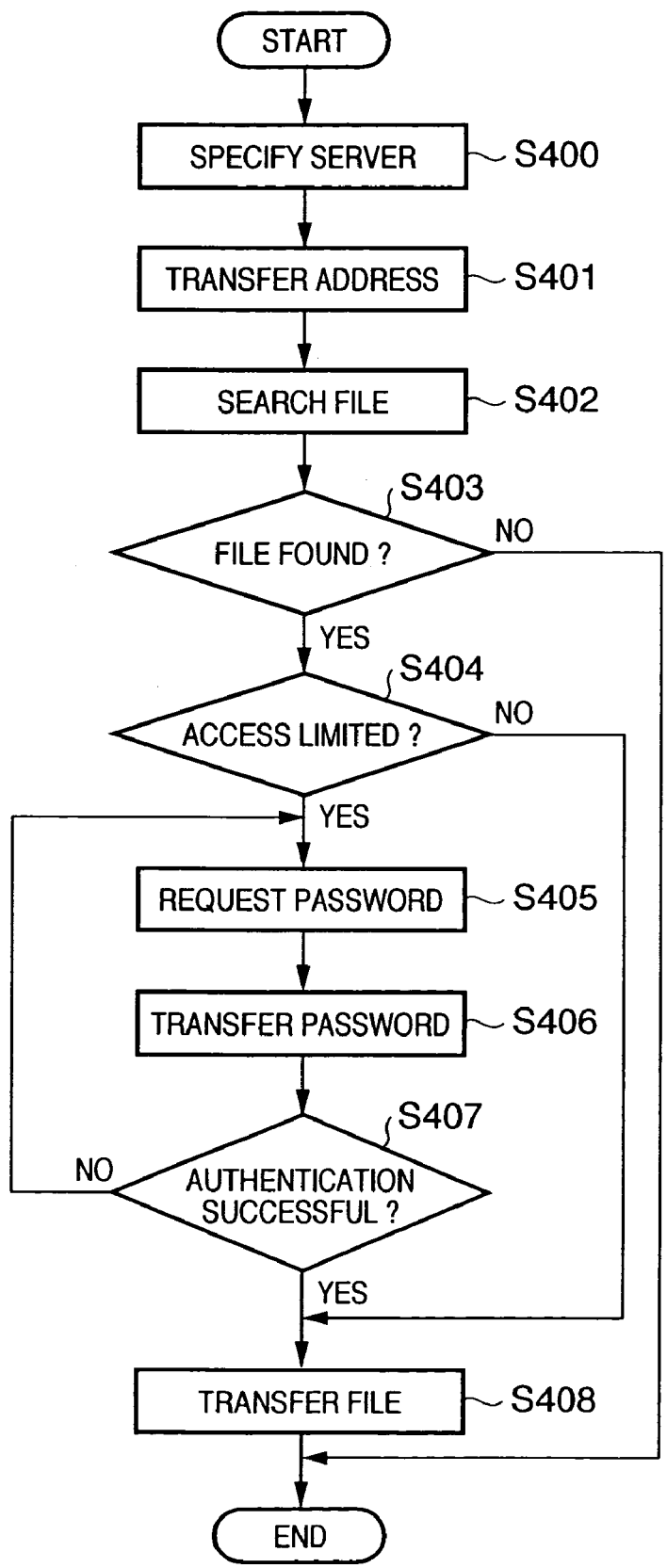
FIG. 9 is a flow chart showing an access-limited file search process.

Re-use of some of our document files by a third party must often be limited. The above embodiments have been explained under the condition that all files stored in the file server can be freely accessed, and the entire file or some objects of the file are re-usable. Hence, another embodiment associated with a case wherein when a file is searched for using pointer information in the above embodiment, the access right of a file that can be specified as a result of the search is limited will be described below using FIG. 9. Since steps S400 to S403 are the same as those in the embodiment, a description thereof will be omitted. If a file is specified in step S403, the file server checks access right information of that file in step S404. If the access right of that file is limited, the file server requests the MFP to transmit a password (step S405).

The MFP prompts the operator to input a password, and transmits the input password to the file server (step S406).

The file server collates the received password to make authentication (step S407). If authentication has succeeded, the server notifies the file address (step S129 or S2313), as has been explained using FIG. 3, and transfers a file to the MFP if the process that the user wants is acquisition of image file data (step S408).

Note that the authentication method for access right control is not limited to the method using the password in steps S405 and S406. For example, various other authentication means such as popular biological authentication (e.g., fingerprint authentication), authentication using a card, and the like can be adopted.

In this embodiment, a file is specified by pointer information additionally given to a paper document. The same control can be applied to a case wherein a file is specified by the search process in steps S126 to S128 in FIG. 3.

Also, the vectorization process explained in steps S129 in FIG. 3 can be limited. That is, when a limitation of the access right to a given paper document is detected based on a watermark or the like from image information obtained by scanning that paper document, the vectorization process is executed only when authentication is successful, thus limiting use of documents with high secrecy.

<Another Embodiment Associated with File Specification>

In the above embodiment, means for specifying original file data from image information obtained by scanning a document specifies a document based on pointer information appended to the document or searches for a corresponding digital file on the basis of each object information described in the document, as has been described using FIG. 3. In order to specify an original file more accurately, a digital file that meets both of these means can be specified. That is, even when the presence of an original file can be detected based on pointer information obtained from a document, a layout search according to layout information or a full-text search based on a keyword obtained by character recognition is also conducted for the detected file using object information in the document, and a file that can yield a high matching rate is formally specified as an original file. For example, even when the lower-bit part of pointer information is doubtful and cannot be corrected by error correction, a file can be specified by narrowing down the search range. Therefore, a file can be quickly and accurately specified.

<Another Embodiment of Vectorization>

In the above embodiment, when search means cannot specify an original file, the entire document image undergoes a vectorization process. For example, in case of a general document, not all objects in the document are newly created, and some objects may be diverted from other files. For example, a document creation application prepares some patterns of background objects (wallpapers), and the user normally selects and uses one of these patterns. Hence, such object is more likely to be present in other document files in the document file database as re-usable vector data.

Hence, as another embodiment of the vectorization process in step S129 in FIG. 3, the database is searched for a file which includes an object which substantially matches each of individual objects segmented by the block selection process, and vector data of the matched object is individually acquired from that file. As a result, the input document can be vectorized more quickly, and deterioration of image quality due to vectorization can be prevented.

On the other hand, in FIG. 3, when an original file can be specified as a PDF in the search process in steps S126 to S128, that PDF often has, as an additional file, character codes obtained by already applying character recognition to text objects in that document. Upon vectorizing such PDF file, if the character code file is used, a character recognition process in the vectorization process in step S129 and subsequent steps can be skipped. That is, the vectorization process can be done more quickly.

As described above, according to the present invention, difference information (additionally written information which is not present in an original file) between input image information and an original digital file can be extracted.

Since the extracted additionally written information and original digital file are composited to form a new digital file, and the new digital file is saved, a high-quality digital file formed by appending the additionally written information to original data can be generated.

Since the additionally written difference information also undergoes a vectorization process, re-usability and editability can be greatly improved as well as those of additionally written information. Furthermore, the required storage capacity can be reduced.

Furthermore, according to the present invention, if no original digital data is found, an input image is converted into vector data, and the vector data is stored, thus allowing easy re-use. Since the input image is converted into vector data, the storage capacity can be reduced.

If original digital data is found, that original digital data is used, thus minimizing deterioration of image quality.

C. Third Embodiment

Since the same image processing system and MFP 100 as those in the first embodiment can be applied, a description thereof will be omitted.

<<Overall Flow of Image Processing Method>>

Figure 24:
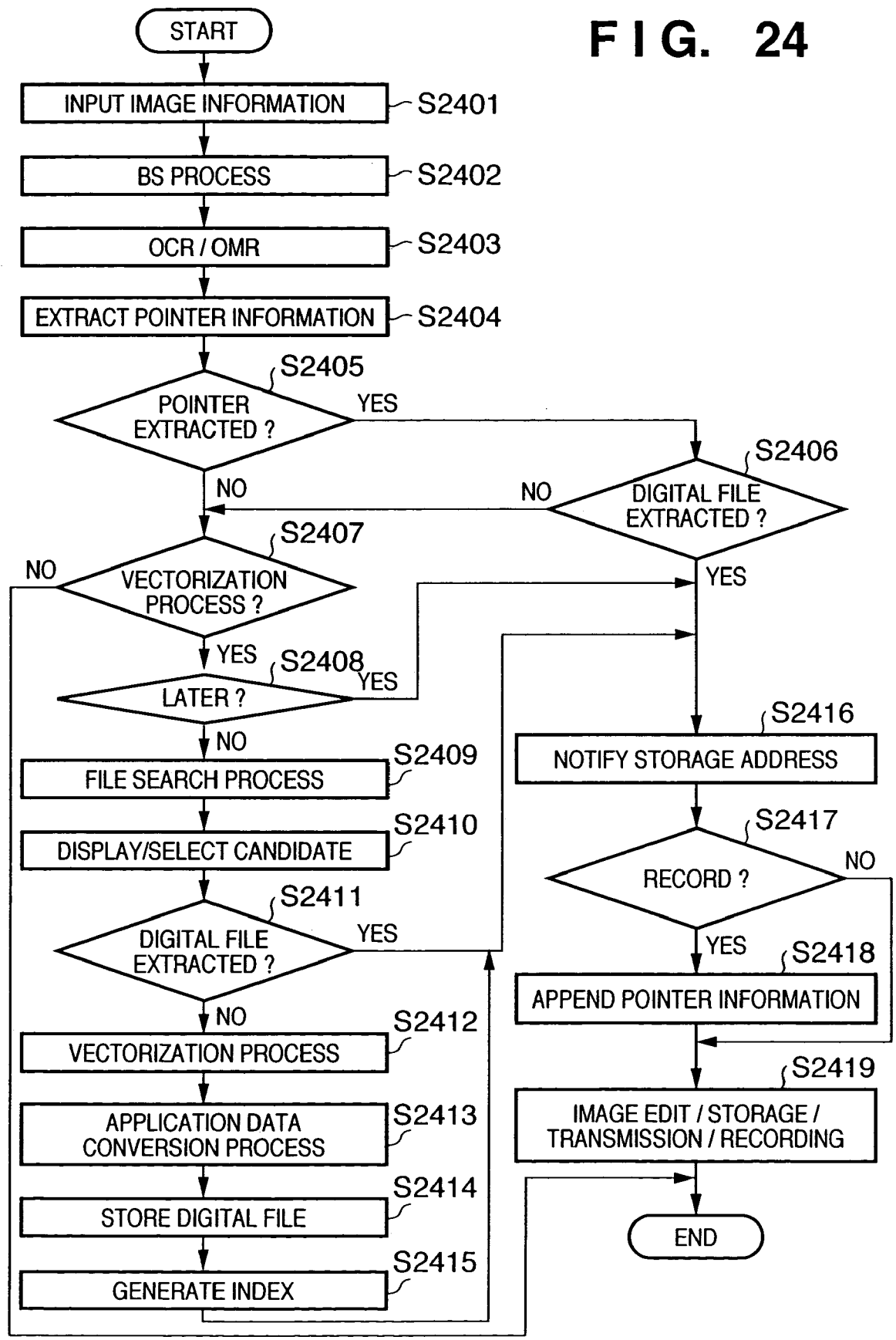
FIG. 24 is a flow chart showing an overview of the entire operation of an image process according to the third embodiment.

The third embodiment of the image processing method according to the present invention is implemented by respective steps in FIG. 24. Note that FIG. 24 includes the same processes as those included in the flow chart of FIG. 3, but they will be explained without being omitted for the sake of easy understanding.

Step S2401: The image scanning unit 110 of the MFP 100 is enabled to scan one document in a raster order, and to obtain an 8-bit image signal of a 600 DPI in an image information input process. The scanned image signal undergoes a pre-process by the data processing device 115, and is stored as image data for one page in the storage device 111. The flow advances to step S2402.

Step S2402 (block selection step): The management PC 101 separates regions of image data stored in the storage device 111 into a text/line image region including text or line images, a halftone photo region, a picture region with an indeterminate form, and the like. Furthermore, the text/line image region is further separated into a text region that mainly includes characters, and a line image region including a table, graphic, and the like. The line image region is further separated into table and picture regions. Note that this embodiment detects coupled pixels, and segments image data into regions for respective properties using the shapes, sizes, pixel densities, and the like of circumscribing rectangular regions of the coupled pixels. However, any other region segmentation methods may be used.

The text region is segmented into rectangular blocks (text region rectangular blocks) combined as clusters for respective paragraphs of text. The line image region is segmented into rectangular blocks for individual objects such as a table, graphic, and the like (table region rectangular block, line image region rectangular block).

A photo region expressed by halftone is segmented into rectangular blocks for respective objects such as an image region rectangular block, background region rectangular block, and the like.

Information of these rectangular blocks will be referred to as "region segmentation information" hereinafter.

Step S2403: An OCR/OMR process is executed to determine whether or not pointer information of an original data file is embedded in the input image.

An object corresponding to a two-dimensional barcode or URL, which is recorded in the document image as additional information, is detected. In this case, the URL undergoes a character recognition process by OCR or the two-dimensional barcode is decoded, thereby detecting pointer information in the storage device that stores an original data file of the input image.

Means for appending the pointer information is not limited to the two-dimensional barcode, and so-called digital watermarking methods that can embed invisible information, such as a method of embedding information as a change in spacing between neighboring characters, a method of embedding information in a halftone image, or the like may be adopted.

Step S2404 (pointer information extraction step): Pointer information is extracted from the OCR, OMR, or digital watermark information obtained in step S2403.

Step S2405: It is determined whether or not pointer information is acquired in step S2404. If pointer information is acquired, the flow advances to step S2406 to directly access original data file.

If no pointer information is extracted in step S2404, the flow advances to step S2407.

Step S2406: If pointer information is extracted, an original data file (digital file) is searched for using that pointer information. The original data file is stored in one of a hard disk in the client PC 102, the database 105 in the document management server 106, the storage device 111 of the MFP 100 in FIG. 1, and the like, and these storage devices are searched in accordance with the obtained address information in step S2406. If no original data file is found as a searched result or if the extracted original data file is a raster data file or an image data file which is represented by BMP or tiff and is obtained by encoding raster data, the flow advances to step S2407. If the original data file can be extracted, the flow jumps to step S2416.

Step S2407, S2408: A dialog shown in FIG. 26 is displayed on an operation screen of the display device 116, and inquires the user as to whether or not to execute a vectorization process. On the dialog shown in FIG. 26, an inquiry message "Vectorization process?", and a "Right now" button 2601, "Later" button 2602, and "No" button 2603 are displayed. Upon depression of the "Right now" button 2601, the flow advances to step S2409 via step S2408 so as to execute the vectorization process right now. Upon depression of the "Later" button 2602, status "LATER" is registered in a vectorization process table together with a temporary storage address, and vectorization is executed when a predetermined condition is met (e.g., when the load on the MFP 100 is light (including a case wherein the MFP 100 does not perform any process), and so forth). In this way, vectorization is executed by a simultaneous vectorization process in FIG. 25 at a timing at which the user does not recognize the wait time of the vectorization process. Upon depression of the "No" button 2603, status "NO" is set, thus ending the process.

Figure 27:
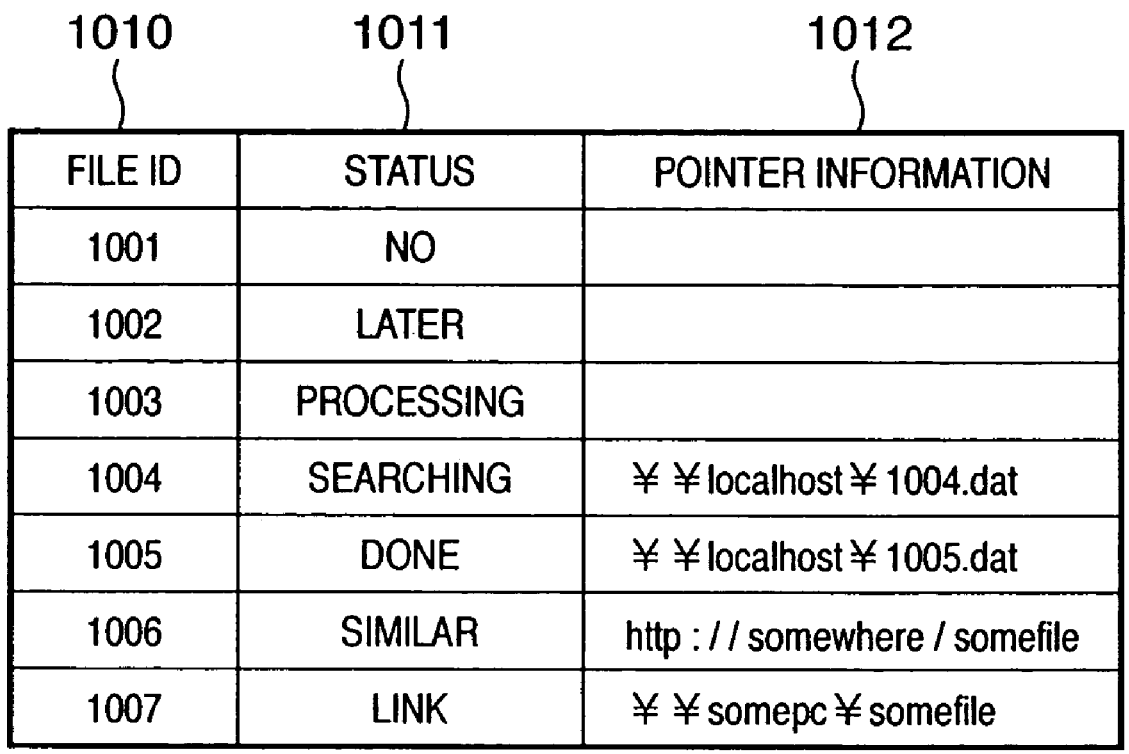
FIG. 27 shows a vector process table generated by the process in FIG. 24.

The selection result of the buttons 2601 to 2603 is recorded in a vector process table shown in FIG. 27. Details of the vector process table will be described later.

Step S2409: A document search routine is executed. A full-text search in the database 105 is conducted using words extracted by the OCR process in step S2403, or a layout search is conducted based on the layout of rectangular blocks and the properties of objects.

Step S2410: If a plurality of original data file candidates with high similarity levels are found by the search process in step S2409, they are displayed on the operation screen of the display device 116 as thumbnails or the like to prompt the user to select one of these candidates. If only one original data file candidate is found, the flow may automatically jump from step S2411 to step S2416 to notify the MFP 100 of the address of the extracted original data file.

Step S2411: It is determined whether or not one data file is specified in step S2409 or S2410. If one data file is specified, the flow jumps to step S2416; if no data file is extracted or if the extracted data file is an image data file, the flow advances to step S2411.

Step S2412 (vectorization step): If no pointer information is extracted, the vectorization process is executed to convert image data in regions segmented by the region segmentation process into vector data.

The following vectorization methods (a) to (f) and the like are available.

(a) When the region of interest is a text region, code conversion of character images is executed by OCR, or the size, style, and font of each character are recognized, thus converting the text region into font data which are visually faithful to characters obtained by scanning the document.

(b) When the region of interest is a text region, and cannot be recognized by OCR, the outlines of characters are traced, thus converting the text region into a format that expresses outline information as connection of line segments.

(c) When the region of interest is a graphic region, the outlines of a graphic object are traced, thus converting the graphic region into a format that expresses outline information as connection of line segments.

(d) Outline information in the line segment format obtained by method (b) or (c) is converted into function information by fitting using a Bezier function or the like.

(e) The shape of a graphic is recognized from the outline information of the graphic object obtained by method (c), thus converting the outline information into graphic definition information of, e.g., a circle, rectangle, polygon, or the like.

(f) When the region of interest is a graphic region and is an object in a table format, ruled lines and frame lines are recognized, thus converting that region into predetermined table format information.

In addition to the above methods, various other vectorization processes that replace raster data by predetermined commands and code information are available. Note that an image region is handled as JPEG data or the like.

Step S2413: The vector data obtained in step S2410 are directly converted into an application data format, and the converted application data is output. Normally, the data format depends on an application to be used, and data must be converted into a file format corresponding to the purpose intended.

A re-usable application data format that allows an edit process and the like includes those of application software programs such as a wordprocessor, spreadsheet software, and the like. For example, wordprocessor WORD®, spreadsheet software EXCEL®, and the like, which are available from Microsoft Corporation, are known. These applications have different use purposes, define file formats according to their purposes, and save a file (data) in these formats.

As a versatile file format, an RTF (rich text file) format of Microsoft Corporation, an SVG (Scalable Vector Graphics) format which begins to be used in recent years, a plane text format that simply handles text data alone, and the like are known, and these formats can be commonly used in corresponding applications.

Step S2414: The data generated in step S2413 is stored in the storage device 111 as a digital file.

Step S2415: For a digital file to be stored in the database 104 or storage device 111, search index information is stored in an index file. Hence, text information of the character recognition result obtained in step S2403, layout information, and the like are registered in the index file as index information in association with the new digital file stored in step S2414.

In this manner, as for images which are scanned and registered, search performance equivalent to that of document files and the like created by application software can be obtained, and a search can be conducted even when no pointer information is available.

Step S2416: An address indicating the storage location of the data is output. If the data is stored in the storage device 111 in step S2414, that storage address is output; if the original data file is extracted in step S2406 or S2411, the address of the original data file is notified.

Step S2417: It is confirmed whether or not the user wants to record the contents of the detected or generated digital file by, e.g., a print process. If the user wants to record the contents, the flow advances to step S2418; otherwise, the flow jumps to step S2419.

Step S2418: Pointer information is appended to the digital file and the like. The pointer information appending process can be implemented by various known methods such as a method of appending pointer information using a two-dimensional barcode to an output image, a method of embedding a digital watermark in a character string or a halftone image, and the like.

In this manner, when the printed image is scanned, the pointer information can be immediately acquired, and its original data file can be accessed.

Step S2419: Various processes such as an edit process, storage process, transmission process, recording process, and the like are executed using the digital file obtained by the aforementioned process. The generated or acquired digital file has a smaller data size than an image data file, and can expect the effects of improvement of the storage efficiency, short transmission time, and improvement of display/recording quality.

FIG. 27 shows a vectorization process table. A file ID field registers ID numbers 1010 such as "1001", "1002", and the like. A status field 1011 of each file ID registers "NO", "LATER", "PROCESSING", "SEARCHING", "DONE", "SIMILAR", or "LINK". Upon selection of "Later" (button 2602) in step S2407, "LATER" is registered in the status field. Upon selection of "No" (button 2603), "NO" is written in the status field.

Figure 25:
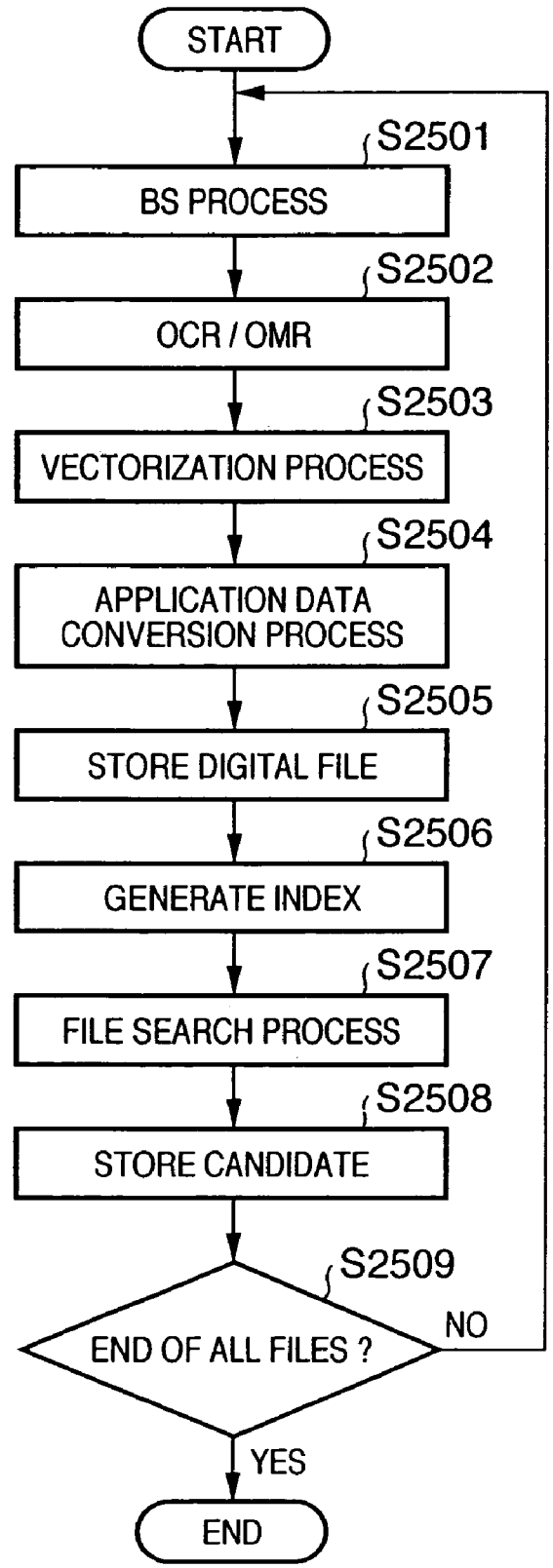
FIG. 25 is a flow chart showing a simultaneous vectorization process executed after the process shown in FIG. 24.
Figure 26:
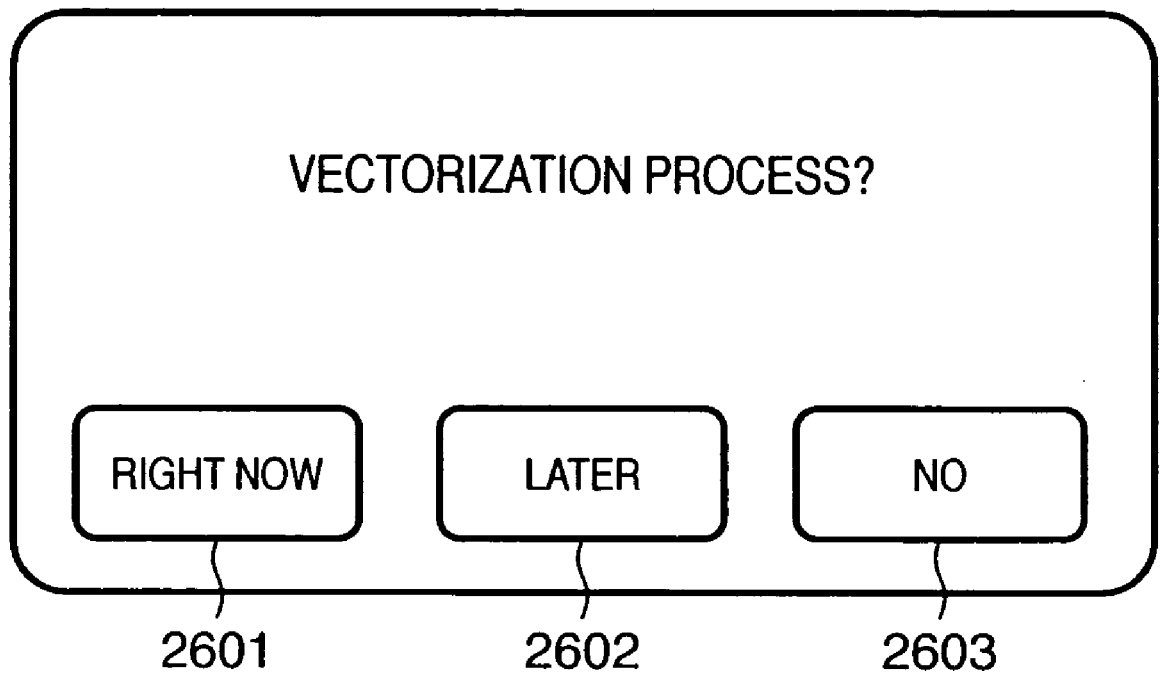
FIG. 26 shows a dialog displayed on an operation screen in step S2407 in FIG. 24.

When it is detected that a predetermined condition is met (e.g., the load on the MFP 100 is light (or no load is imposed), and so forth), a simultaneous vectorization process is executed by respective steps in FIG. 25.

Step S2501: Status 1011 is rewritten to "PROCESSING", and the same block selection step as step S2402 in FIG. 24 is executed.

Step S2502: The same OCR/OMR process as that in step S2403 in FIG. 24 is executed.

Step S2503: The same vectorization process as that in step S2412 in FIG. 24 is executed.

Step S2504: The same application data conversion process as that in step S2413 in FIG. 24 is executed.

Step S2505: A process for storing the generated digital file is executed.

Step S2506: The same index generation process as that in step S2415 in FIG. 24 is executed. During the processes in steps S2501 to S2506, status "PROCESSING" is held.

Step S2507: Status is rewritten to "SEARCHING", and a file search process is executed based on the vectorized input image as in step S2409 in FIG. 24. If no digital file other than the vectorized input image can be extracted, status 1011 is rewritten to "DONE", and the address information of the vector data stored in step S2505 is written in pointer information 1013.

Step S2508: If a digital file other than the vectorized input image is extracted in step S2507, status is rewritten to "SIMILAR", and pointer information of that digital file is written in pointer information 1013.

Step S2509: It is checked if the process for all unprocessed input images is complete. If the process is complete, the process ends. If input images to be processed still remain, the flow returns to step S2501.

Details of principal steps in FIG. 24 will be described below.

<<Block Selection Step>>

In step S2402 (block selection step), an input image is segmented into rectangular blocks for respective properties, as shown in the right image in FIG. 4. As the properties of rectangular blocks, text (TEXT)/picture (PICTURE)/line image (LINE)/table (TABLE)/photo (PHOTO), and the like are available.

In the block selection step, an input image is binarized to a monochrome image, and pixel clusters bounded by black pixel outlines are extracted.

Furthermore, the sizes of the black pixel clusters extracted in this way are evaluated, and outline tracing is made for white pixel clusters present inside each black pixel cluster which has a size equal to or larger than a predetermined value. Extraction of an inner pixel cluster and outline tracing are recursively done like size evaluation for a white pixel cluster and tracking of an inner black pixel cluster as long as an inner pixel cluster has a size equal to or larger than a predetermined value.

The size of each pixel cluster is evaluated based on, e.g., its area.

Rectangular blocks that circumscribe the pixel clusters are obtained in this way, and properties are determined on the basis of the sizes and shapes of the rectangular blocks.

For example, a rectangular block, which has an aspect ratio close to 1 and has a size that falls within a predetermined range, is determined as a character corresponding block, which may belong to a text region rectangular block. When neighboring character corresponding blocks line up regularly, a new rectangular block that combines these character corresponding blocks is generated, and is determined as a text region rectangular block.

A low-profile pixel cluster is determined as a line image region rectangular block. A black pixel cluster that includes rectangular white pixel clusters which regularly line up is determined as a table region rectangular block. A region where pixel clusters with indeterminate forms are distributed is determined as a photo region rectangular block. A region formed by other pixel clusters with indeterminate forms is determined as an image region rectangular block.

In the block selection step, block information including a property and the like, and input file information shown in FIG. 5 are generated for each of the rectangular blocks generated in this way.

Referring to FIG. 5, the block information contains a property, coordinates X and Y of a position, a width W, a height H, and OCR information of each block. The property is given as a numerical value ranging from 1 to 5: 1 indicates a text region rectangular block; 2, a picture region rectangular block; 3, a table region rectangular block; 4, a line image region rectangular block; and 5, a photo region rectangular block. The coordinates X and Y indicate the X- and Y-coordinates (those of the upper left corner) of the start point of each rectangular block in the input image. The width W and height H respectively indicate the width in the X-direction and height in the Y-direction of each rectangular block. The OCR information indicates the availability of pointer information in the input image.

Furthermore, the input file information contains the total number N of blocks indicating the number of rectangular blocks.

These pieces of block information for respective rectangular blocks are used in vectorization of a specific region. A relative positional relationship upon compositing a specific region to another region can be specified based on the block information, and a vectorized region and raster data region can be composited without spoiling the layout of the input image.

<<Pointer Information Extraction Step>>

Step S2404 (pointer information extraction step) is implemented by respective steps in FIG. 6. FIG. 7 shows a document 310 to be processed in the pointer information extraction step. The document 310 is stored in a page memory (not shown) in the data processing device 115. The document 310 records text region rectangular blocks 312 and 313, a photo region rectangular block 314, and a two-dimensional barcode (QR code) symbol 311. A description of the processes in the respective steps of FIG. 6 will be omitted (refer to the first embodiment).

Data encoded in the two-dimensional barcode represents address information of an original data file, which is formed of, e.g., path information including a file server name and file name. Or the address information may be formed of a URL or the like to the corresponding file, or a file ID or the like in the database 105 or storage device 111 that stores the file.

This embodiment has explained the document 310 to which the pointer information is appended in the form of a two-dimensional barcode, but various other recording formats of pointer information may be adopted.

For example, pointer information may be directly recorded using a character string according to a predetermined rule, and a rectangular block of that character string may be detected in the block selection step. By recognizing the detected character string, the pointer information can be acquired.

Alternatively, pointer information can be expressed by imperceptible modulation applied to, e.g., the spacings between neighboring characters in a character string of the text region rectangular block 312 or 313. Such watermark information can be detected by detecting the character spacings in a character recognition process (to be described later), and the embedded pointer information can be acquired. Also, pointer information can be appended as a digital watermark in the photo region rectangular block 314.

<<Digital File Search Based on Pointer Information>>

Figure 28:
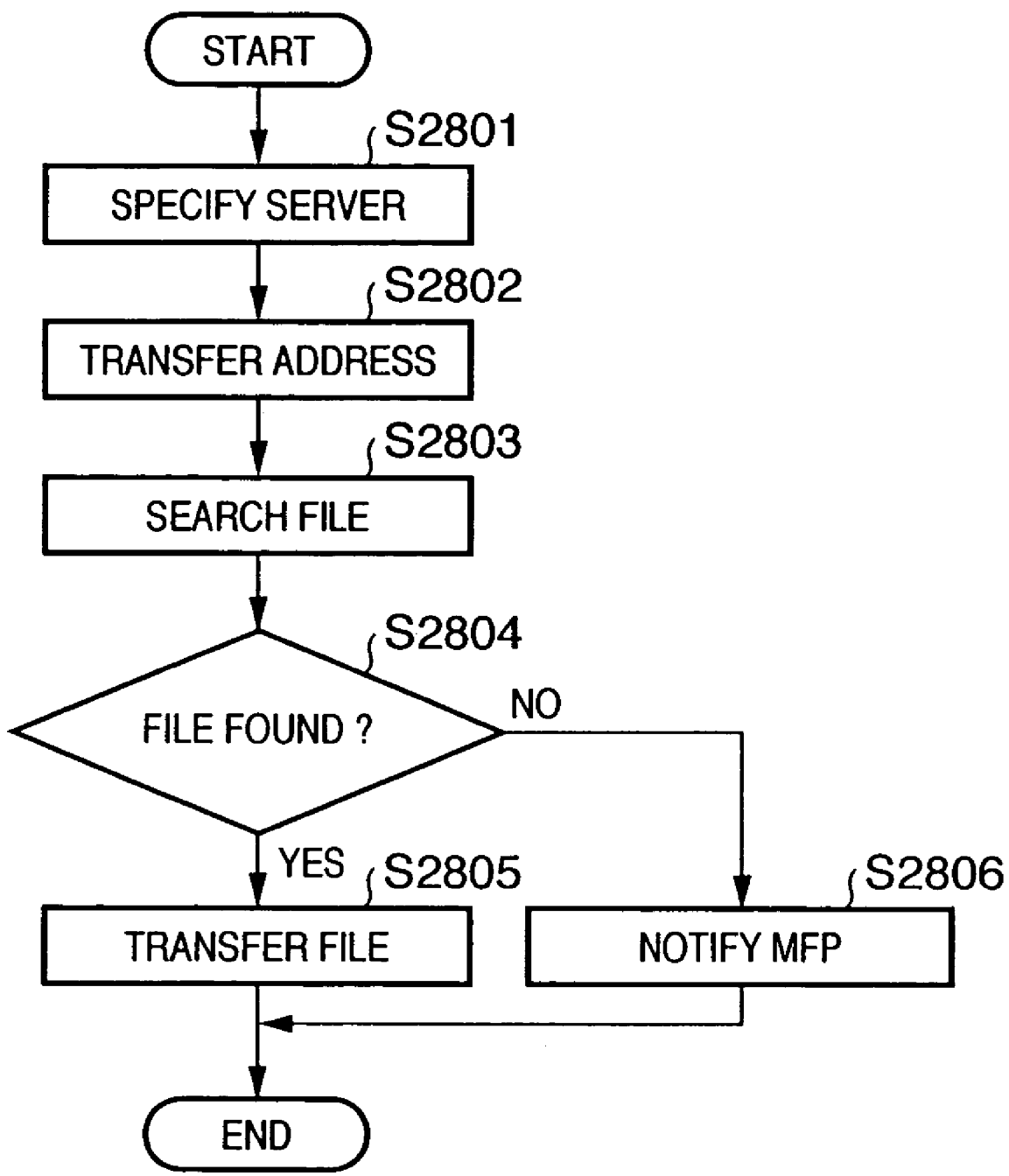
FIG. 28 is a flow chart showing a file search process based on pointer information in FIG. 24.

The digital file search process based on pointer information in steps S2408 and S2411 in FIG. 24 is implemented by respective steps in FIG. 28.

Step S2801: A file server is specified based on an address included in the pointer information. At least one of the client PC 102, database 105, document management server 106, and MFP 100 that incorporates the storage device 111 is used as the file server. Also, the address is a URL or path information including a server name and file name.

Step S2802: The address is transferred to the file server specified in step S2801.

Step S2803: The file server specified in step S2801 receives the address transferred in step S2802, and searches for an original data file based on this address.

Step S2804: It is checked if an original data file can be extracted by the file search process in step S2803. If a file can be extracted, the flow advances to step S2805; otherwise, the flow advances to step S2806.

Step S2805: As has been explained in association with FIG. 24, the MFP 100 is notified of the file address. If the user wants to acquire the original file data, the original data file is transferred to the MFP 100. After that, the process ends.

Step S2806: If no file can be extracted in step S2803, a message that advises accordingly is sent to the MFP 100, thus ending the process.

<<File Search Process>>

The file search process in step S2409 in FIG. 24 is executed when the input image does not include any pointer information or when a digital file cannot be extracted based on the pointer information. The file search process is executed by a combination of a plurality of search methods, i.e., a keyword search process, full-text search process, layout search process, condition narrow-down search process, and the like.

The keyword search process searches for an index file that registers, in advance, keywords associated with respective digital files in the database (by exact or fuzzy matching) using search keys of query image data.

Note that the search keys use words in text extracted from the input image by the OCR process in step S2403, words embedded in a digital watermark, and the like.

The full-text search process conducts a search for the full text information of an original data file, and a higher similarity level is determined with increasing number of extracted search keys.

The layout search process will be described in detail below with reference to FIG. 29.

<<Layout Search Process>>

Figure 29:
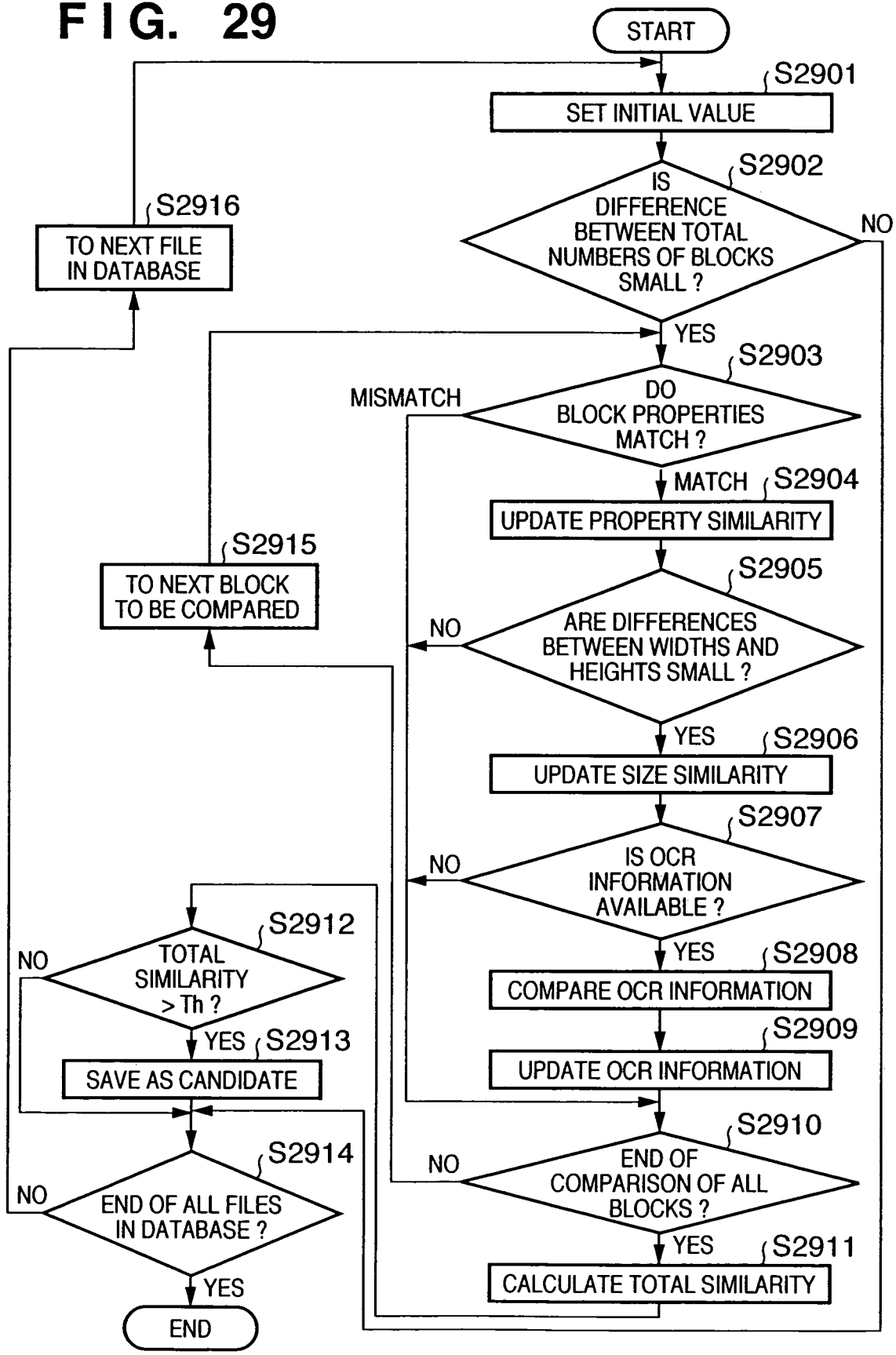
FIG. 29 is a flow chart showing a file search process in FIG. 24.

The layout search process is implemented by respective steps in FIG. 29.

Assume that the rectangular blocks extracted as a result of step S2402 and input image data have block information and input file information shown in FIG. 5.

In the block information, respective rectangular blocks are arranged in ascending order of coordinate X, i.e., the coordinates X of blocks 1, 2, 3, 4, 5, and 6 satisfy X1<=X2<=X3<=X4<=X5<=X6. Using these pieces of information, the layout search process that searches the database for a file similar to the input image is implemented by respective steps of FIG. 29. Assume that database files have the same kinds of information as those in FIG. 5. In the flow of this flow chart, block information and input file information are compared in turn with those of files in the database.

Step S2901: Similarity levels and the like (to be described later) are initialized.

Step S2902: It is determined if a data file of interest has a difference from the total number N of blocks of the input image, which falls within a predetermined value range, i.e., it has the total number n of blocks that satisfies $N-\Delta N<n<N+\Delta N$. If a data file which satisfies that condition is extracted by search, the flow advances to step S2903 to compare the information of rectangular blocks in the extracted data file with those in the input image in turn. On the other hand, if the difference between the total numbers of blocks is large, the flow jumps to step S2914. Upon comparing information of rectangular blocks, property, size, and OCR similarity levels are calculated in steps S2903 to S2909, and a total similarity level of the data file to be compared is calculated based on these levels in step S2911.

Step S2903: A block property of the input image is compared with that of the database file extracted in step S2902. If the two block properties match, the flow advances to step S2904; otherwise, the flow jumps to step S2910 to check if comparison of all the blocks of the input image is complete.

Step S2904: The property similarity level of the property of the block information compared in step S2903 is updated. The calculation method of the property similarity level can use an arbitrary method. For example, the property similarity level is calculated based on {(the number of property match blocks)/(the total number of blocks)}.

Step S2905: The size (width W, height H) in the block information of the input image is compared with that (width w, height h) of the database file extracted in step S2902. It is checked if the size difference falls within a predetermined range, i.e., $W-\Delta W<w<W+\Delta W$ and $H-\Delta H<h<H+\Delta H$. If the size difference falls within the predetermined range, the flow advances to step S2906; otherwise, the flow jumps to step S2910 to check if comparison of all the blocks of the input image is complete.

Step S2906: The size similarity level of the size of the block information compared in step S2905 is updated. The calculation method of the size similarity level can be arbitrary. For example, the size similarity level of each block is calculated by {1−(size difference)/(block size of interest of input image data)}, and the average value of the size similarity levels in that data file is calculated.

Step S2907: It is checked if the block information of the input image and that of the data file extracted in step S2902 include OCR information="available". If the two pieces of information include OCR information="available", the flow advances to step S2908; otherwise, the flow jumps to step S2910 to check if comparison of all the blocks of the input image is complete.

Step S2908: The OCR information in the block information of the input image is compared with that of the data file extracted in step S2902.

Step S2909: The OCR information similarity level of the OCR information compared in step S2908 is calculated. The calculation method of the OCR information similarity level can use an arbitrary method. For example, the OCR information similarity level is calculated by comparing recognition result characters of respective blocks to obtain, e.g., the coincidence of the recognition results.

Step S2910: It is determined whether or not the comparison processes of all blocks included in the input image with those of the data file of interest are complete. If the processes of all the rectangular blocks are complete, the flow advances to step S2911; if rectangular blocks to be processed still remain, the flow returns to step S2903 to execute the comparison process of the next block via step S2915.

Step S2911: The total similarity level is calculated based on the property, size, and OCR similarity levels. The total similarity level is calculated by multiplying the respective similarity levels by predetermined weights, and then calculating their sum.

Step S2912: It is checked if the total similarity level is higher than a pre-set threshold value Th. If the total similarity level is higher than the threshold value Th, the flow advances to step S2913; otherwise, the flow advances to step S2914.

Step S2913: The data file in the database which is determined in step S2912 to have the total similarity level higher than the threshold value is saved as a similar candidate.

Step S2914: It is determined whether or not the processes for all data files in the database are complete. If the processes for all database files are complete, the process ends; if database files to be processed still remain, the flow returns to step S2901 via step S2916.

Step S2915: The next block is selected as the block to be compared so as to compare individual block information of the data file with all pieces of block information of the input image.

Step S2916: The next data file is selected as the file to be compared to compare data files in the database in turn.

In FIG. 29, N, W, and H are respectively the total number of blocks, each block width, and each block height in the input image, and $\Delta N$, $\Delta W$, and $\Delta H$ are allowable ranges with reference to the block information of the input image. Also, n, w, and h are respectively the total number of blocks, each block width, and each block height in a database file.

Although not shown, position information of coordinates X and Y, and the like may be compared upon comparing sizes in step S2905.

The search results of the plurality of search methods mentioned above are numerically expressed by similarity scores, and the final search result is obtained by evaluating the total value calculated by summing up the weighted scores as the total search similarity level.

The total search similarity level is compared with a predetermined threshold value, and a digital file with a score higher than the threshold value is selected as a candidate to be extracted. If a plurality of candidates are extracted, a candidate selection process is executed in step S2410.

<<Vectorization Step>>

In step S2412 (vectorization step), image data shown in the right side of FIG. 4 is vectorized for respective rectangular blocks if no original data file is present in the file server. If a rectangular block is a text region rectangular block, vectorized characters undergo a character recognition process.

Figure 30:
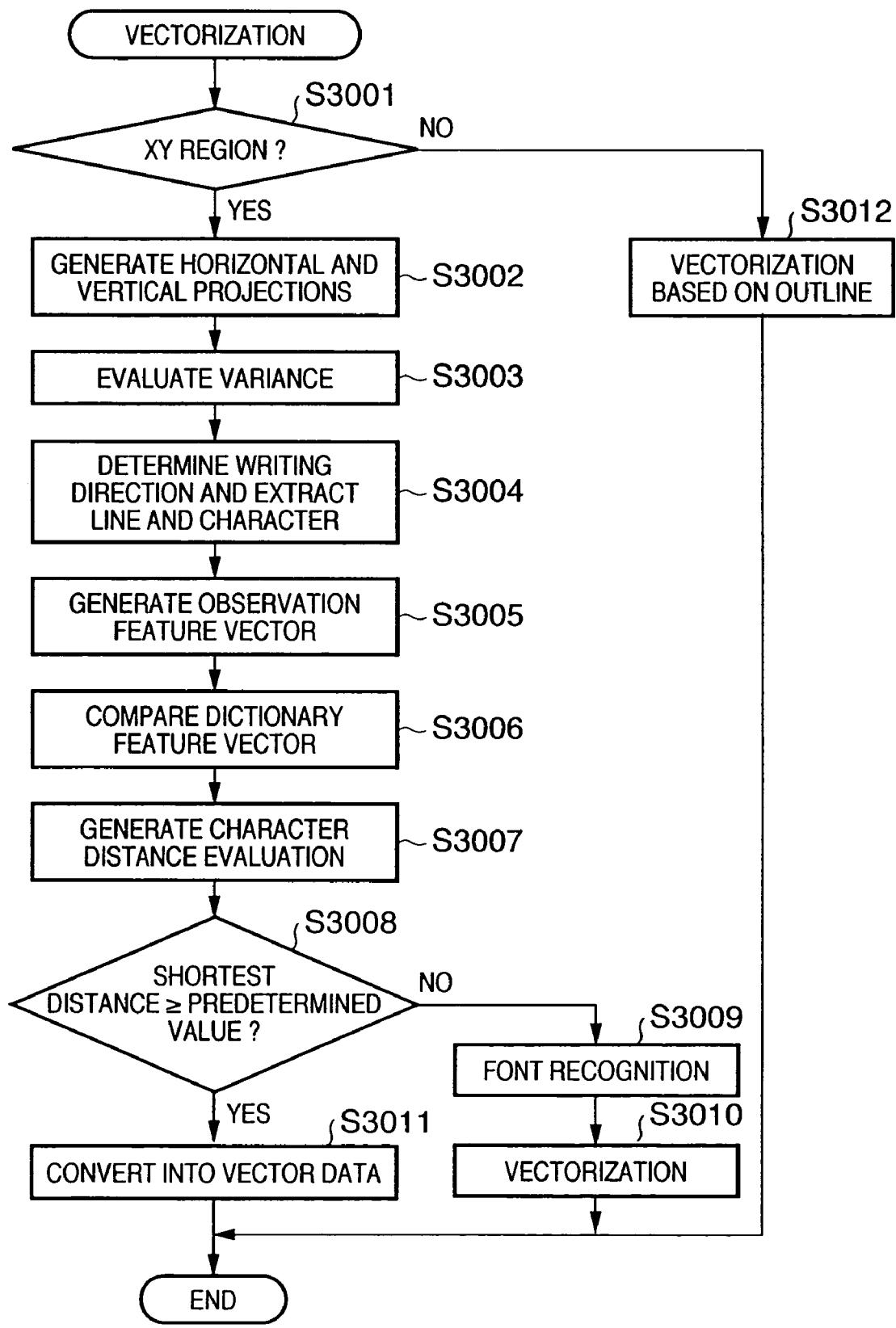
FIG. 30 is a flow chart showing a vectorization process for a text region in FIG. 24.

The vectorization process is implemented by respective steps shown in FIG. 30.

Step S3001: It is checked if a specific region is a text region rectangular block. If the specific region is a text region rectangular block, the flow advances to step S3002 and subsequent steps, and recognition is made using one of pattern matching methods to obtain a corresponding character code. If the specific region is not a text region rectangular block, the flow advances to step S3012.

Step S3002: Horizontal and vertical projections of pixel values in the specific region are calculated so as to determine the horizontal or vertical writing direction (layout direction) in the specific region.

Step S3003: The variances of the projections calculated in step S3002 are evaluated. If the variance of the horizontal projection is large, horizontal writing is determined; if the variance of the vertical projection is large, vertical writing is determined.

Step S3004: The layout direction is determined on the basis of the evaluation result in step S3003 to extract lines. After that, characters are extracted to obtain character images.

Upon decomposition into character strings and characters, in case of horizontal writing, lines are extracted using the horizontal projection, and characters are extracted based on the vertical projection for the extracted line. In case of a vertical writing text region, the relationship between the horizontal and vertical parameters may be exchanged. Upon extraction of lines and characters, a character size can also be detected.

Step S3005: For each character extracted in step S3004, an observation feature vector obtained by converting a feature acquired from that character image into a several-ten-dimensional numerical value string is generated. Various known methods are available for feature vector extraction. For example, a method of dividing a character into a mesh pattern, and counting character lines in respective meshes as line elements depending on their directions to obtain a (mesh count)—dimensional vector as a feature is known.

Step S3006: The observation feature vector obtained in step S3005 is compared to dictionary feature vectors which are obtained in advance for respective character types, thus calculating the distances between the observation feature vector and dictionary feature vectors.

Step S3007: The distances calculated in step S3006 are evaluated, and a character type with the smallest distance is selected as a recognition result.

Step S3008: It is checked if the shortest distance selected in the distance evaluation in step S3007 is larger than a predetermined value. If the distance is equal to or larger than the predetermined value, it is more likely to determine another wrong character with a similar shape in the dictionary feature vector as a recognition result. Hence, if the distance is equal to or larger than the predetermined value, the recognition result in step S3007 is discarded, and the flow advances to step S3011. If the distance is smaller than the predetermined value, the recognition result in step S3007 is adopted, and the flow advances to step S3009.

Step S3009 (font recognition step): A plurality of sets of dictionary feature vectors for the number of character types used in character recognition are prepared in correspondence with character shape types, i.e., font types, and a font type is output together with a character code upon matching, thus recognizing a character font.

Step S3010: Using a character code and font information obtained by the character recognition and font recognition, and outline data prepared for each character code and font, each character is converted into vector data. If the input image is a color image, the color of each character is extracted from the color image and is recorded together with vector data.

Step S3011: Each character is converted into outline data in the same manner as a general line image. That is, for each character which may cause a recognition error, outline vector data which is visually faithful to image data is generated.

Step S3012: If the specific region is not a text region rectangular block, a vectorization process is executed based on outlines of an image.

With the above processes, image information which belongs to a text region rectangular block can be converted into vector data with a nearly faithful shape, size, and color.

<<Vectorization of Region Other Than Text Region>>

In step S3012, if it is determined that the specific region is a region other than the text region rectangular block, i.e., a picture region rectangular block, line image region rectangular block, table region rectangular block, or the like, the outlines of black pixel clusters extracted in the specific region are converted into vector data.

Figure 31:
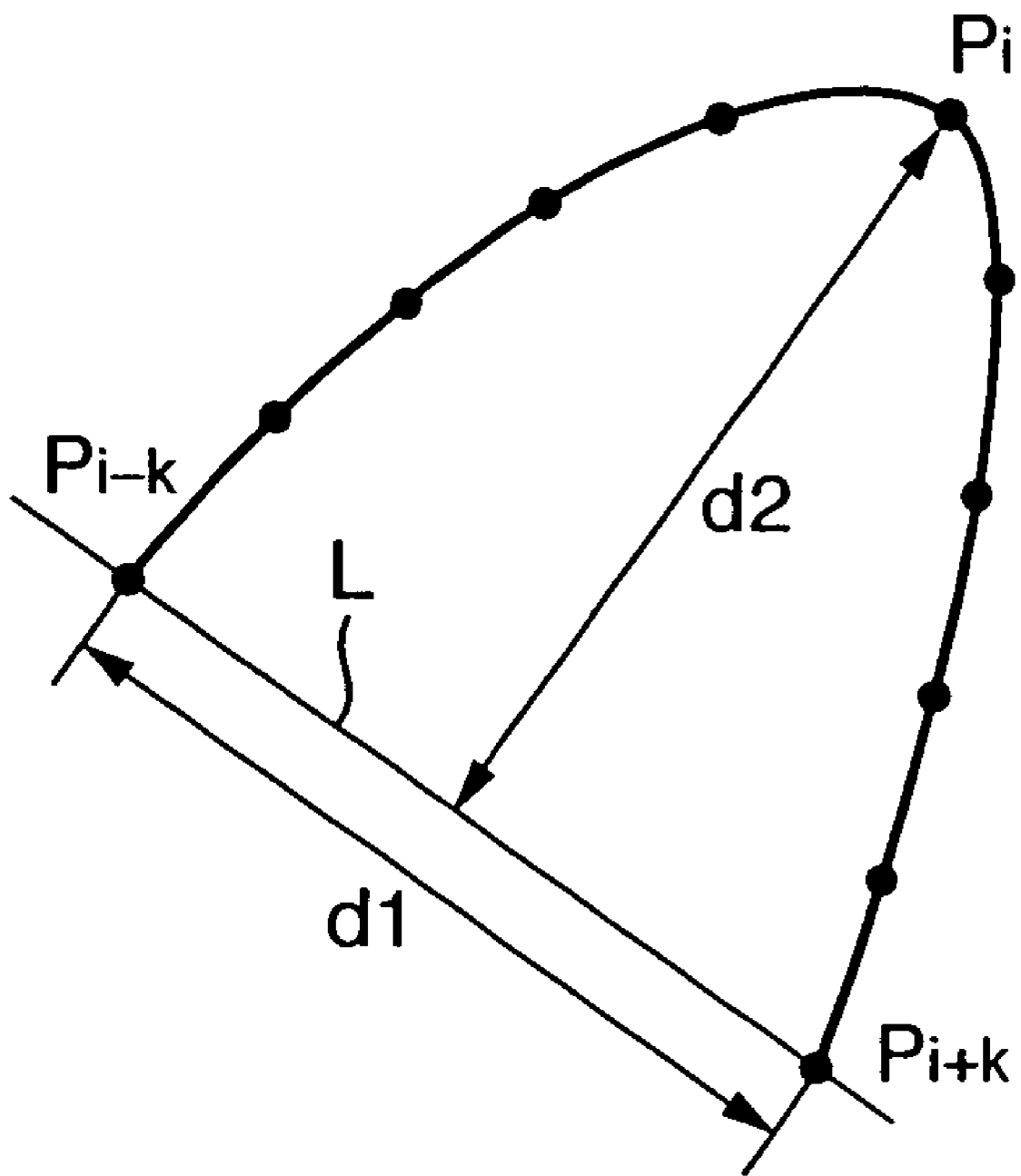
FIG. 31 shows a corner extraction process in the vectorization process.

In vectorization of a region other than the text region, in order to express a line image or the like as a combination of lines and/or curves, a "corner" that divides a curve into a plurality of sections (pixel sequences) is detected. The corner is a point corresponding to a maximal curvature, and whether or not a pixel Pi on a curve in FIG. 31 is a corner is determined as follows.

That is, pixels Pi−k and Pi+k, which are separated a predetermined number of pixels (k pixels) from the pixel Pi as a start point in the left and right directions are coupled via a line segment L. Let d1 be the distance between the pixels Pi−k and Pi+k, d2 be the distance between the line segment L and pixel Pi, and A be the length of an arc between the pixels Pi−k and Pi+k of a curve. Then, when d2 is maximal or when the ratio (d1/A) becomes equal to or smaller than a threshold value, the pixel Pi is determined as a corner.

Pixel sequences divided by the corner are approximated by lines or curves. Approximation by a line is implemented by, e.g., a method of least squares, and that by a curve uses a ternary spline function or the like. A pixel as a corner which divides a pixel sequence becomes an initial or terminal end of the approximate line or curve.

Furthermore, it is determined whether or not the vectorized outline includes an inside outline of a white pixel cluster. If an inside outline is found, that outline is converted into vector data. In this way, the inside outlines of inverted pixels are recursively vectorized (e.g., an inside outline of the inside outline).

As described above, using partial line approximation of an outline, the outline of a graphic with an arbitrary shape can be vectorized. When an original document has a color image, the color of a graphic is extracted from the color image and is recorded together with vector data.

Figure 32:
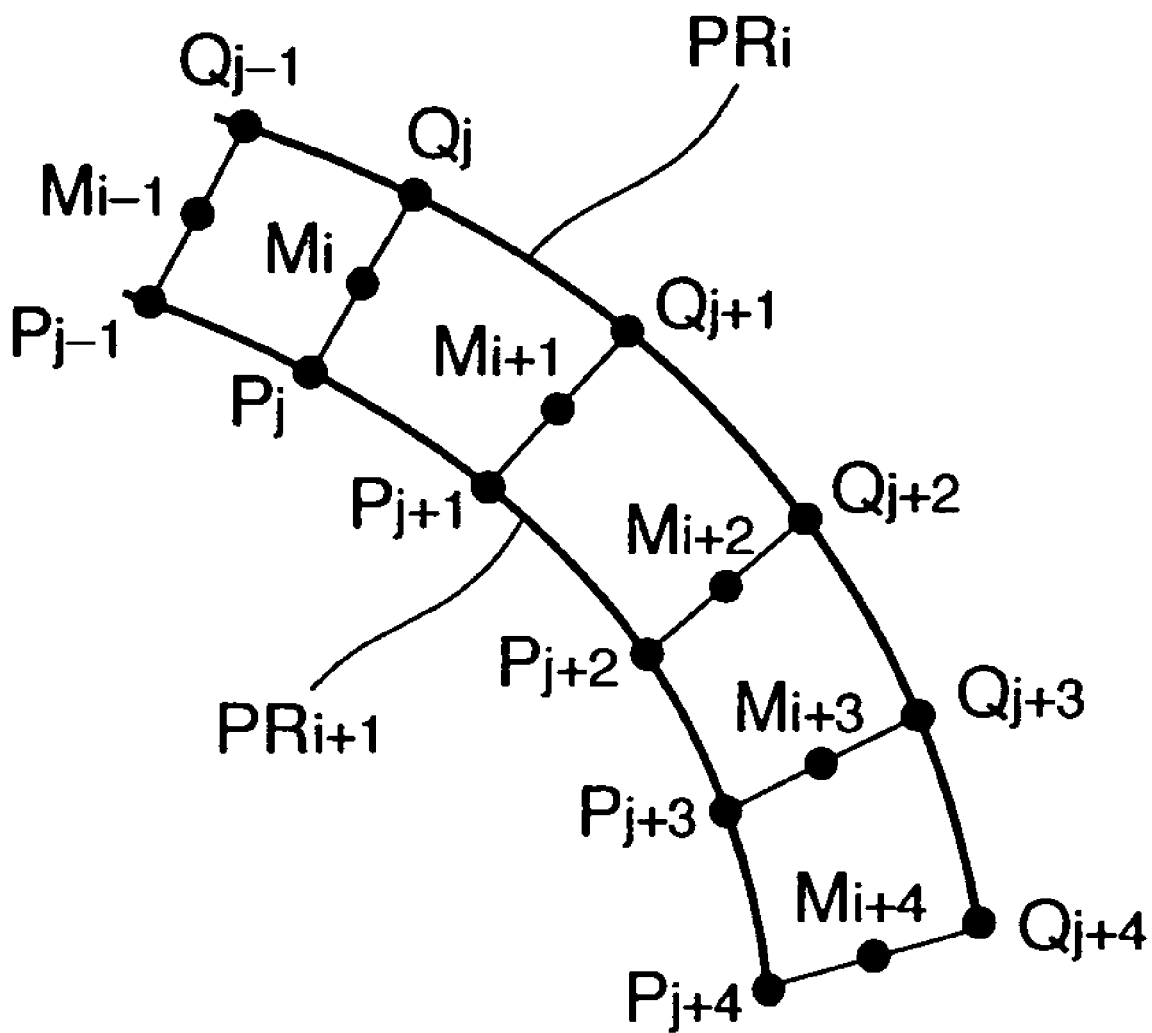
FIG. 32 shows an outline grouping process in the vectorization process.

When an outside outline PRj is close to an inside outline PRj+1 or another outline in a given section, as shown in FIG. 32, two or a plurality of outlines may be combined to express a line with a given width. For example, distances PiQi from respective pixels Pi on the outline PRj+1 to pixels Qi on the outline PRj, each of which has a shortest distance from the corresponding pixel, are calculated. When variations of PiQi are small, the section of interest can be approximated by a line or curve along a point sequence of middle points Mi between the pixels Pi and Qi. The width of the approximate line or curve is given by, e.g., the average value of the distances PiQi.

A line or a table ruled line as a set of lines can be efficiently vectorized as a set of lines each having a given width.

After an outline combination process, the overall process ends.

Note that a photo region rectangular block is output as image data without being vectorized.

<<Graphic Recognition>>

After the outlines of line graphics and the like are vectorized, the vectorized partial lines are grouped for each graphic object. Since the graphic element grouping process is the same as that in the first embodiment, a description thereof will be omitted. For details, please refer to FIG. 13 and its description.

<<Detection of Graphic Element>>

The process in step S2402 (graphic element detection) is also the same as that in the first embodiment. Hence, please refer to FIG. 14 and its description for details.

With the above processes, a graphic block can be handled as an independently re-usable graphic object.

<<Conversion Process to Application Data>>

After the block selection step (step S2402) in FIG. 24, the conversion process to application data in step S2413 is executed using data of the results of the vectorization process (step S2412). The vectorization process results obtained in step S2412 are saved as an intermediate data format, i.e., in a so-called document analysis output format (DAOF), shown in FIG. 15.

Referring to FIG. 15, the DAOF consists of a header 791, layout description data field 792, character recognition description data field 793, table description data field 794, and image description data field 795. A description of these fields will be omitted since it is the same as that in the first embodiment. Also, as the conversion process to application data, the process shown in FIGS. 16 and 17 in the first embodiment is applied.

The document structure tree generation process in step S8002 is implemented by respective steps in FIG. 17. As a basic rule of the overall control in the process in FIG. 17, the flow of processes transits from a microblock (single rectangular block) to a macroblock (a set of rectangular blocks). In the following description, "rectangular block" means both the microblock and macroblock.

In step S8100: Re-grouping is done for respective rectangular blocks on the basis of relevance in the vertical direction. The process in FIG. 17 is often repeated. Immediately after the flow starts, determination is made for respective microblocks.

Note that relevance can be defined by features indicating if a distance between neighboring blocks is small, blocks have nearly the same block widths (heights in case of the horizontal direction), and so forth. Information of the distances, widths, heights, and the like can be extracted with reference to the DAOF.

In the input image shown in FIG. 18A, rectangular blocks T1 and T2 are juxtaposed in an uppermost portion. Horizontal separator S1 is present below rectangular blocks T1 and T2, and rectangular blocks T3, T4, T5, T6, and T7 are present below horizontal separator S1.

Rectangular blocks T3, T4, and T5 are vertically arranged in turn from top down in a left half portion of a region below horizontal separator S1, and the rectangular blocks T6 and T7 are vertically arranged in a right half portion of the region below the horizontal separator S1.

A grouping process is executed based on the vertical relevance in step S8100. As a result, rectangular blocks T3, T4, and T5 are combined into one group (rectangular block) V1, and rectangular blocks T6 and T7 are combined into one group (rectangular block) V2. Groups V1 and V2 belong to an identical layer.

In step S8102: The presence/absence of a vertical separator is checked. The separator is an object which has a line property in the DAOF, and has a function of explicitly dividing blocks in application software. Upon detection of a separator, the region of the input image is divided into right and left regions to have the separator as a boundary in the layer to be processed. In FIG. 18A, no vertical separator is present.

Step S8104: It is checked if the total of group heights in the vertical direction becomes equal to the height of the input image. That is, upon executing grouping in the horizontal direction while selecting a region to be processed in the vertical direction (e.g., from top down), when the process of the entire input image is complete, the total of the group heights becomes equal to the height of the input image. Hence, by utilizing this fact, whether or not the process is to end is determined. Upon completion of grouping, the process ends; otherwise, the flow advances to step S8106.

In step S8106, a grouping process is executed on the basis of relevance in the horizontal direction. As a result, rectangular blocks T1 and T2 are combined into one group (rectangular block) H1, and rectangular blocks V1 and V2 are combined into one group (rectangular block) H2. Groups H1 and H2 belong to an identical layer. In this case as well, determination is made for respective microblocks immediately after the beginning of the process.

Step S8108: The presence/absence of a horizontal separator is checked. Upon detection of the separator, the region of the input image is divided into upper and lower regions to have the separator as a boundary in the layer to be processed. In FIG. 18A, horizontal separator S1 is present.

The aforementioned processing results are registered as a tree in FIG. 18B.

Referring to FIG. 18B, input image V0 has groups H1 and H2 and separator S1 in the uppermost layer, and rectangular blocks T1 and T2 of the second layer belong to group H1.

Groups V1 and V2 of the second layer belong to group H2, rectangular blocks T3, T4, and T5 of the third layer belong to group V1, and rectangular blocks T6 and T7 of the third layer belong to group V2.

Step S8110: It is checked if the total of the group lengths in the horizontal direction becomes equal to the width of the input image. With this process, whether or not grouping in the horizontal direction is complete is checked. If the group length in the horizontal direction becomes equal to the page width, the document structure tree generation process ends. If the group length in the horizontal direction does not reach the page width yet, the flow returns to step S8100 to repeat the processes from relevance check in the vertical direction in an upper layer by one level.

In the tree structure of FIGS. 18A and 18B, since the division width in the horizontal direction agrees with the page width, the process ends, and uppermost layer V0 that represents the entire page is finally appended to the document structure tree.

An example of the process of application software using the application data based on FIGS. 18A and 18B is as follows.

Since group H1 has two rectangular blocks T1 and T2 in the horizontal direction, two columns are set, and internal information (a document as the character recognition result, an image, and the like) of T1 is output with reference to its DAOF. After that, a new column is set, and internal information of T2 is output. Subsequently, separator S1 is output.

Next, the process of group H2 starts. Since group H2 has two rectangular blocks V1 and V2 in the horizontal direction, it is output as two columns. For group V1, internal information is output in the order of rectangular blocks T3, T4, and T5. After that, a new column is set, and internal information of group V2 is output in the order of rectangular blocks T6 and T7.

Conversion into application data progresses in this way.

<<Appending of Pointer Information>>

The pointer information appending process in step S2418 appends pointer information to a recording sheet upon recording the extracted or generated file. With reference to the pointer information, a digital file can be easily extracted. The pointer information appending process is executed according to the process shown in FIG. 19 in the first embodiment.

A process for appending pointer information as a two-dimensional barcode (QR code symbol: JIS X0510) will be described below using the flow chart in FIG. 19.

Note that the two-dimensional barcode includes information that indicates a location from which a corresponding digital file can be acquired.

Step S900: Pointer information is analyzed by identifying characters that represent the pointer information to be converted into a QR code symbol, error detection and error correction levels are set, and a minimum model number that can store the pointer information is selected.

Step S901: The pointer information analyzed in step S900 is converted into a predetermined bit sequence, and an indicator indicating a mode (numeric, alphanumeric, 8 bits per byte, kanji, etc.) and an end pattern are appended as needed. Furthermore, the bit sequence is converted into predetermined bit code words.

Step S902: The bit code word sequence generated in step S901 is segmented into a predetermined number of blocks in accordance with the model number and error correction level, and error correction code words are generated for respective blocks. Furthermore, the error correction code words are appended after the bit code word sequence.

Step S903: The bit code words of respective blocks generated in step S902 are connected, and error correction code words are appended to the respective blocks. Furthermore, remainder code words are appended after the correction codes of the respective blocks as needed. In this way, a code word module is generated.

Step S904: A position detection pattern, a separation pattern, a timing pattern, an alignment pattern, and the code word module are set in a predetermined matrix.

Step S905: A mask pattern optimal to the symbol encoding region in the matrix generated in step S904 is selected, and a module is generated by calculating XORs of the matrix and mask pattern.

Step S906: Type information and model number information are generated for the module generated in step S905, thus completing a QR code symbol.

The QR code symbol that incorporates the address information is converted into recordable raster data by the data processing device 115 and is formed as an image at a predetermined position of a print image upon printing a digital file by the MFP 100 in response to a request from the client PC 102.

As has been explained in association with step S2404 in FIG. 24, since the printed image formed with the image of the QR code symbol is scanned by the image scanning unit 110, pointer information can be acquired, and the storage location of the digital file can be detected.

<Modification in Third Embodiment>

Figure 33:
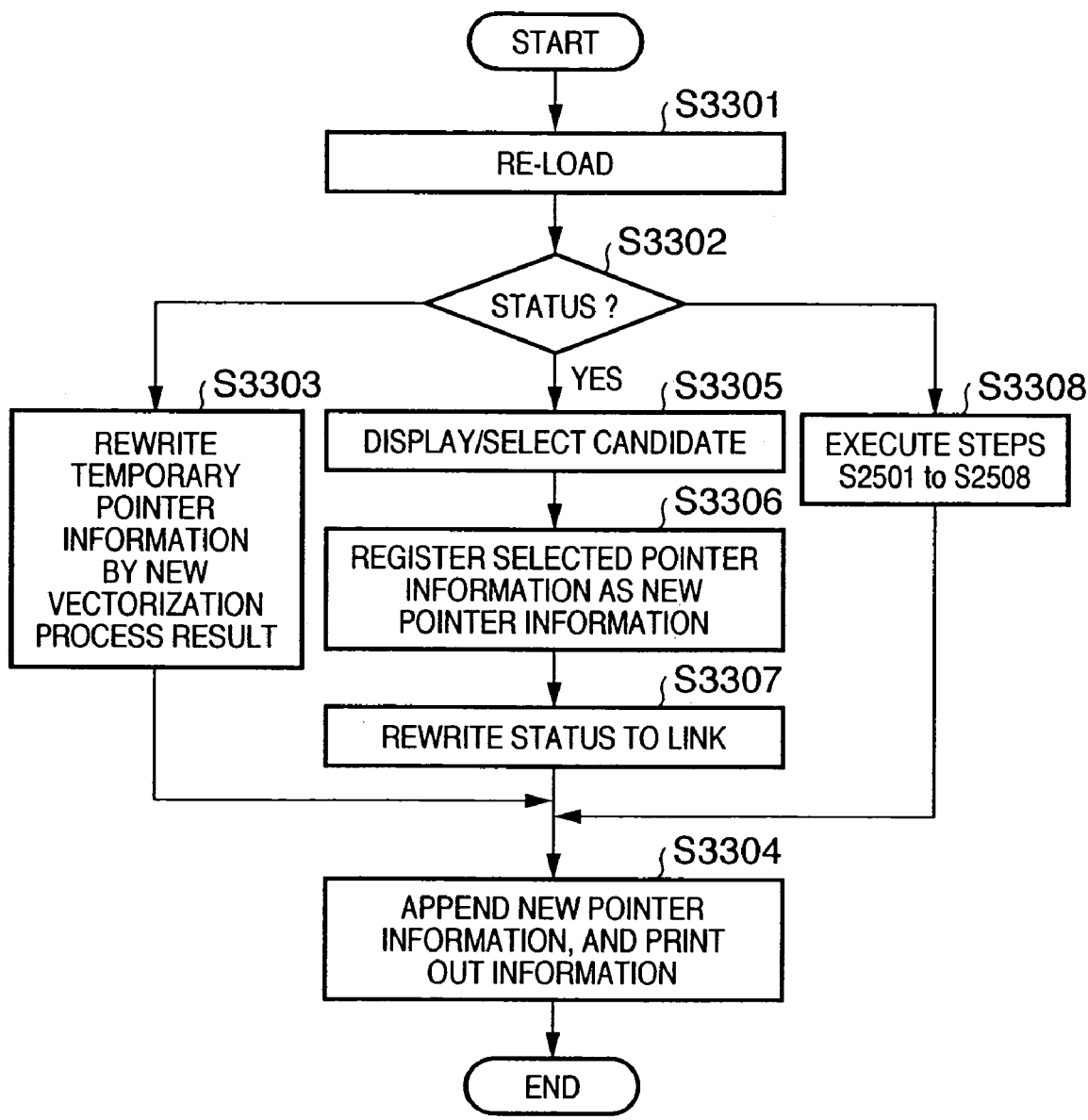
FIG. 33 is a flow chart showing an overview of the entire operation of an image process according to a modification the third embodiment.

A modification of the third embodiment of the image processing method according to the present invention will be described below with reference to the drawings. FIG. 33 is a flow chart showing a modification of the third embodiment.

In FIG. 24, the input image for which the user selects "Later" (button 2602) in association with the vectorization process in step S2407 undergoes the vectorization process later in consideration of the load state on the MFP 100. In this case, by scanning a printout appended with pointer information by the MFP 100, a simultaneous vectorization process can be executed.

Upon recording an input image which corresponds to "LATER" status 1011 described in the vector process table (FIG. 27) (steps S2417 and S2419), temporary pointer information is recorded as the pointer information.

When the MFP 100 scans the printout recorded with this temporary pointer information again, the MFP 100 refers to status of the input image, and executes steps in FIG. 33 in accordance with status 1011.

Step S3301: A printout is scanned again, and status 1011 is referred to.

Step S3302: If status 1011 which is referred to in step S3301 is "DONE", the flow branches to step S3303; if status 1011 is "SIMILAR", the flow branches to step S3305; or if status 1011 is "LATER", the flow branches to step S3308.

Step S3303: Temporary pointer is rewritten to a pointer to a new vectorization process result, and the flow advances to step S3304.

Step S3304: A printout appended with the new pointer information is generated.

Step S3305: A digital file candidate display/selection process is executed as in step S2410 in FIG. 24.

Step S3306: Pointer information of the selected digital file is registered in the vector process table, and the flow advances to step S3307.

Step S3307: Status 1011 is rewritten to "LINK", and the flow advances to step S3304.

Step S3308: The same processes as those in steps S2501 to S2508 in FIG. 25 are executed, and the flow then advances to step S3304.

In the third embodiment, the process of an input image input from the image scanning unit 110 or the like has been explained. Also, the present invention is effective for image data other than the input image such as image data consisting of raster data or its encoded data stored in a storage medium, image data supplied by communication means, and the like.

According to the invention of the third embodiment, the user need not recognize the processing time for vectorization.

D. Fourth Embodiment

The same image processing system and MFP 100 as those in the first embodiment can be applied. Hence, a detailed description thereof will be omitted.

<<Overall Flow of Image Processing Method>>

Figure 34:
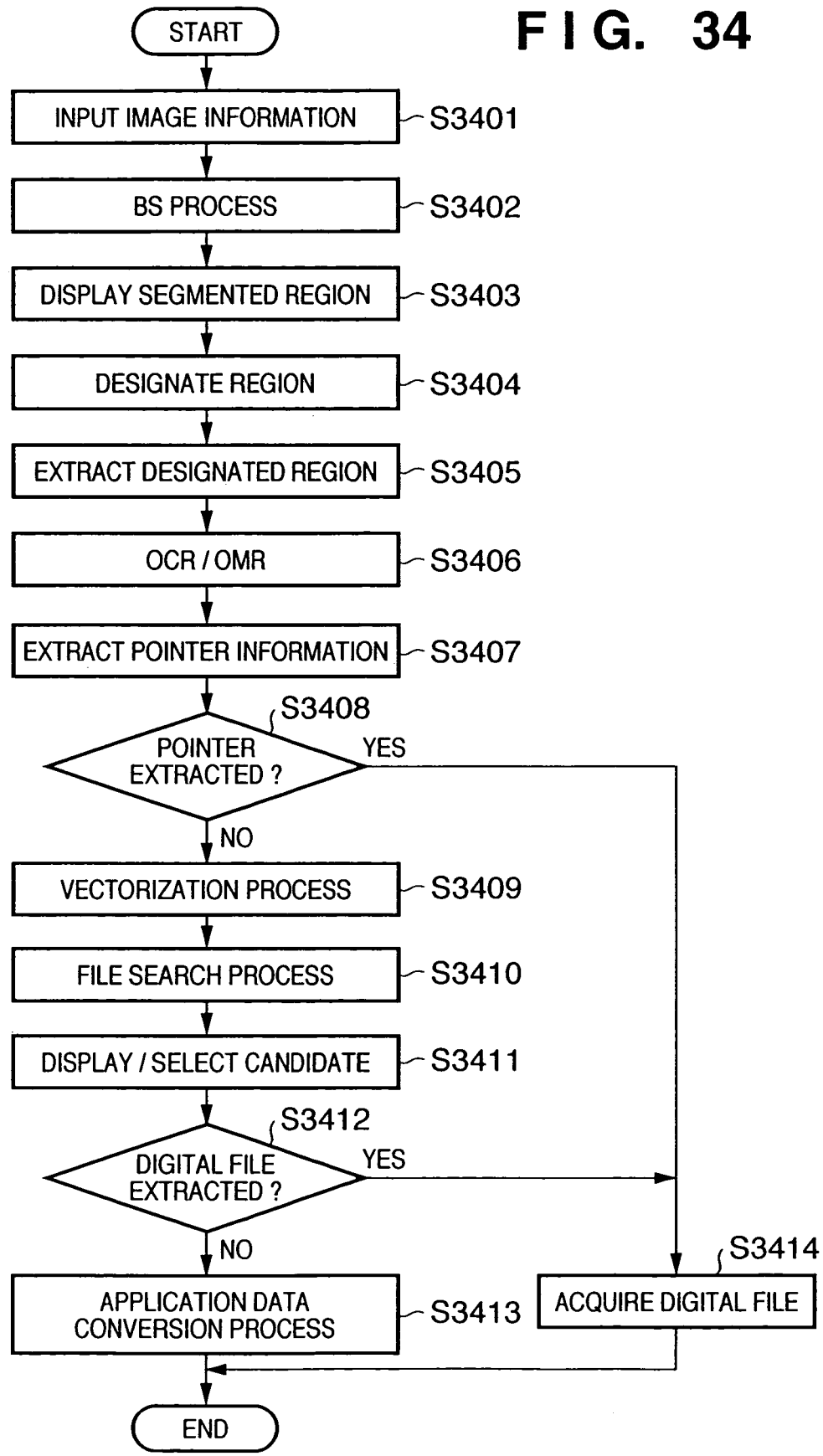
FIG. 34 is a flow chart showing an overview of the entire operation of an image process according to the fourth embodiment.

The image processing method according to the third embodiment is implemented by respective steps in FIG. 34.

Step S3401: The image scanning unit 110 of the MFP 100 is enabled to scan one document in a raster order, and to obtain a scanned image signal with a predetermined resolution and predetermined density level. The scanned image signal undergoes a pre-process by the data processing device 115, and is stored as image data for one page of the input image in the storage device 111. The flow advances to step S3402.

Step S3402 (block selection (region segmentation) step): The management PC 101 separates regions of image data stored in the storage device 111 into a text/line image region including text or line images, a halftone photo region, a graphic region with an indeterminate form, and the like. Furthermore, the text/line image region is further separated into a text region that mainly includes characters, and a line image region including a table, graphic, and the like. The line image region is further separated into table and graphic regions. Note that this embodiment detects coupled pixels, and segments image data into regions for respective properties using the shapes, sizes, pixel densities, and the like of circumscribing rectangular regions of the coupled pixels. However, any other region segmentation methods may be used.

The text region is segmented into rectangular blocks (text region rectangular blocks) combined as clusters for respective paragraphs of text. The line image region is segmented into rectangular blocks for individual objects such as a table, graphic, and the like (table region rectangular block, line image region rectangular block).

A photo region expressed by halftone is segmented into rectangular blocks for respective objects such as an image region rectangular block, background region rectangular block, and the like.

Information of these rectangular blocks will be referred to as "region segmentation information" hereinafter.

Step S3403: The region segmentation information obtained in the block selection step and the input image are composited, and the composite image is displayed on the operation window of the display device 116 of the MFP 100.

FIG. 4 shows an example of the operation screen displayed on the display device 116.

On the operation screen, the input image itself is displayed as an image 41 on the left half portion, and an image 42 which indicates the region separation information using rectangular blocks is displayed on the right half portion.

On the image 42, the input image is simplified and displayed, and rectangular blocks are indicated by rectangles.

For the sake of easy understanding of the concept of the rectangular blocks, indications TEXT, PICTURE, LINE, and TABLE indicating their properties are appended to the respective blocks. However, such property information is not displayed in practice, and divided rectangular regions are displayed as frame lines.

TEXT, PICTURE, LINE, and TABLE are the property indications of a text region rectangular block, picture region rectangular block, line image region rectangular block, and table region rectangular block. In addition, property indications PHOTO indicating a photo region rectangular block, and the like are also used.

Note that FIG. 4 displays the input image and region segmentation information side by side. Also, various other display patterns (e.g., divided rectangular blocks are superimposed on the input image) are available.

Step S3404 (specific region designation step): A rectangular block to be vectorized is designated as a specific region from the region segmentation information displayed in step S3403 on the basis of a user's designation.

As the method of designating a specific region, for example, the user designates one or a plurality of rectangular blocks in the image 42 using a pointing device (not shown). Note that various other methods may be used (e.g., a touch panel is used as the operation screen of the display device 116, and the user designates a desired rectangular block with his or her finger).

Step S3405: The specific region designated in step S3404 is extracted as image data, and the extracted image data undergoes the following processes.

Step S3406: An OCR/OMR process is executed to determine whether or not pointer information of an original data file is embedded in the specific region.

An object corresponding to a two-dimensional barcode or URL, which is recorded in the document image as additional information, is detected. In this case, the URL undergoes a character recognition process by OCR or the two-dimensional barcode is decoded by OMR, thereby detecting pointer information in the storage device that stores an original data file of the input image.

Means for appending the pointer information is not limited to the two-dimensional barcode, and so-called digital watermarking methods that can embed invisible information, such as a method of embedding information as a change in spacing between neighboring characters, a method of embedding information in a halftone image, or the like may be adopted.

Step S3407 (pointer information extraction step): Pointer information is extracted from the OCR, OMR, or digital watermark information obtained in step S3406.

Step S3408: It is determined whether or not pointer information is acquired. If pointer information is acquired, the flow branches to step S3414 to directly access original data file.

The original data file is stored in the form of a digital file in the hard disk of the client PC 102 in FIG. 1, the database 105 in the document management server 106, the storage device 111 provided to the MFP 100, or the like, and these storage devices are searched according to the address information (pointer information) obtained in step S3408.

Step S3409 (vectorization step): If no pointer information is extracted, the vectorization process is executed to convert image data of each specific region into vector data.

The following vectorization methods (a) to (f) and the like are available as in the third embodiment.

(a) When the specific region is a text region, code conversion of character images is executed by OCR, or the size, style, and font of each character are recognized, thus converting the text region into font data which are visually faithful to characters obtained by scanning the document.

(b) When the specific region is a text region, and cannot be recognized by OCR, the outlines of characters are traced, thus converting the text region into a format that expresses outline information as connection of line segments.

(c) When the specific region is a graphic region, the outlines of a graphic object are traced, thus converting the graphic region into a format that expresses outline information as connection of line segments.

(d) Outline information in the line segment format obtained by method (b) or (c) is converted into function information by fitting using a Bezier function or the like.

(e) The shape of a graphic is recognized from the outline information of the graphic object obtained by method (c), thus converting the outline information into graphic definition information of, e.g., a circle, rectangle, polygon, or the like.

(f) When the specific region is a graphic region and is an object in a table format, ruled lines and frame lines are recognized, thus converting that region into predetermined table format information.

In addition to the above methods, various other vectorization processes that replace raster data by predetermined commands and code information are available.

Step S3410 (file search step): If no pointer information is extracted, the local hard disks on the management PC 101 and client PC 102 and the database 105 on the document management server 106 are searched for a data file or its original file, which contains information of the specific region designated in step S3404 (specific region designation step).

In the file search process, keywords are extracted from the result of the OCR process, which is executed for the text region rectangular block, of the vector data generated in step S3409 (vectorization step), and a document containing keywords is extracted by a full-text search.

Alternatively, layout information is acquired from information such as the presence/absence of rectangles or special graphics, the presence/absence of table format data, their positional relationship and layout, and the like of the respective vector data, and a so-called layout search is conducted.

Step S3411: If a data file with a high similarity level is extracted as a result of the search process, a candidate data file as the extraction result is displayed as a thumbnail or the like on the operation screen of the display device 116. If a plurality of candidate data files are extracted, the operator specifies an original data file from the candidate data files by input operation if necessary. If only one candidate data file is extracted and has a high similarity level, the flow may bypass step S3412 and may automatically jump to step S3414.

Step S3412: It is checked if the original data file extracted in step S3411 is a raster data file or an image data file which is represented by BMP or tiff and is obtained by encoding raster data. If the extracted data file is an image data file, since this data file has the same data format as the image data input in step S3401, the vector data obtained in step S3409 are directly converted into an application data format in step S3413.

If the extracted data file is an easily re-usable data file which contains character codes, vector data, and the like, that data file is acquired in step S3414.

If no original data file is selected in step S3411, the flow advances to step S3413 to convert the vector data obtained in step S3409 into an application data format.

Step S3413: The vector data obtained in step S3409 are converted into an application data format, and the converted data is output. Normally, the data format depends on an application to be used, and data must be converted into a file format corresponding to the purpose intended.

A re-usable application data format that allows an edit process and the like includes those of application software programs such as a wordprocessor, spreadsheet software, and the like. For example, wordprocessor WORD®, spreadsheet software EXCEL®, and the like, which are available from Microsoft Corporation, are known. These applications have different use purposes, define file formats according to their purposes, and save a file (data) in these formats.

As a versatile file format, an RTF (rich text file) format of Microsoft Corporation, an SVG (Scalable Vector Graphics) format which is beginning to be used in recent years, a plane text format that simply handles text data alone, and the like are known, and these formats can be commonly used in corresponding applications.

Step S3414: If pointer information is acquired in step S3407, an original data file is acquired based on that pointer information.

In this embodiment, the specific region designated by the user is converted into vector data, and other regions use image data of the input image. Then, these vector data and image data are composited to convert them into the aforementioned application data format. At this time, the position information of the specific region in the input image is saved so that the entire input image can be reproduced.

With the above arrangement, only the region of user's choice is converted into vector data, and can be easily re-used (e.g., that region can be edited). Also, a region which is not to be vectorized (e.g., an image region or the like) can be prevented from being accidentally vectorized.

Principal steps in FIG. 34 will be described in detail below. When the same processes as in the first to third embodiments are to be executed, a repetitive description is avoided as needed.

<<Block Selection Step>>

The process in block selection step S3402 is the same as that in the third embodiment.

<<Pointer Information Extraction Step>>

Step S3407 (pointer information extraction step) is also the same as that in the first to third embodiments.

As for pointer information extraction, when a specific region to be vectorized is designated as in this embodiment, pointer information can be quickly and reliably acquired. That is, when the user designates a barcode or a rectangular block embedded with a digital watermark or the like, pointer information can be efficiently extracted.

Conversely, when no specific region is designated, the process for searching the entire input image for the position of a barcode, digital watermark, or the like, and extracting the barcode, digital watermark, or the like must be executed, thus impairing the total performance.

<<Digital File Search Based on Pointer Information>>

The digital file search process based on pointer information in step S3414 in FIG. 34 is basically the same as that in the third embodiment. This process will be briefly explained below.

A file server is specified based on an address included in the pointer information, and the address is transferred to the file server. The file server includes all of the client PC 102, the document management server 106 that incorporates the database 105, and the MFP 100 that incorporates the storage device 111. The address is a URL or path information including a server name and file name.

Upon reception of the address, the file server searches for an original data file based on this address. If an original data file can be extracted by this file search process, the file server notifies the MFP 100 of the address of that file. If the user wants to acquire the original data file, the file server transfers the original data file to the MFP 100. On the other hand, if the file server cannot extract any file, it sends a message that advises accordingly to the MFP 100.

<<Vectorization Step>>

Step S3410 (vectorization step) is implemented by respective steps in FIG. 30. In the vectorization step, if no pointer information is extracted from the specific region in step S3409, image data of that specific region is vectorized. Since this process is the same as that in the third embodiment, a detailed description thereof will be omitted.

With this vectorization process, image information which belongs to a text region rectangular block can be converted into vector data with a nearly faithful shape, size, and color.

<<Vectorization of Region Other Than Text Region>>

In step S3012, if it is determined that the specific region is a region other than the text region rectangular block, i.e., a picture region rectangular block, line image region rectangular block, table region rectangular block, or the like, the outlines of black pixel clusters extracted in the specific region are converted into vector data. The vectorization process of the region other than the text region is the same as that in the third embodiment; please refer to FIGS. 31 and 32 and their description for details.

<<Graphic Recognition>>

After the outlines of line graphics and the like are vectorized, the vectorized partial lines are grouped for each graphic object. This process is the same as that in the first to third embodiments.

<<Detection of Graphic Element>>

The graphic element detection process in the graphic recognition process is also the same as that in the first to third embodiments.

Note that the vectorization process normally need not always be executed for the entire input image, but often suffices to vectorize only a specific region designated by the user.

Upon executing the vectorization process for only the specific region designated by the user, the processing performance can be improved. In addition, only a portion desired by the user is efficiently vectorized and is used in the search process in the next step, or only a required portion of the image information can be re-edited or re-used.

<<File Search Process>>

In the file search process in step S3410 in FIG. 34, the same process as that of the layout process (FIG. 29) of the third embodiment is executed. Assume that the rectangular blocks extracted as a result of step S3402 and input image data have block information and input file information shown in FIG. 5, and vectorized information in the specific region is held.

In FIG. 5, the property, coordinates, width, height, and availability of OCR information are recorded as block information for each of six rectangular blocks 1 to 6, and the property is classified to text, picture, table, line image, photo, and the like. The total number of blocks in the input file information indicates that in the input image, and the total number N of blocks is 6 in FIG. 5.

In the block information, for example, rectangular blocks are arranged in ascending order of coordinate X, and rectangular blocks with identical coordinate X are arranged in ascending order of coordinate Y. The layout search process for searching the database for files similar to the input image using these pieces of information is implemented by respective steps of FIG. 29. Assume that database files have the same kinds of information as those in FIG. 5. In the flow of the flow chart, block information and input file information are compared in turn with those of files in the database. Please refer to the third embodiment for details of the layout process in FIG. 29.

As a result of the search process, database files which have total similarity levels higher than a threshold value Th and are saved as candidates (step S2913) are displayed as thumbnails or the like. When the operator must select one of these candidates, he or she specifies a file by input operation.

In the layout search process, the vectorized information generated in step S3409 for the specific region designated by the user is held. As vectorized information that can be used in the file search process (step S3410 in FIG. 34, FIG. 29), character code information obtained by the OCR process, layout information such as the vertical/horizontal writing direction, the number and layout of graphics obtained by graphic recognition (FIG. 13), font information used in text in a document obtained by font recognition (FIG. 30), and the like can be used.

In the present invention, since the detailed vectorized information of the specific region desired by the user can be used in similarity calculation in the database file search process, the search precision can be improved. Also, in the database file search process, since the vectorized information of the specific region is multiplied by a larger weight, and a similarity level that places an importance on the portion desired by the user is calculated, a search result that satisfies the user can be obtained.

<<Conversion Process to Application Data>>

After the block selection step (step S3402) in FIG. 34, the conversion process to application data in step S3413 is executed using data of the results of the vectorization process (step S3409). The vectorization process results in step S3409 are saved as an intermediate data format, i.e., in a so-called document analysis output format (DAOF), shown in FIG. 15. This conversion process to application data is the same as that in the first and third embodiments.

<First Modification of Fourth Embodiment>

In the fourth embodiment, when the user designates a specific region to be vectorized, he or she designates one or a plurality of rectangular blocks automatically generated by the BS (block selection) process using input means or the like. However, the present invention is not limited to such specific designation means.

Figure 35:
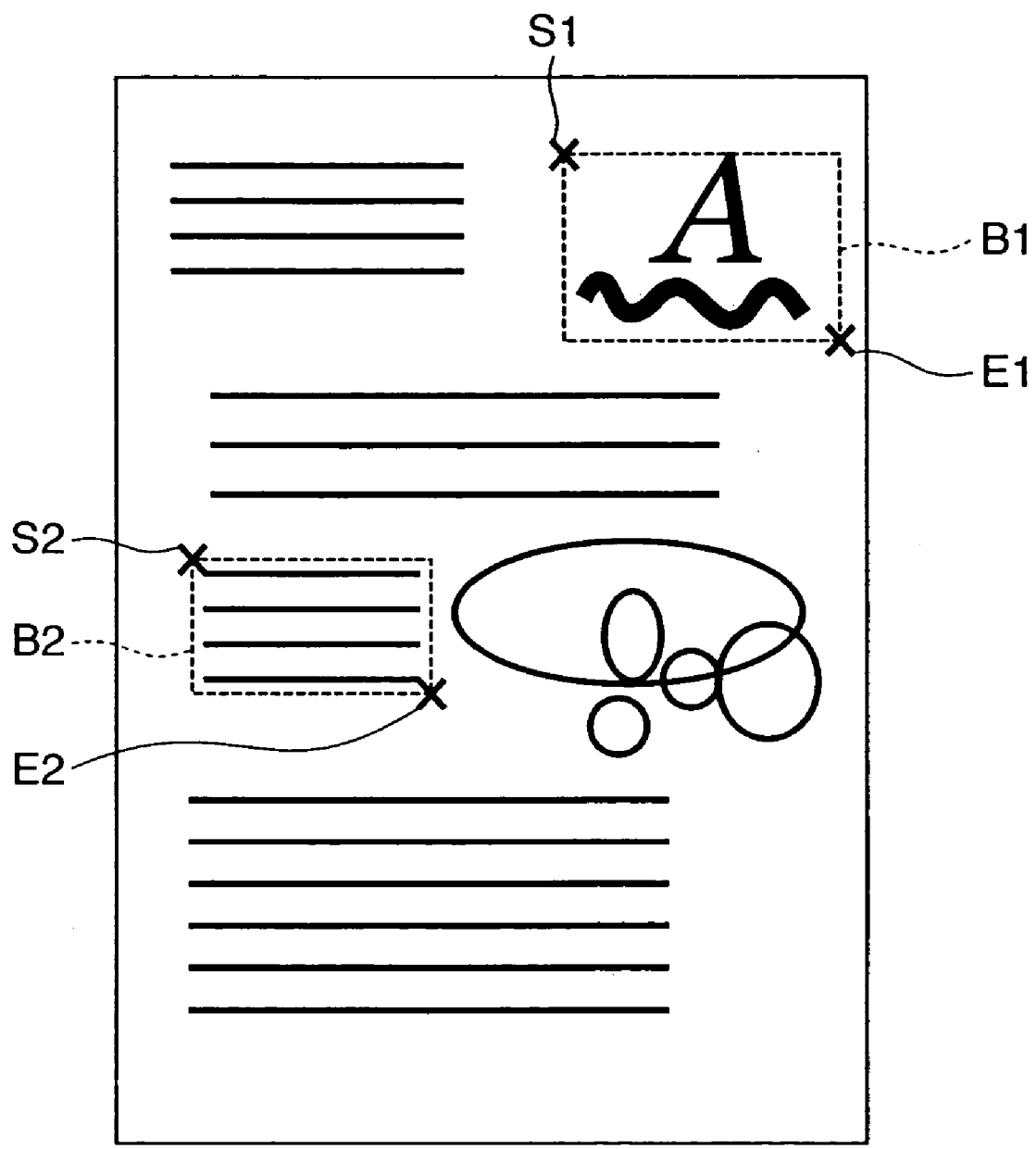
FIG. 35 shows a specification region designation process in modification 1 of the fourth embodiment.

As shown in FIG. 35, the input image itself may be displayed on the operation screen of the MFP 100 without generating any rectangular blocks by the BS (block selection) process, and the user may designate his or her desired region by the start and end coordinates. For example, the user designates specific region B1 by start and end coordinates S1 and E1, and specific region B2 by start and end coordinates S2 and E2. As methods of designating the start and end coordinates, a method of inputting them using the operation screen as a touch panel, a method of inputting coordinates by numeric keys, and the like is available.

<Second Modification of Fourth Embodiment>

A specific region may be directly designated on a document using a line marker or the like in place of the designation process of the MFP 100.

Figure 36:
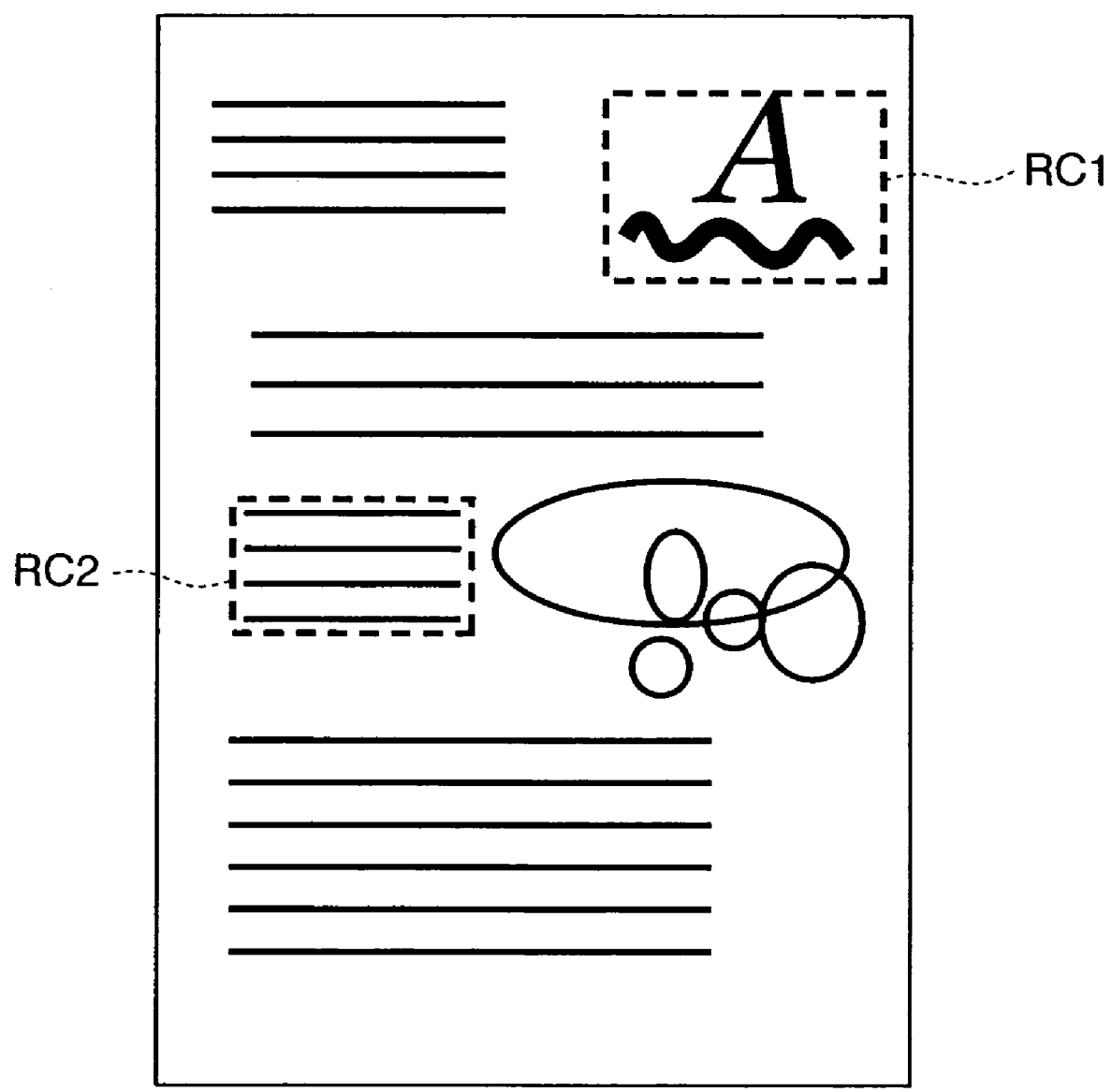
FIG. 36 shows a specification region designation process in modification 2 of the fourth embodiment.

As shown in FIG. 36, rectangles RC1 and RC2 corresponding to specific regions are written on a document using predetermined color line markers. The MFP detects these rectangles RC1 and RC2 by scanning, and generates specific regions based on the detected pixel layouts. Rectangles RC1 and RC2 can be detected by a known method.

According to the fourth embodiment, in order to facilitate re-use of information which is saved in the form of a paper document or image data, the input image can be converted into vector data, and the conversion efficiency of vector data can be improved.

E. Others

The interface used to instruct whether the vectorization process is to be done "right now" or "later", which was explained in the third embodiment, may be combined with the first or fourth embodiment. In this case, whether the vectorization process is to be done right now or later can be selected in the vectorization process of difference information and that of a specific region designated by the user in addition to that of the entire input image.

Means for practicing the image processing method according to the present invention is not limited to the image processing system shown in FIGS. 1 and 2, and various other means such as a dedicated image processing apparatus, versatile computer, and the like may be adopted.

Upon practicing the method of the present invention using a versatile computer, the versatile computer loads a computer executable program that includes a program code which makes the versatile computer execute the respective steps of the image processing method.

The program that makes the versatile computer execute the image process is loaded from a ROM built in that versatile computer or a storage medium that can be read by the versatile computer, or is loaded from a server or the like via a network.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:
    a search step of searching for original digital data stored in storage means on the basis of an input image;
    an extraction step of extracting difference information by comparing the original digital data retrieved in the search step and the input image;
    a vectorization step of converting the difference information extracted in the extraction step into vector data;
    a composition step of compositing the difference information that has been converted into the vector data to the original digital data; and
    a checking step of checking whether or not to inhibit information about the retrieved original digital data from being changed,
    wherein if it is determined in the checking step that a change in information is not inhibited, the difference information extracted in the extraction step is converted into vector data in the vectorization step, and the difference information that has been converted into the vector data is composited to the original digital data in the composition step, and if it is determined in the checking step that a change in information is inhibited, the difference information extracted in the extraction step and information other than the difference information which is included in the input image are converted into vector data in the vectorization step.

2. An image processing method comprising:
    a search step of searching for an original data file corresponding to an input image;
    a checking step of checking, based on a user's instruction, whether the input image is to be converted into vector data immediately or later; and
    a vectorization step of converting the input image, the original data file of which cannot be retrieved, into vector data,
    wherein the vectorization step includes a step of immediately converting the input image into vector data when it is determined in the checking step that the input image is to be converted into vector data immediately, and converting, when it is determined in the checking step that the input image is to be converted into vector data later, the input image into vector data when a predetermined condition is met.

3. The method according to claim 2, wherein the predetermined condition is met when a load on image processing means is light.

4. The method according to claim 2, wherein the checking step includes a step of registering status based on the user's instruction in a vectorization process table in association with the input image.

5. The method according to claim 2, further comprising a storage step of storing the input image that has been converted into the vector data in a database.

6. An image processing system comprising:
    search means for searching for an original data file corresponding to an input image;
    checking means for checking, based on a user's instruction, whether the input image is to be converted into vector data immediately or later; and
    vectorization means for converting the input image, the original data file of which cannot be retrieved, into vector data,
    wherein when said checking means determines that the input image is to be converted into vector data immediately, said vectorization means immediately converts the input image into vector data, and when said checking means determines that the input image is to be converted into vector data later, said vectorization means converts the input image into vector data when a predetermined condition is met.

7. A computer-executable program stored on a computer-readable medium, said computer-executable program being executable by a computer so as to control the computer to perform image processing, said program comprising:

a code for implementing a search step of searching for an original data file corresponding to an input image;

a code for implementing a checking step of determining, based on a user's instruction, whether the input image is to be converted into vector data immediately or later; and a code for implementing a vectorization step of converting the input image, the original data file of which cannot be retrieved, into vector data, wherein the vectorization step includes a step of immediately converting the input image into vector data when it is determined in the checking step that the input image is to be converted into vector data immediately, and converting, when it is determined in the checking step that the input image is to be converted into vector data later, the input image into vector data when a predetermined condition is met.

8. A computer-readable storage medium storing a computer-executable program, said computer-executable program being executable by a computer so as to control the computer to perform image processing, said program comprising:

a code for implementing a search step of searching for an original data file corresponding to an input image;

a code for implementing a checking step of determining, based on a user's instruction, whether the input image is to be converted into vector data immediately or later; and a code for implementing a vectorization step of converting the input image, the original data file of which cannot be retrieved, into vector data, wherein the vectorization step includes a step of immediately converting the input image into vector data when it is determined in the checking step that the input image is to be converted into vector data immediately, and converting, when it is determined in the checking step that the input image is to be converted into vector data later, the input image into vector data when a predetermined condition is met.

9. An image processing system comprising:

search means for searching for original digital data stored in storage means on the basis of an input image;

extraction means for extracting difference information by comparing the original digital data retrieved by the search means and the input image;

vectorization means for converting the difference information extracted by the extraction means into vector data;

composition means for compositing the difference information that has been converted into the vector data to the original digital data; and checking means for checking whether or not to inhibit information about the retrieved original digital data from being changed, wherein if it is determined by the checking means that a change in information is not inhibited, the difference information extracted by the extraction means is converted into vector data by the vectorization means, and the difference information that has been converted into the vector data is composited to the original digital data by the composition means, and if it is determined by the checking means that a change in information is inhibited, the difference information extracted by the extraction means and information other than the difference information which is included in the input image are converted into vector data by the vectorization means.

10. A computer-readable storage medium storing a computer-exectable program, said computer-executable program being executable by a computer so as to control the computer to perform image processing, said program comprising:

a code for implementing a search step of searching for original digital data stored in storage means on the basis of an input image;

a code for implementing an extraction step of extracting difference information by comparing the original digital data retrieved in the search step and the input image;

a code for implementing a vectorization step of converting the difference information extracted in the extraction step into vector data;

a code for implementing a composition step of compositing the difference information that has been converted into the vector data to the original digital data; and a code for implementing a checking step of checking whether or not to inhibit information about the retrieved original digital data from being changed, wherein if it is determined in the checking step that a change in information is not inhibited, the difference information extracted in the extraction step is converted into vector data in the vectorization step, and the difference information that has been converted into the vector data is composited to the original digital data in the composition step, and if it is determined in the checking step that a change in information is inhibited, the difference information extracted in the extraction step and information other than the difference information which is included in the input image are converted into vector data in the vectorization step.

* * * * *